US012570564B2

(12) United States Patent
Dannoux et al.

(10) Patent No.: US 12,570,564 B2
(45) Date of Patent: Mar. 10, 2026

(54) COMPLEXLY CURVED GLASS ARTICLES AND METHODS OF FORMING THE SAME

(71) Applicant: CORNING INCORPORATED, Corning, NY (US)

(72) Inventors: Thierry Luc Alain Dannoux, Avon (FR); Cyril Rémy André Dedieu, Hericy (FR); Jean-Marc Plessier, Nemours (FR); Felice Scotta, Savigny le Temple (FR); Ronan Tanguy, Grez Sur Loing (FR); Chao Yu, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 172 days.

(21) Appl. No.: 18/288,618

(22) PCT Filed: Apr. 21, 2022

(86) PCT No.: PCT/US2022/025696
§ 371 (c)(1),
(2) Date: Oct. 27, 2023

(87) PCT Pub. No.: WO2022/231933
PCT Pub. Date: Nov. 3, 2022

(65) Prior Publication Data
US 2024/0217858 A1 Jul. 4, 2024

Related U.S. Application Data

(60) Provisional application No. 63/315,558, filed on Mar. 2, 2022, provisional application No. 63/286,734, filed
(Continued)

(51) Int. Cl.
*C03B 23/035* (2006.01)
*B32B 1/00* (2024.01)

(52) U.S. Cl.
CPC ............ *C03B 23/0357* (2013.01); *B32B 1/00* (2013.01)

(58) Field of Classification Search
CPC ...... C03B 23/035; C03B 23/0357; B32B 1/00
See application file for complete search history.

(56) References Cited

U.S. PATENT DOCUMENTS

| | | |
|---|---|---|
| 3,552,941 A | 1/1971 | Giffen |
| 10,364,175 B2 | 7/2019 | Brocheton et al. |

(Continued)

FOREIGN PATENT DOCUMENTS

EP 1798206 A1 6/2007

OTHER PUBLICATIONS

International Search Report and Written Opinion of the International Searching Authority; PCT/US2022/025696; dated Jun. 27, 2022; 12 pages; European Patent Office.

*Primary Examiner* — Catherine A. Simone
(74) *Attorney, Agent, or Firm* — Daniel J. Greenhalgh

(57) ABSTRACT

Complexly-curved glass articles and methods of forming the same are described herein. The glass articles described herein may be reformed via application of vacuum pressure thereto. The glass articles may comprise a first glass layer comprising a first non-developable curved shape defined by a first curved surface and a second curved surface. At least one of the first curved surface and the second curved surface comprises a surface area of 60.000 mm$^2$ or more. A thickness of the glass articles may comprise a uniformity of +/−75 microns per 1000 mm$^2$ of surface area. The non-developable curved shape may comprise a maximum compressive strain shape parameter, as measured between an imaginary central surface disposed between the first curved surface and the second curved surface and an imaginary surface, of greater than or equal to 3.0%.

10 Claims, 22 Drawing Sheets

Related U.S. Application Data on Dec. 7, 2021, provisional application No. 63/286,
748, filed on Dec. 7, 2021, provisional application
No. 63/181,582, filed on Apr. 29, 2021.

(56) References Cited

U.S. PATENT DOCUMENTS

| | | | |
|---|---|---|---|
| 10,377,656 | B2 | 8/2019 | Dannoux et al. |
| 10,450,215 | B2 | 10/2019 | Fredholm |
| 2007/0144211 | A1* | 6/2007 | Hori .................... C03B 23/0305 |
| | | | 65/106 |
| 2009/0117332 | A1 | 5/2009 | Ellsworth et al. |
| 2016/0194200 | A1 | 7/2016 | Najafi et al. |
| 2016/0272529 | A1 | 9/2016 | Hong et al. |
| 2017/0121210 | A1* | 5/2017 | Rai .................... C03B 23/0357 |
| 2019/0263706 | A1 | 8/2019 | Atkins-Barratt et al. |

* cited by examiner

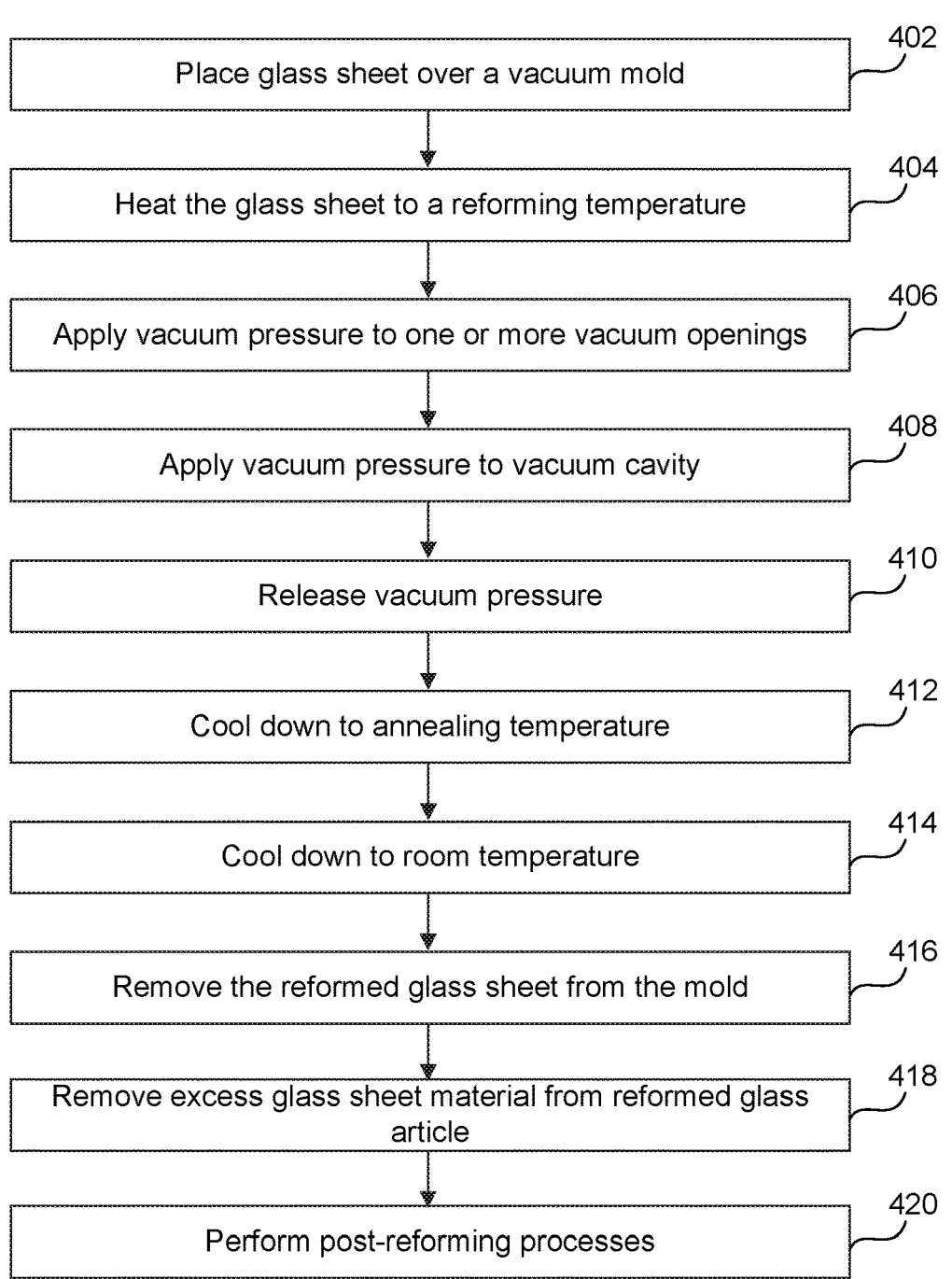

400

402

Place glass sheet over a vacuum mold

404

Heat the glass sheet to a reforming temperature

406

Apply vacuum pressure to one or more vacuum openings

408

Apply vacuum pressure to vacuum cavity

410

Release vacuum pressure

412

Cool down to annealing temperature

414

Cool down to room temperature

416

Remove the reformed glass sheet from the mold

418

Remove excess glass sheet material from reformed glass article

420

Perform post-reforming processes

FIG. 4

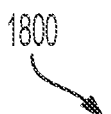

1800

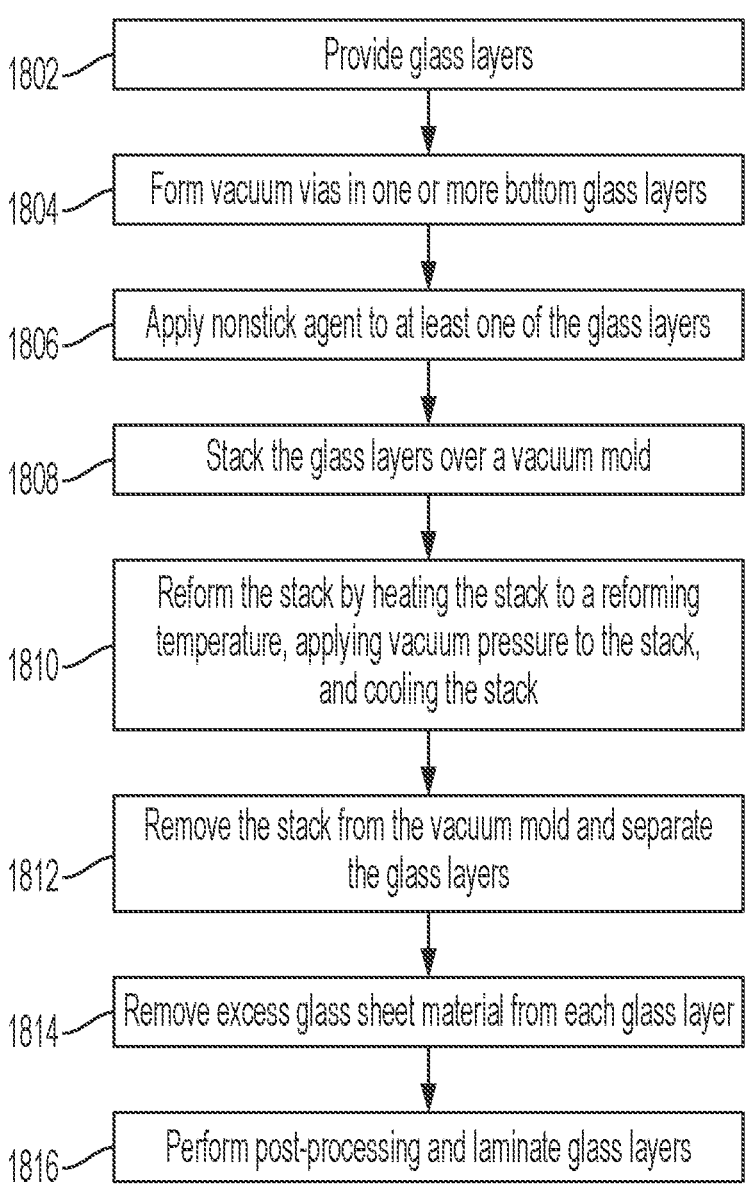

1802 — Provide glass layers

1804 — Form vacuum vias in one or more bottom glass layers

1806 — Apply nonstick agent to at least one of the glass layers

1808 — Stack the glass layers over a vacuum mold

1810 — Reform the stack by heating the stack to a reforming temperature, applying vacuum pressure to the stack, and cooling the stack 1812 — Remove the stack from the vacuum mold and separate the glass layers 1814 — Remove excess glass sheet material from each glass layer 1816 — Perform post-processing and laminate glass layers

FIG. 18

COMPLEXLY CURVED GLASS ARTICLES AND METHODS OF FORMING THE SAME

CROSS-REFERENCE TO RELATED APPLICATIONS

This application claims the benefit of priority under 35 U.S.C. § 371 of International Application No. PCT/US2022/025696, filed on Apr. 21, 2022, which claims the benefit of priority under 35 U.S.C. § 119 of U.S. Provisional Application No. 63/181,582, filed Apr. 29, 2021, of U.S. Provisional Application No. 63/286,734, filed Dec. 7, 2021, U.S. Provisional Application No. 63/286,748, filed Dec. 7, 2021, and of U.S. Provisional Application No. 63/315,558, filed Mar. 2, 2022, the content of each of which are incorporated herein by reference in their entirety.

FIELD

The present disclosure relates to vacuum forming of articles for use in various industries, for example, consumer electronics, appliances, transportation, architecture, defense, and medicine. In particular, the present disclosure relates to vacuum forming of glass articles having a non-developable shape and the resulting vacuum-formed glass articles having a non-developable shape.

BACKGROUND

Many products include a three-dimensional (3D) glass article. Some examples of articles include a 3D glass article include curved LCD or LED TV screens, smart phones, and windows. Innovations in the shape of products brings new challenges to the manufacturing processes for 3D parts, an in particular 3D parts that are made of glass, which should have excellent optical properties, along with desirable scratch-resistant and impact-resistant properties.

Therefore, a continuing need exists for methods of manufacturing 3D articles, and in particular 3D glass articles, having complex shapes and desirable optical and mechanical properties.

BRIEF SUMMARY

The present disclosure is directed to reforming a sheet of material, and in particular a glass sheet, using vacuum pressure. Vacuum reforming methods described herein can reform glass sheets into non-developable shapes without wrinkling or breakage. Embodiments described herein utilize vacuum pressure to create a vacuum-tight seal and hold a glass sheet in place during reforming. By utilizing vacuum pressure to hold the glass sheet during reforming, the glass sheet can be free to move and deform during reforming, during cooling, and during demolding. The free movement of the glass sheet facilitates reforming of the glass sheet into a non-developable shape without introducing undesirable stresses into the glass sheet, which can result in optical distortion or glass breakage.

A first aspect (1) of the present application is directed to a method for reforming a glass sheet, the method comprising placing a glass sheet over a vacuum mold, the vacuum mold comprising a vacuum cavity, and a frame disposed around the vacuum cavity and comprising a top surface comprising one or more vacuum openings formed in the top surface; heating the glass sheet to a reforming temperature; applying vacuum pressure to the one or more vacuum openings such that one or more first portions of the glass sheet are pulled into the one or more of vacuum openings; and applying vacuum pressure to the vacuum cavity such that a second portion of the glass sheet is pulled into the vacuum cavity.

In a second aspect (2), the top surface according to the first aspect (1) can comprise an exterior perimeter edge and the glass sheet can comprise a perimeter portion that extends outward from the exterior perimeter edge of the frame.

In a third aspect (3), heating the glass sheet to the reforming temperature according to the second aspect (2) can cause the perimeter portion of the glass sheet to fold around the exterior perimeter edge of the frame.

In a fourth aspect (4), the glass sheet according to the second aspect (2) or the third aspect (3) can comprise a perimeter shape comprising a first perimeter, the exterior perimeter edge comprises a shape comprising a second perimeter, and the first perimeter is greater than the second perimeter.

In a fifth aspect (5), the one or more vacuum openings according to any one of aspects (1)-(4) can comprise a plurality of vacuum openings and vacuum pressure is applied to the plurality of vacuum openings such that a plurality of first portions of the glass sheet are pulled into the plurality of vacuum openings.

In a sixth aspect (6), the glass sheet according to the fifth aspect (5) can comprise a thickness measured before reforming the glass sheet, the plurality of vacuum openings comprise a through hole having an effective diameter, and the effective diameter of the through holes is 10 to 15 times greater than the thickness of the glass sheet.

In a seventh aspect (7), the thickness of the glass sheet according to the sixth aspect (6) can range from 0.5 millimeters to 10 millimeters, and the effective diameter of the through holes can range from 5 millimeters to 120 millimeters.

In an eighth aspect (8), the thickness of the glass sheet according to the sixth aspect (6) can range from 0.5 millimeters to 5 millimeters, and the effective diameter of the through holes can range from 10 millimeters to 50 millimeters.

In a ninth aspect (9), the plurality of vacuum openings according to any one of aspects (5)-(8) can comprise a through hole having an effective diameter, the plurality of vacuum openings are radially spaced around the vacuum cavity and are spaced apart from each other by a spacing distance, and the spacing distance is greater than or equal to the effective diameter and less than or equal to three times the effective diameter.

In a tenth aspect (10), the glass sheet according to any one of aspects (1)-(9) is not mechanically clamped to the top surface of the frame during reforming of the glass sheet.

In an eleventh aspect (11), the second portion of the glass sheet according to any one of aspects (1)-(10) can comprise an initial thickness (t1) before reforming the glass sheet and a final thickness (t2) after reforming the glass sheet, and wherein t1/t2 ranges from 1.1 to 2.

In a twelfth aspect (12), in the method according to any one of aspects (1)-(11), vacuum pressure can be applied to the one or more vacuum openings before vacuum pressure is applied to the vacuum cavity.

In a thirteenth aspect (13), in the method according to any one of aspects (1)-(12), a first vacuum source applies vacuum pressure to the vacuum cavity, and a second vacuum source applies vacuum pressure to the one or more vacuum openings.

In a fourteenth aspect (14), the frame according to any one of aspects (1)-(13) can be coupled to a vacuum box defining a vacuum chamber, and wherein the vacuum cavity is defined by a mold disposed in the vacuum chamber.

In a fifteenth aspect (15), the vacuum cavity according to any one of aspects (1)-(14) can be defined by a mold comprising a mold surface and one or more vacuum holes formed in the mold surface.

In a sixteenth aspect (16), the mold surface according to the fifteenth aspect (15) can comprise a material selected from the group consisting of graphite, boron nitride, silica soot, calcium carbonate, carbon soot, molybdenum disulfide, and tungsten disulfide.

In a seventeenth aspect (17), in the method according to the fifteenth aspect (15) or the sixteenth aspect (16), the mold surface can comprise a first material comprising a first coefficient of thermal expansion, the glass sheet can comprise a second material comprising a second coefficient of thermal expansion, the top surface of the frame can comprise a third material comprising a third coefficient of thermal expansion, the third coefficient of thermal expansion is greater than the second coefficient of thermal expansion, and the second coefficient of thermal expansion is greater than the first coefficient of thermal expansion.

In an eighteenth aspect (18), in the method according to any one of aspects (15)-(17), applying vacuum pressure to the vacuum cavity pulls the second portion of the glass sheet against the mold surface of the mold.

In a nineteenth aspect (19), the reforming method according to any one of aspects (1)-(18) can comprise placing a plurality of glass sheets over a vacuum mold and simultaneously reforming the plurality of glass sheets.

In a twentieth aspect (20), the glass sheet according to any one of aspects (1)-(19) can comprise a top glass layer and a bottom glass layer, and the method further comprises removing the bottom glass layer after reforming the glass sheet.

In a twenty-first aspect (21), the bottom glass layer according to the twentieth aspect (20) can be removed using an etching process.

A twenty-second aspect (22) of the present application is directed to an apparatus for reforming a glass sheet, the apparatus comprising a vacuum cavity; a frame disposed around the vacuum cavity and comprising a top wall comprising a top surface, and one or more vacuum openings, each vacuum opening comprising a through hole formed in the top wall and a stop wall disposed vertically below the through hole and intersecting a central axis of the through hole; and one or more vacuum sources in fluid communication with the vacuum cavity and the one or more vacuum openings.

In a twenty-third aspect (23), the through hole according to the twenty-second aspect (22) can have an effective diameter, a top surface of the stop wall is vertically spaced from the top surface of the top wall by a depth, and the depth is less than or equal to one half of the effective diameter.

In a twenty-fourth aspect (24), the one or more vacuum sources according to the twenty-second aspect (22) or the twenty-third aspect (23) can comprise a first vacuum source in fluid communication with the vacuum cavity and a second vacuum source in fluid communication with the one or more vacuum holes.

In a twenty-fifth aspect (25), the one or more vacuum openings according to any one of aspects (22)-(24) can comprise a plurality of vacuum openings disposed radially about the vacuum cavity.

A twenty-sixth aspect (26) of the present application is directed to a reformed glass article comprising a non-developable curved shape defined by a convex curved surface and a concave curved surface, the curved shape comprising a convex surface area of 60,000 mm² or more; a thickness measured between the convex surface and the concave surface; a thickness uniformity of +/−50 microns per 100 mm; and a maximum compressive strain of less than 1%.

In a twenty-seventh aspect (27), the curved shape according to the twenty-sixth aspect (26) can comprise an optical power distortion measured through the thickness below 300 millidiopters in absolute value, the optical power distortion being measured in accordance with DIN 52305:1995.

A twenty-eighth aspect (28) of the present application is directed to apparatus for reforming a glass sheet, the apparatus comprising: a monolithic vacuum mold comprising a vacuum cavity comprising a mold surface and one or more vacuum holes formed on the mold surface, and a frame disposed around the vacuum cavity, the frame comprising a top surface and a plurality of vacuum openings formed in the top surface; a first vacuum source in fluid communication with the one or more vacuum holes; and a second vacuum source in fluid communication with the plurality of vacuum openings.

In a twenty-ninth aspect (29), the frame according to the twenty-eighth aspect (28) can further comprises a channel formed in the top surface and fluidly connecting the plurality of vacuum openings.

In a thirtieth aspect (30), the channel according to the twenty-ninth aspect (29) can comprise a plurality of channel portions connecting two adjacent vacuum openings, each channel portion comprising a top edge connected to the top surface, and a sidewall extending from the top edge to a bottom surface of the channel, and the sidewall comprises a slope angle in a range of 5° to 20°, the slope angle measured relative to an axis perpendicular to the bottom surface of the channel.

In a thirty-first aspect (31), each of the plurality of vacuum openings according to the twenty-ninth aspect (29) or the thirtieth aspect (30) can comprise a bottom surface, and the channel comprises a first portion extending through each of the plurality of vacuum openings and a second portion disposed below the bottom surface of each of the plurality of vacuum openings.

In a thirty-second aspect (32), the plurality of vacuum openings according to any one of aspects (28)-(31) can comprise a top perimeter edge connected to the top surface, and a perimeter sidewall extending from the top perimeter edge to a bottom surface of the vacuum opening, and the perimeter sidewall comprises a slope angle in a range of 5° to 20°, in the slope angle measured relative to an axis perpendicular to the bottom surface of the vacuum opening.

In a thirty-third aspect (33), the top surface of the frame according to any one of aspects (28)-(32) can comprise an exterior perimeter edge and a bump located at the exterior perimeter edge, the bump comprising a height in a range of 0.3 mm to 2 mm, the height measured relative to a portion of the top surface immediately adjacent to the bump.

In a thirty-fourth aspect (34), the mold surface according to any one of aspects (28)-(33) can comprise a central surface region having a first maximum radius of curvature, and a perimeter surface region adjacent the central surface region and having a second maximum radius of curvature less than the first maximum radius of curvature.

In a thirty-fifth aspect (35), the second maximum radius of curvature according to the thirty-fourth aspect (34) can be at least 5% less than the first maximum radius of curvature.

In a thirty-sixth aspect (36), the central surface region according to the thirty-fourth aspect (34) or the thirty-fifth aspect (35) can comprise a surface area of 60,000 mm² or more.

In a thirty-seventh aspect (37), the mold surface according to any one of aspects (34)-(36) can comprise a slot formed in the mold surface and demarcating the central surface region from the perimeter surface region.

In a thirty-eighth aspect (38), the slot according to the thirty-seventh aspect (37) can comprise a width in a range of 1 mm to 4 mm and a depth of 1 mm or less.

In a thirty-ninth aspect (39), the one or more vacuum holes according to any one of aspects (34)-(38) can be formed in the perimeter surface region.

In a fortieth aspect (40), there are no vacuum holes formed in the central surface region of the apparatus according to any one of aspects (34)-(39).

In a forty-first aspect (41), the mold surface according to any one of aspects (28)-(40) can comprise a contact indicator, the contact indicator selected from the group consisting of a raised dimple and a contact sensor.

In a forty-second aspect (42), the mold surface according to the forty-first aspect (41) can comprise a central surface region having a first maximum radius of curvature, and a perimeter surface region adjacent the central surface region and having a second maximum radius of curvature less than the first maximum radius of curvature, and the contact indicator is located on the perimeter surface region.

In a forty-third aspect (43), the apparatus according to any one of aspects (28)-(42) can comprise a cooling block in contact with a bottom surface of the mold opposite the mold surface.

In a forty-fourth aspect (44), the mold surface according to the forty-third aspect (43) can comprise a central surface region having a first maximum radius of curvature, and a perimeter surface region adjacent the central surface region and having a second maximum radius of curvature less than the first maximum radius of curvature, and the cooling block is in contact with the bottom surface of the mold opposite the central surface region.

A forty-fifth aspect (45) of the present application is directed to a method for reforming a glass sheet, the method comprising: placing a glass sheet over the monolithic vacuum mold of any one of aspects (28)-(44) such that a plurality of first portions of the glass sheet are disposed over the plurality vacuum openings formed in the top surface the vacuum mold and a second portion of the glass sheet is disposed over the vacuum cavity of the vacuum mold; heating the glass sheet to a reforming temperature; applying vacuum pressure to the plurality of vacuum openings such that the plurality of first portions of the glass sheet are pulled into the plurality of vacuum openings; and applying vacuum pressure to the vacuum cavity such that the second portion of the glass sheet is pulled into the vacuum cavity.

In a forty-sixth aspect (46), the frame of the vacuum mold according to the forty-fifth aspect (45) can comprise a channel formed in the top surface, the channel fluidly connecting the plurality of vacuum openings, and applying vacuum pressure to the plurality of vacuum openings pulls a third portion of the glass sheet into the channel.

In a forty-seventh aspect (47), the top surface of the vacuum mold according to the forty-fifth aspect (45) or the forty-sixth aspect (46) can comprise an exterior perimeter edge and the glass sheet can comprise a plurality of perimeter portions that extend outward from the exterior perimeter edge of the frame when the glass sheet is disposed over the vacuum mold.

In a forty-eighth aspect (48), heating the glass sheet to the reforming temperature in the method according to the forty-seventh aspect (47) can cause the perimeter portions of the glass sheet to fold around the exterior perimeter edge of the frame.

In a forty-ninth aspect (49), the glass sheet according to any one of aspects (45)-(48) is not mechanically clamped to the top surface of the frame during reforming of the glass sheet.

In a fiftieth aspect (50), the vacuum pressure can be applied to the plurality of vacuum openings before the vacuum pressure is applied to the vacuum cavity in the method according to any one of aspects (45)-(49).

In a fifty-first aspect (51), a first vacuum source can apply the vacuum pressure to the vacuum cavity, and a second vacuum source can apply the vacuum pressure to the one or more vacuum openings in the according to any one of aspects (45)-(50).

In a fifty-second aspect (52), applying the vacuum pressure to the vacuum cavity in the method according to any one of aspects (45)-(51) can pull the second portion of the glass sheet against the mold surface of the mold.

In a fifty-third aspect (53), the mold surface according to any one of aspects (45)-(52) can comprise a central surface region having a first maximum radius of curvature, and a perimeter surface region adjacent the central surface region and having a second maximum radius of curvature less than the first maximum radius of curvature, a surface temperature of the central surface region comprises a first maximum temperature during reforming and the perimeter surface region comprises a second maximum temperature during reforming, and the first maximum temperature is 20° ° C. to 50° ° C. less than the second maximum temperature.

A fifty-fourth aspect (54) of the present application is directed to a reformed glass article comprising a non-developable curved shape defined by a convex curved surface and a concave curved surface, the curved shape comprising a convex surface area of 60,000 mm² or more; a thickness measured between the convex surface and the concave surface; a thickness uniformity of +/−50 microns per 100 mm; a maximum compressive strain of less than 1%; and a convex curved surface measurable dimple density of less than 10 dimples per 100 mm² convex surface area, where a measurable dimple comprises an effective diameter of greater than 1 mm.

In a fifty-fifth aspect (55), the curved shape according to the fifty-fourth aspect (54) can comprise an optical power distortion measured through the thickness below 300 millidiopters in absolute value, the optical power distortion being measured in accordance with DIN 52305:1995.

A fifty-sixth aspect (56) of the present disclosure is directed to a reformed glass article, comprising: a first glass layer comprising a first non-developable curved shape defined by a first curved surface and a second curved surface, wherein: at least one of the first curved surface and the second curved surface comprises a surface area of 60,000 mm² or more; a thickness of the first glass layer, measured as a distance between the first curved surface and the second curved surface in a direction perpendicular to the first curved surface, has a uniformity of +/−75 microns per 1000 mm² of surface area on the first curved surface; and the first non-developable curved shape comprises a maximum compressive strain shape parameter, as measured between an imaginary central surface disposed between the first curved surface and the second curved surface and an imaginary surface, of greater than or equal to 3.0%.

A fifty-seventh aspect (57) of the present disclosure pertains to a reformed glass article according to the fifty-sixth aspect (56), wherein the curved shape comprises an optical power distortion measured through the thickness below 300 millidiopters in absolute value, the optical power distortion being measured in accordance with DIN 52305: 1995.

A fifty-eighth aspect (58) of the present disclosure pertains to a reformed glass article according to the fifty-sixth aspect (56), wherein one of the first curved surface and the second curved surface is a convex curved surface comprising measurable dimple density of less than 10 dimples per 100 mm$^2$ convex surface area, wherein a measurable dimple comprises an effective diameter of greater than 1 mm.

A fifty-ninth aspect (59) of the present disclosure pertains to a reformed glass article according to the fifty-sixth aspect (56), wherein the thickness has a uniformity of +/−50 microns per 1000 mm$^2$ of surface area on the first curved surface.

A sixtieth aspect (60) of the present disclosure pertains to a reformed glass article according to the fifty-sixth aspect (56), wherein the maximum compressive strain shape parameter is greater than or equal to 5.0%.

A sixty-first aspect (61) of the present disclosure pertains to a reformed glass article according to the fifty-sixth aspect (56), wherein an average value of the thickness, measured over an entirety of the first surface, is greater than or equal to 0.5 mm and less than or equal to 2.5 mm.

A sixty-second aspect (62) of the present disclosure pertains to a reformed glass article according to the fifty-sixth aspect (56), wherein: the reformed glass article comprises a length (L) measured in a first direction extending parallel to the imaginary surface and a width (W) measured in a second direction extending parallel to the imaginary surface and perpendicular to the first direction, the imaginary central surface comprises an average Gaussian curvature $\kappa$, and $0.0725*\kappa*(1.0667-10.9477*e^{-3.3572*w/l})*l^2 \geq 3.0\%$.

A sixty-third aspect (63) of the present disclosure pertains to a reformed glass article according to the fifty-sixth aspect (56), wherein: a peripheral edge of the reformed glass article comprises is substantially circular-shaped and comprises a diameter D, representing a maximum distance between two points along the peripheral edge, the imaginary central surface comprises an average Gaussian curvature $\kappa$, and $0.0354*\kappa*D^2 \geq 3.0\%$.

A sixty-fourth aspect (64) of the present disclosure pertains to a reformed glass article according to the fifty-sixth aspect (56), further comprising a second glass layer disposed on the first glass layer, the second glass layer comprising a second non-developable curved shape defined by a third curved surface and a fourth curved surface, wherein: at least one of the third curved surface and the fourth curved surface comprises a surface area of 60,000 mm$^2$ or more; a thickness of the second glass layer, measured as a distance between the first curved surface and the second curved surface in a direction perpendicular to the first curved surface, has a uniformity of +/−75 microns per 1000 mm$^2$ of surface area on the first curved surface; and the second non-developable curved shape comprises a maximum compressive strain shape parameter, as measured between a second imaginary central surface disposed between the third curved surface and the fourth curved surface and an imaginary surface, of greater than or equal to 3.0%.

A sixty-fifth aspect (65) of the present disclosure pertains to a reformed glass article according to the sixty-fourth aspect (64), wherein a shape mismatch between the first glass layer and the second glass layer, measured by a three-dimensional optical scanner using transmission optics, is less than or equal to 2.0 mm as measured over an entirety of the first curved surface.

A sixty-sixth aspect (66) of the present disclosure pertains to a reformed glass article according to the sixty-fifth aspect (65), wherein the shape mismatch is less than or equal to 1.0 mm over at least 80% of the surface area of the first curved surface.

A sixty-seventh aspect (67) of the present disclosure pertains to a reformed glass article according to the sixty-fourth aspect (64), wherein the first glass layer and the second layer comprise the same composition and average thicknesses of the first glass layer and the second glass layer are within 2% of one another.

A sixty-eighth aspect (68) of the present disclosure pertains to a reformed glass article according to the sixty-fourth aspect (64), wherein the first glass layer and the second layer comprise differ from one another in at least one of thickness, composition and surface compressive stress.

A sixty-ninth aspect (69) of the present disclosure pertains to a method of forming a curved glass article, the method comprising: placing a first glass sheet over a vacuum mold at least partially defining a vacuum cavity, wherein the first glass sheet is placed on the vacuum mold such that the glass sheet contacts a top surface of the vacuum mold or a frame disposed around vacuum cavity, wherein the top surface comprises one or more vacuum openings formed therein; heating the glass sheet to a reforming temperature; applying vacuum pressure to the one or more vacuum openings such that one or more first portions of the glass sheet are pulled into the one or more of vacuum openings; and applying vacuum pressure to the vacuum cavity such that a second portion of the first glass sheet is pulled into the vacuum cavity.

A seventieth aspect (70) of the present disclosure pertains to the method according to the sixth-ninth aspect (69), wherein: the top surface comprises an exterior perimeter edge, the glass sheet comprises a perimeter portion, and the glass sheet is placed over the vacuum mold such that the perimeter portion extends outward from the exterior perimeter edge, and heating the glass sheet to the reforming temperature causes the perimeter portion of the glass sheet to fold around the exterior perimeter edge of the frame.

A seventy-first aspect (71) of the present disclosure pertains to the method according to the sixth-ninth aspect (69), wherein the one or more vacuum openings comprise a plurality of vacuum openings and wherein vacuum pressure is applied to the plurality of vacuum openings such that a plurality of first portions of the glass sheet are pulled into the plurality of vacuum openings.

A seventy-second aspect (72) of the present disclosure pertains to the method according to the seventy-first aspect (71), wherein the glass sheet comprises a thickness measured before reforming the glass sheet, wherein the plurality of vacuum openings comprise a through hole having an effective diameter, and wherein the effective diameter of the through holes is 10 to 15 times greater than the thickness of the glass sheet.

A seventy-third aspect (73) of the present disclosure pertains to the method according to the seventy-second aspect (72), wherein the thickness of the glass sheet ranges from 0.5 millimeters to 5 millimeters, and wherein the effective diameter of the through holes ranges from 10 millimeters to 50 millimeters.

A seventy-fourth aspect (74) of the present disclosure pertains to the method according to the seventy-second aspect (72), wherein the plurality of vacuum openings comprise a through hole having an effective diameter, wherein the plurality of vacuum openings are radially spaced around the vacuum cavity and are spaced apart from each other by a spacing distance, and wherein the spacing distance is greater than or equal to the effective diameter and less than or equal to three times the effective diameter.

A seventy-fifth aspect (75) of the present disclosure pertains to the method according to the sixty-ninth aspect (69), wherein the second portion of the glass sheet comprises an initial thickness (t1) before reforming the glass sheet and a final thickness (t2) after reforming the glass sheet, and wherein t1/t2 ranges from 1.1 to 2.

A seventy-sixth aspect (76) of the present disclosure pertains to the method according to the sixty-ninth aspect (69), wherein vacuum pressure is applied to the one or more vacuum openings before vacuum pressure is applied to the vacuum cavity.

A seventy-seventh aspect (77) of the present disclosure pertains to the method according to the sixty-ninth aspect (69), wherein: the vacuum cavity is defined by a mold comprising a mold surface and one or more vacuum holes formed in the mold surface, and the mold surface comprises a material selected from the group consisting of graphite, boron nitride, silica soot, calcium carbonate, carbon soot, molybdenum disulfide, and tungsten disulfide.

A seventy-eighth aspect (78) of the present disclosure pertains to the method according to the seventy-seventh aspect (77), wherein: the mold surface comprises a first material comprising a first coefficient of thermal expansion, the glass sheet comprises a second material comprising a second coefficient of thermal expansion, the top surface of the frame comprises a third material comprising a third coefficient of thermal expansion, the third coefficient of thermal expansion is greater than the second coefficient of thermal expansion, and the second coefficient of thermal expansion is greater than the first coefficient of thermal expansion.

A seventy-ninth aspect (79) of the present disclosure pertains to the method according to the sixty-ninth aspect (69), wherein the reforming method comprises placing a plurality of glass sheets over the vacuum mold and simultaneously reforming the plurality of glass sheets.

An eightieth aspect (80) of the present disclosure pertains to the method according to the seventy-ninth aspect (79), wherein: the plurality of glass sheets comprises a bottom glass layer that is in contact with the top surface and a top glass layer disposed on the bottom glass layer such that the bottom glass layer is disposed between the top glass layer and the top surface, and the method further comprises forming a plurality of vacuum vias in the bottom glass layer prior to placing the plurality of glass sheets over the vacuum mold.

An eighty-first aspect (81) of the present disclosure pertains to the method according to the eightieth (80), wherein: the vacuum cavity is defined by a mold comprising a mold surface and one or more vacuum holes formed in the mold surface, the mold surface comprises a central surface region having a first maximum radius of curvature, and a perimeter surface region adjacent the central surface region and having a second maximum radius of curvature less than the first maximum radius of curvature, the method further comprises removing excess material from the plurality of glass sheets after the heating and applying the vacuum pressure, wherein the removal occurs along a contour in the plurality of glass layers that is disposed on a boundary between the perimeter surface region and the central surface region during the heating, and the plurality of glass sheets are positioned on the mold such that the plurality of vacuum vias are disposed outside of the boundary on the perimeter surface region after the heating and applying the vacuum pressure.

An eighty-second aspect (82) of the present disclosure pertains to the method according to the eighty-first aspect (81), wherein the plurality of vacuum vias comprise central axes extending through one of the one or more vacuum holes after the heating and applying the vacuum pressure.

An eighty third aspect (83) of the present disclosure pertains to an apparatus for reforming a glass sheet, the apparatus comprising: a monolithic vacuum mold comprising: a vacuum cavity comprising a mold surface and one or more vacuum holes formed on the mold surface, and a frame disposed around the vacuum cavity, the frame comprising a top surface and a plurality of vacuum openings formed in the top surface; a first vacuum source in fluid communication with the one or more vacuum holes; and a second vacuum source in fluid communication with the plurality of vacuum openings.

An eighty-fourth aspect (84) of the present disclosure pertains to the apparatus according to the eighty third aspect (83), wherein the frame further comprises a channel formed in the top surface and fluidly connecting the plurality of vacuum openings.

An eighty-fifth aspect (85) of the present disclosure pertains to the apparatus according to the eighty fourth aspect (84), wherein the channel comprises a plurality of channel portions connecting two adjacent vacuum openings, each channel portion comprising a top edge connected to the top surface, and a sidewall extending from the top edge to a bottom surface of the channel, and wherein the sidewall comprises a slope angle in a range of 5° to 20°, the slope angle measured relative to an axis perpendicular to the bottom surface of the channel.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 4 illustrates a method according to some embodiments.

FIG. 18 shows a flow diagram of a method of forming a laminate including co-forming a stack of glass layers on a vacuum mold according to some embodiments.

DETAILED DESCRIPTION

Figure 1A:
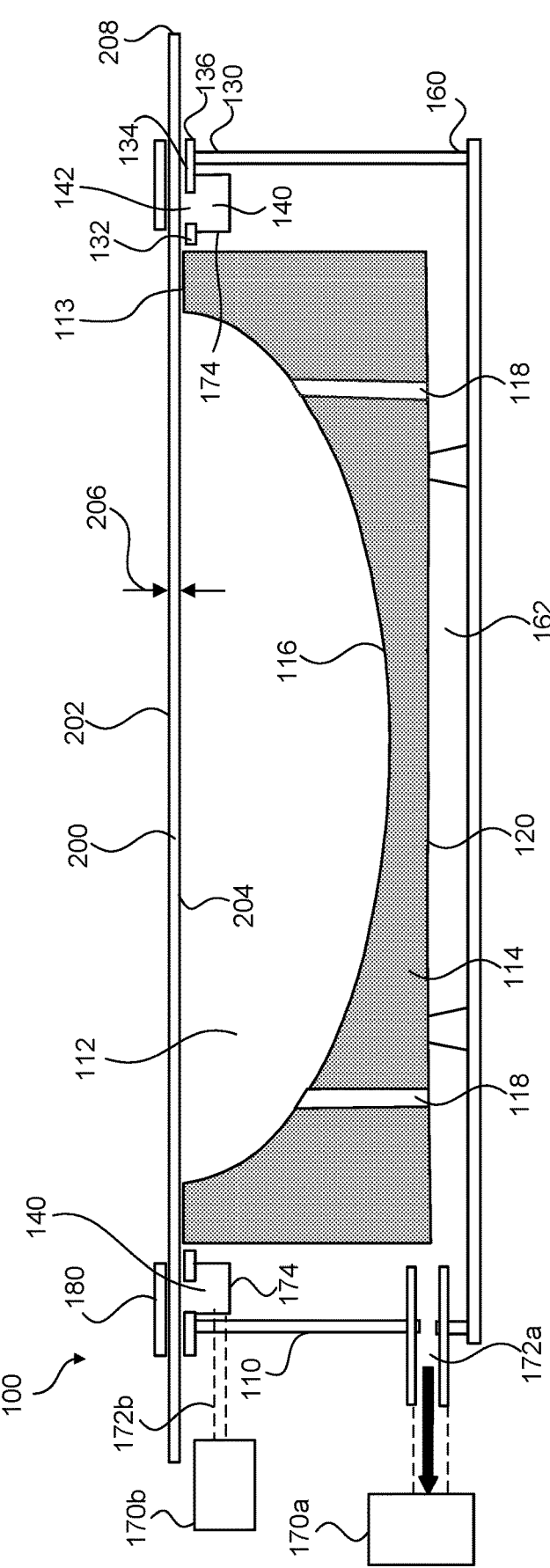
FIGS. 1A and 1B show an apparatus for reforming a sheet of material according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glass articles having a non-developable curvature can be used in a variety of applications in which a transparent surface having a non-developable curvature is desired. Glass articles having a non-developable curvature can provide desirable optical and mechanical properties while also providing the desired curvature.

As used herein, the terms "non-developable curvature" or "non-zero Gaussian curvature" means a curvature with crossed radii that cannot be formed with a sheet of paper by bending without also stretching, tearing, or wrinkling the paper. Exemplary non-developable curvatures include, but are not limited to, spherical curvatures, spheroid curvatures, partially spheroid curvatures, and three-dimensional saddle curvatures. A "developable curvature" or a "zero Gaussian curvature" means a curvature that can be formed with a sheet of paper by bending alone. Exemplary developable curvatures include, but are not limited to, cylindrical and conical curvatures.

Reforming processes described herein facilitate the formation of glass articles having non-developable curvatures, suitable optical properties, and suitable mechanical properties. The reforming processes utilize vacuum forming techniques to make reformed glass articles having a non-developable curved shape. The non-developable curved shape can be created while maintaining thickness uniformity in the curved shape and avoiding wrinkling in the glass. By facilitating thickness uniformity and avoiding wrinkling, a non-developable curved shape with desirable optical and mechanical properties can be formed. Moreover, by facilitating thickness uniformity and avoiding wrinkling, a non-developable curved shape having a large convex surface area (e.g., a surface area greater than or equal to 10,000 $mm^2$, greater than or equal to 20,000 $mm^2$, greater than or equal to 30,000 $mm^2$, or greater than or equal to 60,000 $mm^2$) can be created with introducing optical or mechanical defects.

Conventional three-dimensional reforming by sagging on a frame is known for reforming glass for some applications. However, reforming of glass sheets to a curved shape having a small radius, a combination of radii, curved edges, and/or complex contour (e.g., a non-developable shape) using conventional sagging techniques is challenging. The formation of these types of curved shapes using conventional sagging techniques can require the use of mechanisms that tend to create glass wrinkling and/or reformed glass with mechanical or optical defects. Deep Gaussian three-dimensional reforming using conventional sagging techniques results in a high level of glass deformation within its thickness (e.g. 15%, 20%, or 30% local thinning), which can be problematic for optical and mechanical properties.

Conventional sagging techniques can also result in a high level of compressive strain in a reformed glass article. The level of complexity of a 3D shape can be determined by the strain required to go from the target 3D CAD (computer-aided design) of the shaped part to a flat part. This can be achieved by computer modeling using known modeling software. Typically, a model can determine a strain map for the target 3D part showing areas where tensile strain is required, which means that some level of expansion of the material is needed, and other areas were compressive strain is required, which means that some level of material gathering is needed to go from the 3D part to a flat part. High levels of compressive strain in traditional reforming of flat glass is likely to generate wrinkling type of defects. Relatedly, high levels of tensile strain would require either a reforming long time, a very low material viscosity, or an excessively large force to generate the required level of deformation.

Vacuum-forming techniques described herein can create glass articles having complex curvatures, as quantified by the maximum compressive strain shape parameter described herein, without generating glass wrinkling or breakage. Vacuum-forming techniques described herein can include vacuuming reforming a glass sheet using a vacuum mold with one or more side retention mechanisms that prevent glass wrinkling during deep Gaussian deformation of the glass for creating a non-developable curved shape. The one or more side retention mechanism can include a vacuum opening designed to hold the glass sheet in place during vacuum forming while also facilitating free movement of the glass sheet, thus preventing the formation of wrinkles during deformation. The one or more side retention mechanisms can be a self-release retaining mechanism that helps prevent breakage of a reformed glass sheet during cooling and demolding.

Vacuuming forming techniques described herein offer one or more of the following advantageous features. In one or more embodiments, the vacuum pressure forming allows the progressive local expansion of a glass sheet up to a final highly non-developable three-dimensional (3D) shape without wrinkling. In one or more embodiments, the vacuum pressure forming allows the progressive local expansion of the glass sheet up to a final highly non-developable 3D shape without significant localized thickness reduction. In one or more embodiments, the combination of a positive mold and vacuum pressure forming allows the progressive local expansion of the glass sheet up to a final highly non-developable 3D shape with a high level of control for the final shape. In one or more embodiments, one side of the glass article can remain untouched during vacuum forming, thus reducing the possibility of defects. In one or more embodiments, the side retention mechanisms can prevent glass bucking, which can lead to vacuum leakage and incomplete reformation of the glass sheet. In one or more embodiments, the side retention mechanisms can prevent glass-sliding motion during reforming, which can result in scuffmarks affecting the aesthetical and optical properties of the reformed glass. In one or more embodiments, multiple glass sheets can be reformed simultaneously.

In some embodiments, vacuum-forming techniques described herein can include a vacuum cavity with a mold, and the glass sheet is pulled against a surface of the mold during reforming. The surface of the mold can be composed of a non-stick material tailored to prevent the formation of the defects on the reformed glass. In some embodiments, the glass sheet can be reformed without being pulled against a surface of a mold during reforming. In such embodiments, the glass sheet can be reformed by controlling the vacuum pressure, time, and temperature of the reforming process to "free-form" the glass sheet in a vacuum cavity.

In some embodiments, the vacuum-forming techniques described herein can be used to reform multi-layer glass sheets. The multi-layer glass sheets can include a first layer (e.g., top layer) formed of a first glass composition and a second layer (e.g., bottom layer) formed of a second glass composition. In some embodiments, one of the glass layers can be sacrificial layer that is removed after reforming the glass sheet. For example, the bottom layer of a multi-layer glass sheet that was in contact a mold surface during reforming can be removed after the reforming process is complete. In such embodiments, removal of the bottom glass layer can improve the surface quality of the reformed glass article because any defects on the mold surface transferred to the bottom glass layer are removed. In some cases, removal of a layer of a multi-layer glass sheet can reduce or eliminate costly surface finishing process, such as polishing processes. In some embodiments, an etching process can be used to remove a layer of a multi-layer glass sheet.

In some embodiments, the vacuum-forming techniques described herein can include a monolithic nonstick vacuum mold. The monolithic mold can include an integrally formed mold cavity and frame with side retention means.

In some embodiments, the vacuum mold can include a slot configured to facilitate cutting (for example, laser cutting) of a reformed glass sheet after vacuum forming. In some embodiments, the vacuum mold can include a vacuum cavity with multiple temperature zones for controlling the temperature of a glass sheet during reforming. In some embodiments, the vacuum mold can include a mold surface with one or more contact indicators to signal when a reformed glass sheet contacts the mold surface.

Figure 1B:
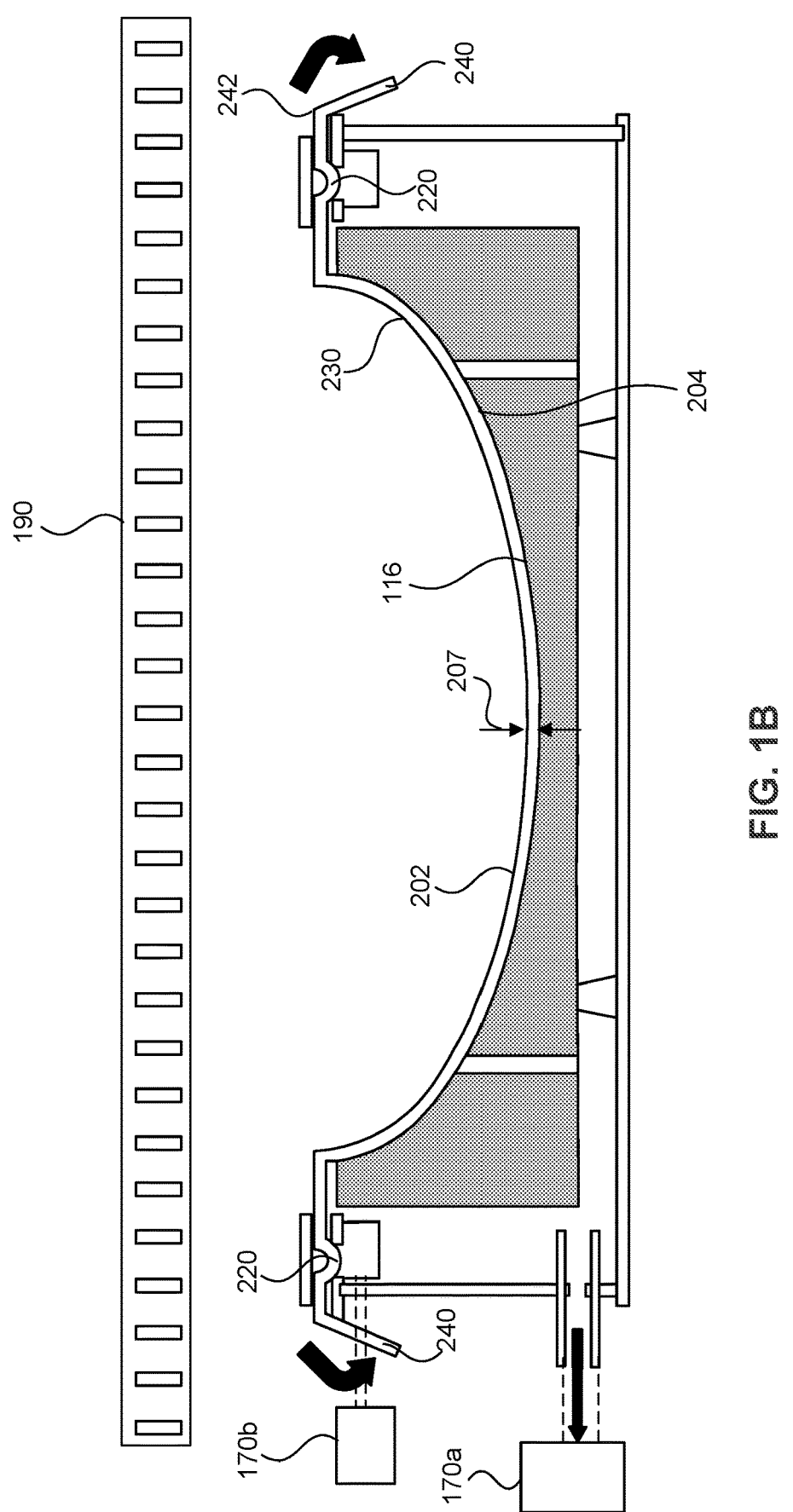

FIGS. 1A and 1B show an apparatus 100 for reforming a glass sheet 200 according to some embodiments. FIG. 1A shows glass sheet 200 before reforming. FIG. 1B shows glass sheet 200 after reforming according to some embodiments.

Glass sheet 200 has a top surface 202, a bottom surface 204 opposite top surface 202, and an initial thickness 206 (i.e., the thickness of the glass sheet 200 before reforming) measured between top surface 202 and bottom surface 204. Glass sheet 200 also includes a perimeter edge 208 defining a perimeter shape of glass sheet 200.

In some embodiments, initial thickness 206 of glass sheet 200 can range from 0.5 millimeters (mm) to 10 millimeters, including subranges. For example, in some embodiments, initial thickness 206 can range from 0.5 millimeters to 10 millimeters, 0.5 millimeters to 5 millimeters, 0.5 millimeters to 2.5 millimeters, 2.5 millimeters to 5 millimeters, 2.5 millimeters to 10 millimeters, or within a range having any two of these values as endpoints. In embodiments, the thickness 206 can range from 0.1 millimeters to 10 millimeters, from 0.2 millimeters to 10 millimeters, from 0.3 millimeters to 10 millimeters, from 0.4 millimeters to 10 millimeters, from 0.5 millimeters to 10 millimeters, from 0.6 millimeters to 10 millimeters, from 0.7 millimeters to 10 millimeters, from 0.8 millimeters to 10 millimeters, from 0.9 millimeters to 10 millimeters, from 1 millimeter to 10 millimeters, from 1.1 millimeters to 10 millimeters, from 1.2 millimeters to 10 millimeters, from 1.4 millimeters to 10 millimeters, from 1.5 millimeters to 10 millimeters, from 1.6 millimeters to 10 millimeters, from 1.8 millimeters to 10 millimeters, from 2 millimeters to 10 millimeters, from 2.1 millimeters to 10 millimeters, from 2.5 millimeters to 10 millimeters, from 3 millimeters to 10 millimeters, from 4 millimeters to 10 millimeters, from 5 millimeters to 10 millimeters, from 0.1 millimeters to 9 millimeters, from 0.1 millimeters to 8 millimeters, from 0.1 millimeters to 7 millimeters, from 0.1 millimeters to 6.5 millimeters, from 0.1 millimeters to 6 millimeters, from 0.1 millimeters to 5.5 millimeters, from 0.1 millimeters to 5 millimeters, from 0.5 millimeters to 4 millimeters, from 0.7 millimeters to 3.6 millimeters, from 0.7 millimeters to 3.3 millimeters, from 0.7 millimeters to 2.1 millimeters, from 0.7 millimeters to 1.6 millimeters, or from 0.7 millimeters to 1.1 millimeters, or within a range having any two of these values as endpoints.

Apparatus 100 includes a vacuum mold 110 having a vacuum cavity 112 in which glass sheet 200 can be reformed. In some embodiments, apparatus 100 can include one or more vacuum sources 170. Vacuum source(s) 170 can be, for example, a vacuum pump.

Vacuum mold 110 can include a frame 130 disposed around vacuum cavity 112. Frame 130 includes a top wall 132 having a top surface 134 and one or more vacuum openings 140. Each vacuum opening 140 includes a through hole 142 formed in top wall 132. Through hole(s) 142 can be formed in top surface 134 of frame 130 and extend through the thickness of top wall 132. Top surface 134 of frame 130 has an exterior perimeter edge 136 defining a perimeter shape of top surface 134.

In some embodiments, vacuum mold 110 can include one vacuum opening 140 disposed around vacuum cavity 112. In such embodiments, the vacuum opening 140 can include a through hole 142 having a full or partial ring-shape disposed around all or a portion of vacuum cavity 112. In some embodiments, vacuum mold 110 can include a plurality of vacuum openings 140 disposed around vacuum cavity 112.

The one or more vacuum sources 170 are in fluid communication with vacuum cavity 112 and the one or more vacuum openings 140 such that the one or more vacuum sources 170 can apply vacuum pressure to vacuum cavity 112, the one or more vacuum openings 140, or both.

In some embodiments, apparatus 100 can include one vacuum source 170a. In such embodiments, the vacuum source 170a can apply vacuum pressure to both vacuum cavity 112 and the one or more vacuum openings 140. Vacuum source 170a can apply vacuum pressure to vacuum cavity 112 and the one or more vacuum openings 140 simultaneously. In some embodiments, vacuum source 170a can apply vacuum pressure to vacuum cavity 112 and the one or more vacuum openings 140 sequentially. For example, vacuum source 170a can first apply vacuum pressure to the one or more vacuum openings 140, and while still applying vacuum pressure to the one or more vacuum openings 140, then apply vacuum pressure to vacuum cavity 112. A vacuum pipe 172a can connect vacuum source 170a to vacuum cavity 112 and the one or more vacuum openings 140.

In some embodiments, apparatus 100 can include a first vacuum source 170a in fluid communication with vacuum cavity 112 and a second vacuum source 170b in fluid communication with the one or more vacuum openings 140. In such embodiments, first vacuum source 170a can apply vacuum pressure to vacuum cavity 112 independent from second vacuum source 170b applying vacuum pressure to the one or more vacuum openings 140. First vacuum source 170a and second vacuum source 170b can simultaneously apply vacuum pressure to vacuum cavity 112 and the one more vacuum openings 140, respectively. In some embodiments, first vacuum source 170a can apply vacuum pressure to vacuum cavity 112 and second vacuum source 170b can apply vacuum pressure to the one or more vacuum openings 140 sequentially. For example, second vacuum source 170b can first apply vacuum pressure to the one or more vacuum openings 140, and while second vacuum source 170b is still applying vacuum pressure to the one or more vacuum openings 140, first vacuum source 170a can apply vacuum pressure to vacuum cavity 112.

In embodiments including first vacuum source 170a and second vacuum source 170b, a first vacuum pipe 172a can connect first vacuum source 170a to vacuum cavity 112 and a second vacuum pipe 172b can connect second vacuum source 170b to the one or more vacuum openings 140. In some embodiments, second vacuum pipe 172b can be connected to a vacuum distributor 174 configured to supply vacuum pressure to the one or more vacuum openings 140.

In some embodiments, apparatus 100 can include a vacuum box 160 defining a vacuum chamber 162. In such embodiments, frame 130 can be coupled to vacuum box 160. Frame 130 coupled to vacuum box 160 may be integrally formed with vacuum box 160 or mechanically coupled to vacuum box 160 via one or more mechanical fasteners (e.g., bolts or screws). In some embodiments, frame 130 may be integrally formed with vacuum box 160. In some embodiments, frame 130 may be a component of a mold 114 mechanically coupled to vacuum box 160. In some embodiments, frame 130 can be vertically adjustable to relative to vacuum cavity 112 to facilitate accurate adjustment of top surface 134 and a top surface 113 of vacuum cavity 112.

In some embodiments, vacuum cavity 112 can be defined by a mold 114 disposed in vacuum chamber 162. Mold 114 includes a mold surface 116 and can include one or more vacuum holes 118 formed in mold surface 116. Vacuum holes 118 can be through holes extending from mold surface 116 through mold 114 to a bottom surface 120 of mold 114. Vacuum holes 118 can be in fluid communication one or more vacuum sources 170 such that vacuum sources 170 can apply vacuum pressure to vacuum cavity 112 via vacuum holes 118.

Vacuum holes 118 can have a small diameter to minimize impact on bottom surface 204 of glass sheet 200 during reforming. In some embodiments, vacuum holes 118 can have a diameter ranging from 0.5 millimeters to 2 millimeters.

In some embodiments, the one or more vacuum openings 140 can be in fluid communication with vacuum chamber 162 of vacuum box 160.

In embodiments including mold 114, a second portion 230 of glass sheet 200 can be pulled against mold surface 116 during reforming. For example, as shown in FIG. 1B, second portion 230 of glass sheet 200 can be pulled against mold surface 116, thereby causing second portion 230 to take on the curvature of mold surface 116.

In some embodiments, vacuum cavity 112 may not include a mold 114. In such embodiments, glass sheet 200 can be reformed by controlling the vacuum pressure, time, and temperature within vacuum cavity 112 to "free-form" second portion 230 of glass sheet 200 in vacuum cavity 112.

Mold surface 116 can comprise a material that resists adhesion to glass sheet 200 during reformation. Exemplary materials for mold surface 116 include, but are not limited to graphite, boron nitride, silica soot, calcium carbonate, carbon soot, a refractory metallic alloy, molybdenum disulfide, or tungsten disulfide. In some embodiments, mold 114 may be formed of any of these materials. In some embodiments, any of these materials can be coated on mold 114 to define mold surface 116. For example, in some embodiments, mold 114 can be a made of a refractory metallic alloy coated with molybdenum disulfide or tungsten disulfide to define mold surface 116.

In some embodiments, bottom surface 204 of glass sheet 200 can be coated with one or more protecting layers to help prevent adhesion of glass sheet 200 to mold surface 116 and help prevent the introduction of mold-induced defects on bottom surface 204. Exemplary protecting layers are described in U.S. Pat. No. 10,364,175, which is hereby incorporated by reference in its entirety.

In some embodiments, the coefficients of thermal expansion (CTE) for the materials of mold surface 116, glass sheet 200, and top surface 134 of frame 130 can be tailored to help prevent glass adhesion, prevent glass sliding during reformation, and prevent glass breakage under differential shrinkage rates during cooling. In addition, the CTE for the materials of mold surface 116, glass sheet 200, and top surface 134 of frame 130 can be tailored to facilitate self-release of glass sheet 200 from both mold surface 116 and top surface 134.

As used herein, the term coefficient of thermal expansion or "CTE" refers to the coefficient of thermal expansion of the glass composition averaged over a temperature range from 20° ° C. to 300° ° C. Unless specified otherwise, a CTE for a layer is expressed in terms of $10^{-7}/°$ C. and is determined using a push-rod dilatometer in accordance with ASTM E228-11.

In some embodiments, mold surface 116 can comprise a first material comprising a first CTE, glass sheet 200 can comprise a second material comprising a second CTE, and top surface 134 of frame 130 can comprise a third material comprising a third CTE. The third CTE can be greater than the second CTE and the second CTE can be greater than the first CTE. In such embodiments, the differential shrinkage rates of the materials can facilitate self-release of glass sheet 200 from vacuum mold 110 without breakage.

In some embodiments, the CTE of the material of mold surface 116 can range from $35\times10^{-7}/°$ ° C. to $45\times10^{-7}/°$ C.

In some embodiments, the CTE of the material of glass sheet 200 can range from $70\times10^{-7}/°$ ° C. to $85\times10^{-7}/°$ C.

In some embodiments, the CTE of the material of top surface 134 of frame 130 can range from $110\times10^{-7}/°$ ° C. to $130\times10^{-7}/°$ C. In some embodiments, the material of top surface 134 of frame 130 can be a metallic material having a CTE ranging from $110\times10^{-7}/°$ ° C. to $130\times10^{-7}/°$ C.

In some embodiments, the CTE of the material of top surface 134 of frame 130 can range from $170\times10^{-7}/°$ ° C. to $180\times10^{-7}/°$ C. In some embodiments, the material of top surface 134 of frame 130 can be an austenitic stainless steel having a CTE ranging from $170\times10^{-7}/°$ C. to $180\times10^{-7}/°$ C.

In some embodiments, the one or more vacuum openings 140 can include a through hole 142 and a stop wall 150 disposed vertically below the through hole 142. Stop wall 150 can be disposed vertically below the through hole 142 such that when a first portion 220 of glass sheet 200 is pulled into a through hole 142, the first portion 220 contacts a top surface 154 of the stop wall 150. In some embodiments, stop wall 150 can be disposed vertically below the through hole 142 and intersect with a central axis 144 of the through hole 142. The central axis 144 of a through hole 142 is the vertical axis extending through the geometrical center of the through hole 142 in a direction perpendicular to top surface 134 of frame 130.

Figure 3A:
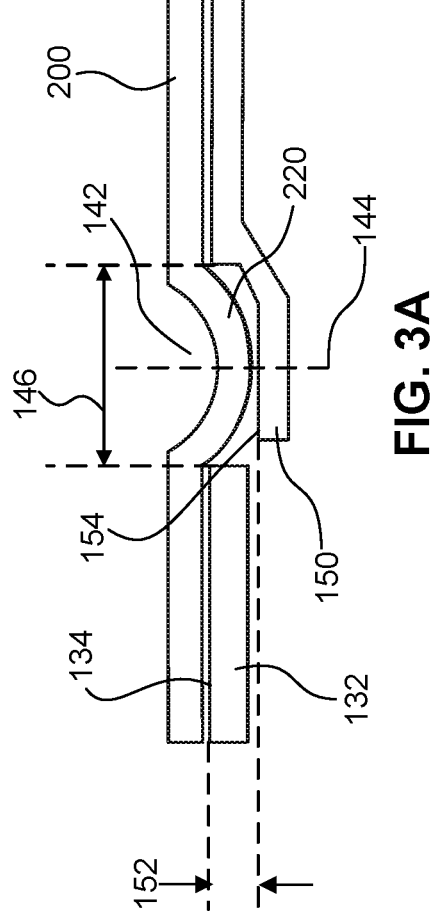
FIG. 3A shows a vacuum opening according to some embodiments.
Figure 3B:
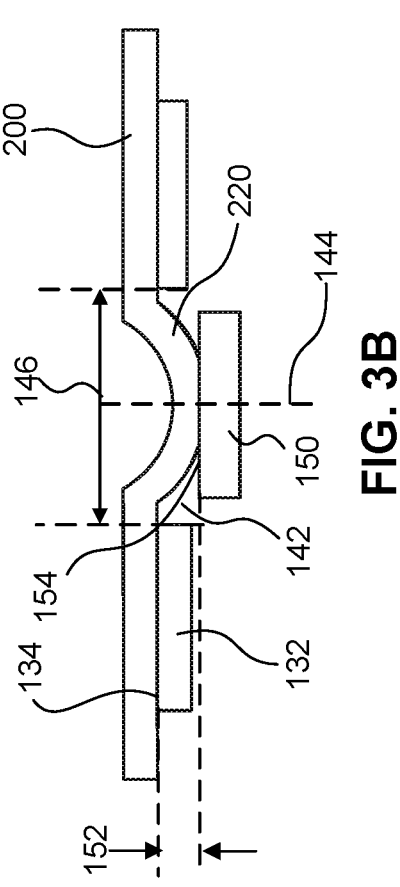
FIG. 3B shows a vacuum opening according to some embodiments.

FIGS. 3A and 3B show two exemplary vacuum opening 140 configurations according to some embodiments. FIG. 3A shows a vacuum opening 140 with a through hole 142 and a stop wall 150 in the form of a ledge extending from top wall 132 of frame 130 to a location vertically below the through hole 142. FIG. 3B shows a vacuum opening 140 with a through hole 142 and a stop wall 150 in the form of a separate wall located vertically below the through hole 142.

In some embodiments, a through hole 142 can have an effective diameter 146 and a top surface 154 of a stop wall 150 is vertically spaced from the top surface 134 of the top wall 132 by a depth 152. In such embodiments, the depth 152 can be less than or equal to one half (½) of the effective diameter 146. By positioning the top surface 154 of stop wall 150 at a depth 152 less than or equal to one half (½) of the effective diameter 146, the one or more vacuum openings 140 can prevent a first portion 220 of glass sheet 200 from being pulled too far into the through hole 142. If a first portion 220 is pulled too far into the through hole 142, this can cause glass breakage during cooling and/or demolding. In particular, a depth 152 less than or equal to one half (½) of the effective diameter 146 can prevent a first portion 220 from being pulled into a shape having an effective dimeter larger than the effective diameter 146 of a through hole 142. If a first portion 220 is pulled into a shape having an effective dimeter larger than the effective diameter 146 of through hole 142, a reformed glass sheet will become stuck in the through hole 142, and will thus be not be allowed to freely move during cooling and/or demolding, which can result in glass breakage.

As used herein, the term "effective diameter" is utilized to describe the size of a hole or opening, but this term should not be interpreted as requiring a hole or opening to have a circular diameter or shape. Instead, holes or openings may have non-circular shapes, and in such embodiments the term "effective diameter" is intended to refer to the maximum cross-sectional dimension of the shape. For example, the "effective diameter" of a hole or opening having an elliptical cross-sectional shape would be the length of the major axis of the elliptical shape. For a hole or opening having an effective diameter that varies along the depth of the hole or opening, the effective diameter is the largest effective diameter.

In some embodiments, the effective diameter 146 of the through holes 142 can range from 5 millimeters to 120 millimeters, including subranges. For example, in some embodiments, the effective diameter 146 of the through holes 142 can range from 5 millimeters to 120 millimeters, 5 millimeters to 100 millimeters, 5 millimeters to 50 millimeters, 5 millimeters to 30 millimeters, 5 millimeters to 10 millimeters, 10 millimeters to 30 millimeters, 10 millimeters to 50 millimeters, 10 millimeters to 100 millimeters, 10 millimeters to 120 millimeters, or within a range having any two of these values as endpoints.

Figure 2:
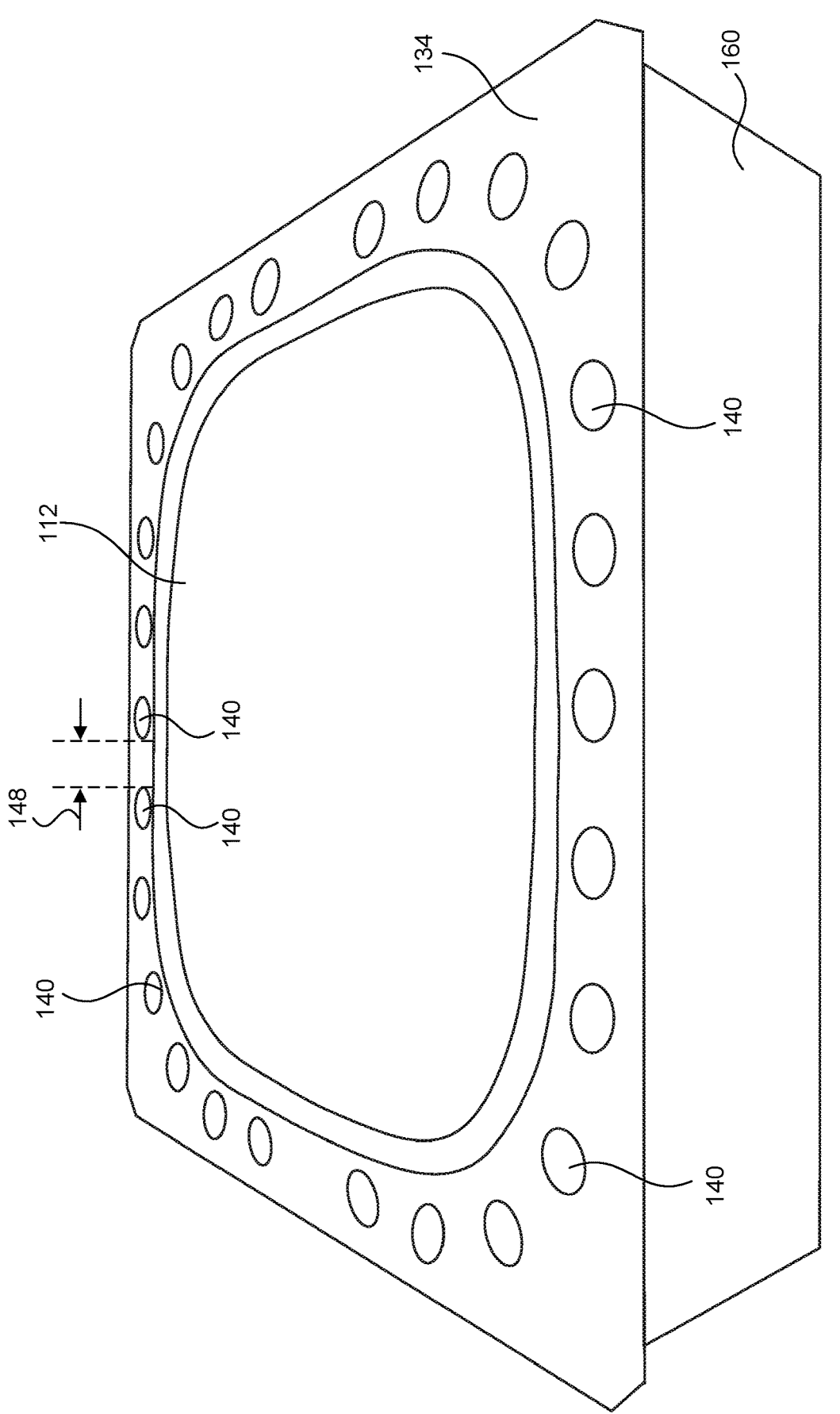
FIG. 2 shows a vacuum mold according to some embodiments.

In some embodiments, for example as shown in FIG. 2 the one or more vacuum openings 140 can include a plurality of vacuum openings 140 disposed radially about vacuum cavity 112. In some embodiments, the plurality of vacuum openings 140 disposed radially around vacuum cavity 112 can be spaced apart from each other by a spacing distance 148. Spacing distance 148 can be greater than or equal to the effective diameter 146 of the through holes 142 and less than or equal to three times the effective diameter 146 of the through holes 142. A spacing distance 148 within this range can facilitate reforming glass sheet 200 into a non-developable shape without wrinkling.

In some embodiments, the size of the through holes 142 can be selected based on the initial thickness 206 of the glass sheet 200. In some embodiments, the glass sheet 200 can have an initial thickness 206 and the through holes 142 can have an effective diameter 146 ten to fifteen times greater than the initial thickness 206. An effective diameter 146 that is ten to fifteen times greater than the initial thickness can allow a first portion 220 of glass sheet 200 to be pulled into a through hole without the application of excessively high vacuum pressure.

For example, in some embodiments, the initial thickness 206 of the glass sheet 200 can range from 0.5 millimeters to 10 millimeters and the effective diameter 146 of the through holes 142 can range from 5 millimeters to 120 millimeters. As another example, in some embodiments, the initial thickness 206 of the glass sheet 200 can range from 0.5 millimeters to 5 millimeters and the effective diameter 146 of the through holes 142 can range from 10 millimeters to 50 millimeters.

FIG. 4 illustrates a method 400 of reforming a glass sheet 200 according to some embodiments. Unless stated otherwise, the steps of method 400 need not be performed in the order set forth herein.

In step 402, glass sheet 200 is placed over vacuum mold 110. When glass sheet 200 is placed over vacuum mold 110, glass sheet can be positioned such that glass sheet 200 covers vacuum cavity 112 and bottom surface 204 of glass sheet 200 is in direct contact with top surface 134 of frame 130. In some embodiments, glass sheet 200 can be placed over vacuum mold 110 such that a perimeter portion 240 of glass sheet 200 extends outward from exterior perimeter edge 136 of frame 130. In some embodiments, glass sheet 200 can have a perimeter shape defined by perimeter edge 208 and having a first perimeter, and exterior perimeter edge 136 of frame 130 can have a shape having a second perimeter less than the first perimeter. The larger perimeter of perimeter edge 208 can result in perimeter portion 240 extending outward from exterior perimeter edge 136 of frame 130 when glass sheet 200 is placed over vacuum mold 110.

In some embodiments, step 402 can include placing multiple glass sheets 200 over vacuum mold 110. The plurality of glass sheets 200 can be placed over vacuum mold 110 in a stacked configuration. In such embodiments, method 400 can simultaneously reform the plurality of glass sheets 200.

In step 404, glass sheet 200 is heated to a reforming temperature. One or more heat sources 190 of apparatus 100 can heat glass sheet 200 to the reforming temperature. In some embodiments, the reforming temperature can range from 600° C. to 900° C. Exemplary heat sources 190 include convention heating devices and infrared (IR) heating devices. In some embodiments, a heat shield 180 can be placed on top surface 202 of glass sheet 200 during reforming to help control the temperature of glass sheet 200.

In some embodiments, heating glass sheet 200 to the reforming temperature in step 404 can cause perimeter portion 240 of glass sheet 200 to fold around exterior perimeter edge 136 of frame 130 under gravitational force. The folding of perimeter portion 240 around exterior perimeter edge 136 can help hold glass sheet 200 and prevent any lateral glass motion during the application of vacuum pressure in the reforming process. This facilitates controlled local deformation and elongation of second portion 230 of glass sheet 200 to create a reformed glass article without wriggling.

In some embodiments, heating glass sheet 200 in step 404 can cause perimeter portion 240 of glass sheet 200 to fold around exterior perimeter edge 136 at an angle 242 of less than 90°. For example, perimeter portion 240 of glass sheet 200 can fold around exterior perimeter edge 136 at an angle 242 ranging from 60° to 85°. In some embodiments, a perimeter lip around frame 130 can help prevent angle 242 from exceeding 90°.

In step 406, vacuum pressure can be applied to one or more vacuum openings 140. The vacuum pressure applied to the one or more vacuum openings 140 in step 406 can be sufficient to pull one or more first portions 220 of the glass sheet 200 into the one or more of vacuum openings 140. In embodiments including a plurality of vacuum openings 140, applying vacuum pressure to the plurality of vacuum openings 140 can pull a plurality of first portions 220 of glass sheet 200 into the plurality of vacuum openings 140.

In some embodiments, the vacuum pressure applied to the one or more vacuum openings 140 can range from 0.1 bars to 0.3 bars. In some embodiments, vacuum pressure can be applied to the one or more vacuum openings 140 in step 406 for a time ranging from 30 seconds to 120 seconds. In some embodiments, vacuum pressure can be applied to the one or more vacuum openings 140 at a rate of 5 liters per minute to 20 liters per minute.

The vacuum pressure applied in step 406 can seal glass sheet 200 to top surface 134 of frame 130, thus creating a vacuum tight seal around the perimeter of second portion 230 of glass sheet 200. Additionally, the vacuum pressure applied in step 406 can help hold glass sheet 200 and prevent any lateral glass motion during the application of vacuum pressure in the reforming process. This facilitates controlled local deformation and elongation of second portion 230 of glass sheet 200 to create a reformed glass article without wriggling.

In some embodiments, a weighted ring can be placed on top surface 202 of glass sheet 200 to help ensure a tight seal is created during step 406. In some embodiments, bottom surface 204 of glass sheet 200 can be forced in intimate contact with top surface 134 of frame 130 to help ensure a tight seal is created during step 406.

By utilizing vacuum pressure to hold glass sheet 200 in place during reforming, the reforming process can be performed without mechanically clamping glass sheet 200 to top surface 134 of frame 130 during reforming of glass sheet 200. By eliminating mechanical clamping, stresses imparted on glass sheet 200 during heating and cooling can be minimized. Excessive stress, for example mechanical stresses and/or thermal stresses created at the interface of the glass and clamping mechanisms can cause undesirable glass deformation and/or glass failure during heating and cooling. Additionally, the use of vacuum pressure to hold glass sheet 200 during reforming can eliminate the need for any mechanical release mechanisms, which can damage the glass when removing glass sheet 200 from vacuum mold 110. The one or more vacuum openings 140 described herein allow self-release of glass sheet 200 during cooling and demolding, thus minimizing stresses imparted on the glass.

In some embodiments, the vacuum pressure applied to the one or more vacuum openings 140 can be sufficient to pull one or more first portions 220 of glass sheet 200 through the through hole 142 of the one or more vacuum openings 140. In some embodiments, the vacuum pressure applied to the one or more vacuum openings 140 can be sufficient to pull one or more first portions 220 of the glass sheet 200 through the through hole 142 and into contact with top surface 154 of stop wall 150.

In step 408, vacuum pressure can be applied to vacuum cavity 112. The vacuum pressure applied to vacuum cavity 112 can be sufficient to pull second portion 230 of glass sheet 200 into vacuum cavity 112.

In some embodiments, the vacuum pressure applied to vacuum cavity 112 in step 408 can range from 0.1 bars to 0.3 bars. In some embodiments, vacuum pressure can be applied to vacuum cavity 112 for a time ranging from 30 seconds to 120 seconds. In some embodiments, vacuum pressure can be applied to vacuum cavity 112 at a rate of 10 liters per minute to 100 liters per minute.

In some embodiments, vacuum pressure is applied to the one or more vacuum openings 140 in step 406 before vacuum pressure is applied to vacuum cavity 112 in step 408. In some embodiments, steps 406 and 408 can be performed simultaneously such that vacuum pressure is applied to the one or more vacuum openings 140 at the same time vacuum pressure is applied to vacuum cavity 112.

In some embodiments, applying vacuum pressure to vacuum cavity 112 in step 408 can pull second portion 230 of glass sheet 200 against mold surface 116 of mold 114 defining vacuum cavity 112. In some embodiments, applying vacuum pressure to vacuum cavity 112 in step 408 can pull second portion 230 of glass sheet 200 into vacuum cavity 112 and the second portion 230 can be free-formed within vacuum cavity 112. In such embodiments, second portion 230 can be reformed within vacuum cavity 112 without being pulled against a mold surface of a mold by controlling the vacuum pressure, time, and temperature within vacuum cavity 112.

In some embodiments, vacuum pressure can be applied to vacuum cavity 112 and/or the one or more vacuum openings 140 without the use of a vacuum source. In such embodiments, vacuum pressure can be applied by suddenly stopping the application of heat after reaching the reforming temperature. This can lead to rapid cooling of the air in vacuum cavity 112 and/or vacuum chamber 162, thus creating significant gas volume contraction within vacuum cavity 112 and/or vacuum chamber 162. This significant gas volume contraction can pull the one or more first portions 220 of glass sheet 200 into the one or more vacuum openings 140 and/or pull second portion 230 of glass sheet into vacuum cavity 112.

In some embodiments, second portion 230 of glass sheet 200 can have an initial thickness 206 (t1) before reforming glass sheet 200 and a final thickness 207 (t2) after reforming the glass sheet. This different in thickness can be a result of glass sheet deformation during reformation. In some embodiments, the ratio of initial thickness 206 to final thickness 207 (t1/t2) can ranges from 1.1 to 2. A ratio of initial thickness to final thickness (t1/t2) indicates that glass sheet 200 was deformed and stretched into its final shape. This deformation and stretching of the glass is akin to how glass is formed during glass blowing. By allowing the glass to freely deform and stretch into its final shape, stresses imparted on the glass can be minimized, which in turn helps prevent glass breakage and wrinkling.

After reforming glass sheet 200 in step 408, the vacuum pressure applied to vacuum cavity 112 and the one or more vacuum openings 140 can be released and the reformed glass sheet can be allowed to cool to an annealing temperature in step 412. In step 412, the reformed glass sheet can be held at the annealing temperature to relieve internal residual stresses created during the reforming.

After annealing, the reformed glass sheet (e.g., reformed glass sheet 201 shown in FIG. 6A) can be cooled to room temperature in step 414 and removed from vacuum mold 110 in step 416.

In some embodiments, removing glass sheet from the mold in step 416 can include injecting one or more nitrogen pulses into vacuum pipe 172a and/or vacuum pipe 172b. In some embodiments, the one or more one or more nitrogen pulses can include nitrogen gas having a temperature of about 600° C. and a pressure in a range of 1012 to 1013 poises. In embodiments including one or more nitrogen pulses, the nitrogen pulse can facilitate demolding of the glass sheet and inhibit oxidation of the vacuum mold, which can still be at a high temperature immediately after reforming.

Figure 5A:
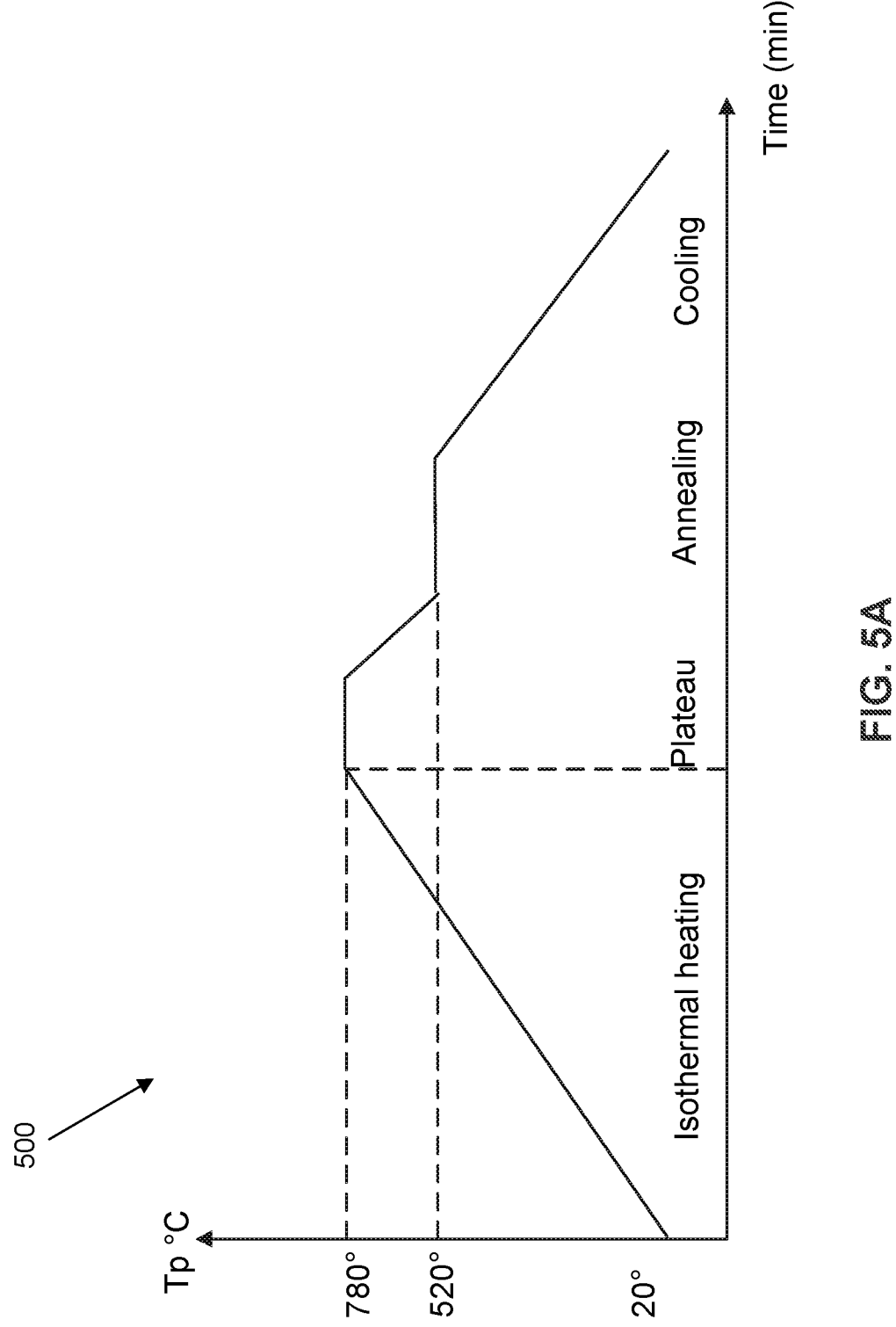
FIG. 5A shows a heating profile according to some embodiments.
Figure 5B:
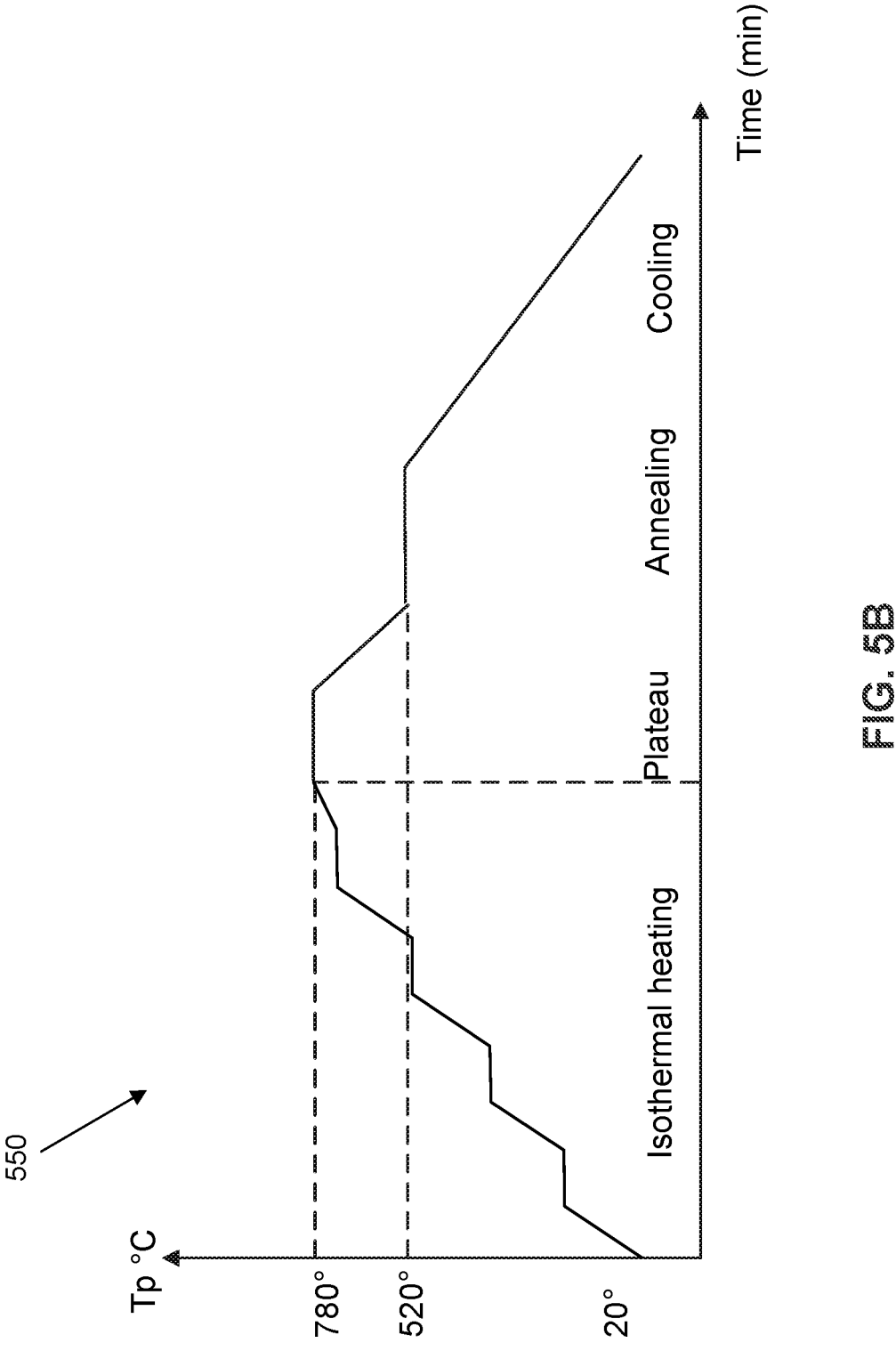
FIG. 5B shows a heating profile according to some embodiments.

FIGS. 5A and 5B show two exemplary heating profiles for steps 404-414 of method 400. FIG. 5A shows a heating profile 500 for applying heat using a static furnace. FIG. 5B shows a heating profile 550 for applying heat using a dynamic lehr. The dynamic lehr can include multiple successive isothermal heating stations and a glass sheet can pass through the successive stations sequentially during heating.

In both profiles 500 and 550, glass sheet 200 is heated to a reforming temperature of about 780° C. Glass sheet 200 is held at the reforming temperature for a period of time, during which vacuum pressure is applied to the one or more vacuum openings 140 and vacuum cavity 112. After reforming under vacuum pressure, glass sheet 200 is cooled to an annealing temperature of about 520° C. and held at that temperature to allow annealing of glass sheet 200. Finally, after annealing, glass sheet 200 is cooled to room temperature.

Figures 6A, 6B:
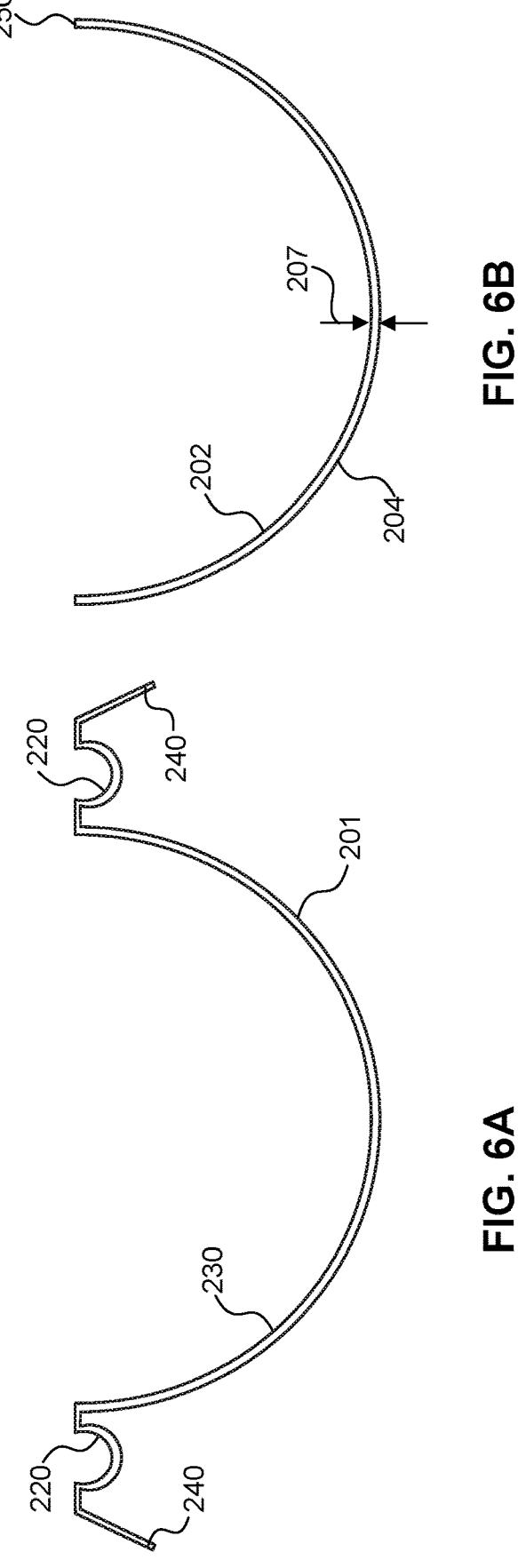
FIG. 6A shows a reformed glass sheet according to some embodiments.
FIG. 6B shows a reformed glass article according to some embodiments.

After removing reformed glass sheet 201 from vacuum mold 110, excess glass sheet material can be removed from reformed glass sheet 201 in step 418 to create a reformed glass article (e.g., reformed glass article 250 shown in FIG. 6B). Removing excess glass sheet material can include removing perimeter portion 240 and first portions 220 from reformed glass sheet 201 such that a reformed glass article 250 defined by second portion 230 remains. In some embodiments, excess glass sheet material can be removed using a cutting process, for example a laser cutting process or a water jet cutting process. In some embodiments, excess glass sheet material can be removed using mechanical scoring and breakage of the glass along the score line.

In step 420, one or more post-reforming processes can be performed on reformed glass sheet 201 or reformed glass article 250. Post-reforming processes include, but are not limited to, a polishing process, an ion-exchange process, an etching process, a lamination process. Post-reforming processes can be performed before or after step 418.

Figure 7:
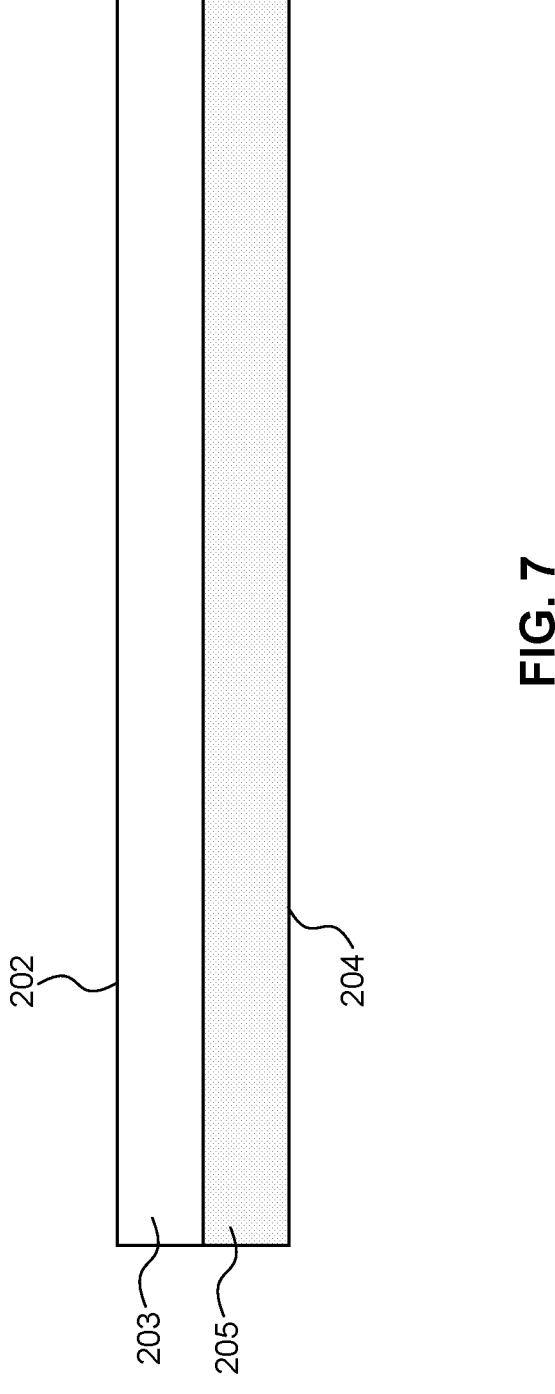
FIG. 7 shows a multi-layer glass sheet according to some embodiments.

In some embodiments, the one or more post-reforming processes can include removing a layer of a multi-layer reformed glass sheet 201. FIG. 7 shows a multi-layer glass sheet 200 according to some embodiments. Multi-layer glass sheet 200 can include a top glass layer 203 defining top surface 202 of glass sheet 200 and a bottom glass layer 205 defining bottom surface 204 of glass sheet 200. In some embodiments, bottom glass layer 205 of glass sheet 200 can be removed after reforming multi-layer glass sheet 200. In such embodiments, bottom glass layer 205 will not define any portion of a reformed glass article 250 made using method 400.

In some embodiments, bottom glass layer 205 can be removed using an etching process. The etching solution used in the etching process can include an acid such as, but not limited to, nitric acid, hydrochloric acid (HCl), or phosphoric acid. Fluorine containing etchants such as hydrofluoric (HF) acid, ammonium bifluoride, sodium fluoride, and mixture thereof may also be used. In some embodiments, the etching solution may include hydrofluoric acid. Etching processes can include any suitable method for applying etchant solution(s) to multi-layer glass sheet 200 to selectively remove bottom glass layer 205. Suitable etchant solution application processes include, but are not limited to, submerging multi-layer glass sheet 200 in an etchant bath, spraying etchant solution(s) onto multi-layer glass sheet 200, or a combination thereof.

In some embodiments, the etching solution may be an aqueous solution including one or more acids at a volume percent (vol %) in the range of 5 vol % to 60 vol % total, including subranges. For example, the etching solution may include one or more acids having a total volume percent of 5 vol % to 50 vol %, 5 vol % to 25 vol %, 5 vol % to 10 vol %, 10 vol % to 25 vol %, 10 vol % to 50 vol %, 10 vol % to 60 vol %, or a volume percentage having any two of these values as endpoints, including the endpoints. In some embodiments, etching may be performed at a temperature ranging from 0° C. to 60° C. In some embodiments, etching may be performed at room temperature (23° C.). In embodiments, the bottom glass layer 205 may not be removed via etching and instead laminated to the top glass layer 203 to form a laminated glass article, as described herein.

FIG. 6B shows a reformed glass article 250 according to some embodiments. Reformed glass article 250 includes a non-developable curved shape defined by a convex curved surface and a concave curved surface. The convex curved surface can be the bottom surface 204 of glass sheet 200 reformed to have a convex curved surface. The concave surface can be the top surface 202 of glass sheet 200 reformed to have a concave curved surface. Reformed glass article 250 can include any number of convex or concave surfaces defining bottom surface 204 and top surface 202. A final thickness 207 of reformed glass article 250 is measured between the convex surface and the concave surface.

In some embodiments, the curved shape of reformed glass article 250 defined by the convex curved surface and the concave curved surface can have a convex surface area of 10,000 mm$^2$ or more, 20,000 mm$^2$ or more, 30,000 mm$^2$ or more, or 60,000 mm$^2$ or more and a thickness uniformity of +/−x microns (micrometers, μm) per 100 mm. A thickness uniformity of +/−x microns per 100 mm means that the maximum thickness variation of reformed glass article 250 is no more than x microns along a curved surface portion measuring 100 millimeters in length. In some embodiments, the curved shape of reformed glass article 250 defined by the convex surface and the concave surface can have a thickness uniformity of +/−50 microns per 100 mm. In some embodiments, the curved shape of reformed glass article 250 defined by the convex surface and the concave surface can have a thickness uniformity of +/−25 microns per 100 mm. In some embodiments, the curved shape of reformed glass article 250 defined by the convex surface and the concave surface can have a thickness uniformity of +/−75 microns per 100 mm.

In some embodiments, the curved shape of reformed glass article 250 defined by the convex curved surface and the concave curved surface can have a convex surface area of 60,000 mm$^2$ or more and a thickness uniformity of +/−25 microns per 100 mm. In some embodiments, the curved shape of reformed glass article 250 defined by the convex curved surface and the concave curved surface can have a convex surface area ranging from 60,000 mm$^2$ to 8 m$^2$ (meters squared) and a thickness uniformity of +/−25 microns per 100 mm. In some embodiments, the curved shape of reformed glass article 250 defined by the convex curved surface and the concave curved surface can have a convex surface area ranging from 60,000 mm$^2$ to 6 m$^2$ and a thickness uniformity of +/−25 microns per 100 mm. In some embodiments, the curved shape of reformed glass article 250 defined by the convex curved surface and the concave curved surface can have a convex surface area ranging from 60,000 mm$^2$ to 3 m$^2$ and a thickness uniformity of +/−25 microns per 100 mm.

In some embodiments, the curved shape of reformed glass article 250 defined by the convex curved surface and the concave curved surface can have a convex surface area of 60,000 mm$^2$ or more and a thickness uniformity of +/−50 microns per 100 mm. In some embodiments, the curved shape of reformed glass article 250 defined by the convex curved surface and the concave curved surface can have a convex surface area ranging from 60,000 mm$^2$ to 8 m$^2$ (meters squared) and a thickness uniformity of +/−50 microns per 100 mm. In some embodiments, the curved shape of reformed glass article 250 defined by the convex curved surface and the concave curved surface can have a convex surface area ranging from 60,000 mm$^2$ to 6 m$^2$ and a thickness uniformity of +/−50 microns per 100 mm. In some embodiments, the curved shape of reformed glass article 250 defined by the convex curved surface and the concave curved surface can have a convex surface area ranging from 60,000 mm$^2$ to 3 m$^2$ and a thickness uniformity of +/−50 microns per 100 mm.

In some embodiments, the curved shape of reformed glass article 250 defined by the convex curved surface and the concave curved surface can have a convex surface area of 60,000 mm$^2$ or more and a thickness uniformity of +/−75 microns per 100 mm. In some embodiments, the curved shape of reformed glass article 250 defined by the convex curved surface and the concave curved surface can have a convex surface area ranging from 60,000 mm$^2$ to 8 m$^2$ (meters squared) and a thickness uniformity of +/−75 microns per 100 mm. In some embodiments, the curved shape of reformed glass article 250 defined by the convex curved surface and the concave curved surface can have a convex surface area ranging from 60,000 mm$^2$ to 6 m$^2$ and a thickness uniformity of +/−75 microns per 100 mm. In some embodiments, the curved shape of reformed glass article 250 defined by the convex curved surface and the concave curved surface can have a convex surface area ranging from 60,000 mm$^2$ to 3 m$^2$ and a thickness uniformity of +/−75 microns per 100 mm.

In some embodiments, the curved shape of reformed glass article 250 defined by the convex curved surface and the concave curved surface can have an optical power distortion measured through the final thickness 207 below 300 millidiopters in absolute value. In some embodiments, the curved shape of reformed glass article 250 defined by the convex curved surface and the concave curved surface can have an optical power distortion measured through the final thickness 207 ranging from 20 millidiopters to 300 millidiopters (in absolute value). In some embodiments, the curved shape of reformed glass article 250 defined by the convex curved surface and the concave curved surface can have an optical power distortion measured through the final thickness 207 ranging from 50 millidiopters to 300 millidiopters (in absolute value). In some embodiments, the curved shape of reformed glass article 250 defined by the convex curved surface and the concave curved surface can have an optical power distortion measured through the final thickness 207 ranging from 100 millidiopters to 300 millidiopters (in absolute value). The optical power distortion of the curved shape can be measured in accordance with DIN 52305:1995 ("Determining the optical distortion and refractive power of safety glazing material for road vehicles").

In some embodiments, a convex curved surface 204 of reformed glass article 250 can have a measurable dimple density of less than 10 dimples per 100 mm$^2$ convex surface area. As used herein, a measurable dimple is a raised or recessed dimple formed on the convex curved surface 204 and comprising an effective diameter of greater than 1 mm. As used herein, a measurable dimple is a raised or recessed dimple formed on the convex curved surface 204 and comprising an effective diameter of no greater than 5 mm. Measurable dimples can be identified by measuring optical distortion of light transmitted through the convex curved surface 204 of glass article. An optical distortion of 50 or more millidiopters (mdpt) after a noise filter is applied to the measurement data can indicate the presence of a measurable dimple, or an optical distortion of 100 or more millidiopters (mdpt) before a noise filter is applied to the measurement data can indicate the presence of a measurable dimple. Optical distortion can be measured using a device that measures transmitted optical distortions on glass. For example, optical distortion can be measured using a LAB-SCAN-SCREEN system available from ISRA Vision. For purposes of evaluating a measurable dimple density, at least one 50,000 mm$^2$ surface area on convex curved surface 204 is analyzed and the number of measurable dimples per 100 mm$^2$ is calculated based on the total number of measurable dimples present. To confirm the accuracy of the number of dimples per 100 mm$^2$ for the 50,000 mm$^2$ surface area, a 5,000 mm$^2$ surface area inside the 50,000 mm$^2$ surface area can be re-analyzed and the number of measurable dimples per 100 mm$^2$ is calculated based on the total number of measurable dimples present in the 5,000 mm$^2$ surface area.

While method 400 and apparatus 100 have been described above in the context of reforming a glass sheet, method 400 and apparatus 100 can be used to reform other materials, such as plastic sheets. For example, a polycarbonate sheet can be reformed using method 400 and apparatus 100. In some embodiments, a glass sheet can be reformed, then in a separate operation a plastic sheet can be reformed, and the reformed glass sheet and reformed plastic sheet can be laminated.

Figure 8:
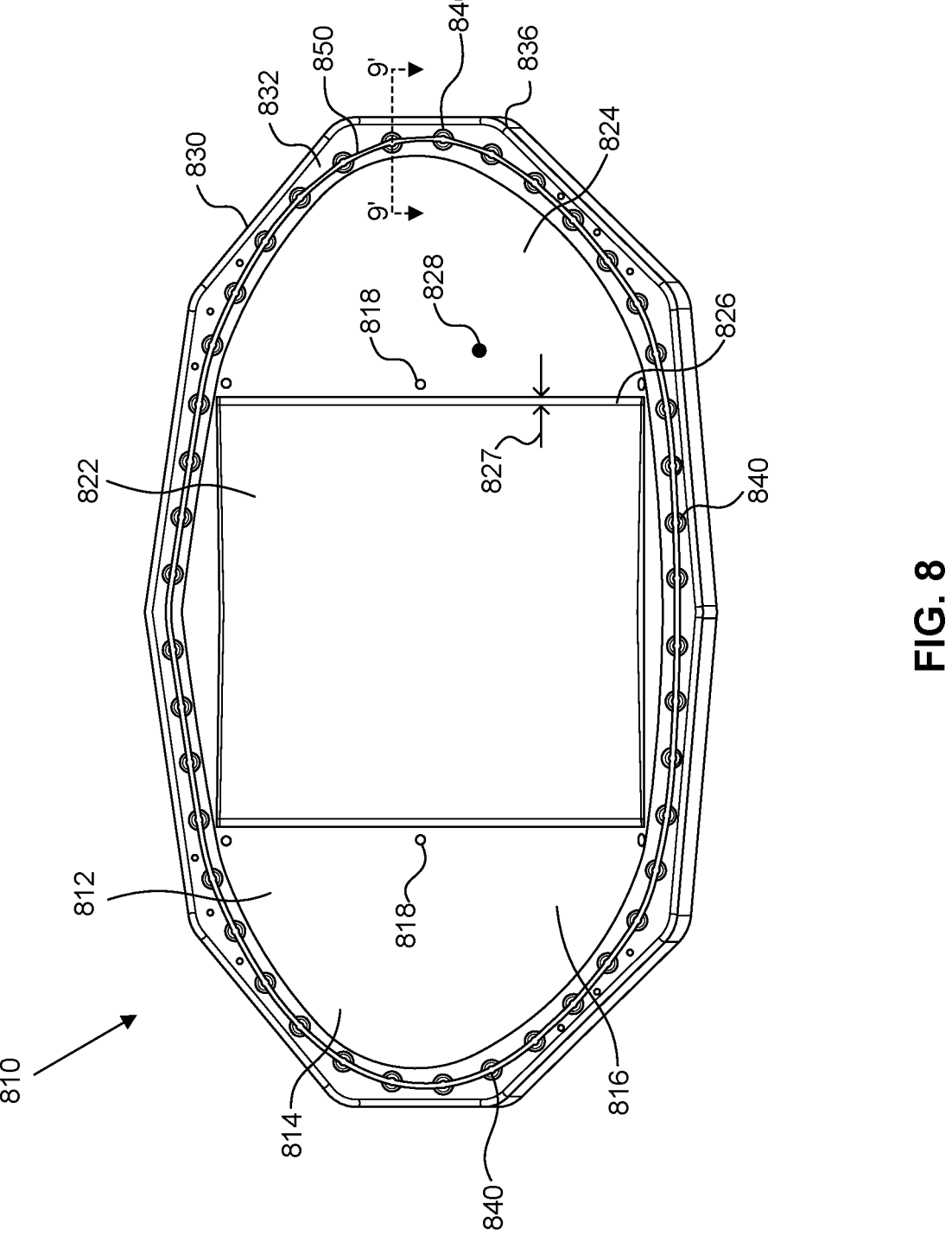
FIG. 8 shows a vacuum mold according to some embodiments.

FIG. 8 shows a vacuum mold 810 according to some embodiments. Vacuum mold 810 can include a mold 814 and a vacuum cavity 812 in which glass sheet 200 can be reformed. Vacuum cavity 812 can include a mold surface 816 and one or more vacuum holes 818 formed on mold surface 816.

Vacuum mold 810 can also include a frame 830 disposed around vacuum cavity 812. Frame 830 includes a top wall 832 having a top surface 834 and plurality of vacuum openings 840 formed in top surface 834. Top surface 834 of frame 830 can have an exterior perimeter edge 836 defining a perimeter shape of top surface 834.

Vacuum openings 840 can include a bottom surface 842, a top perimeter edge 843 connected to the top surface 834 of frame 830, and a perimeter sidewall 844 extending from top perimeter edge 843 to bottom surface 842 of the vacuum opening 840. In some embodiments, perimeter sidewall 844 can have a slope angle 892 in a range of 5° (degrees) to 20° (degrees) measured relative to an axis perpendicular to bottom surface 842 of the vacuum opening 840. A slope angle 892 in the range of 5° to 20° can facilitate demolding of a reformed glass sheet 201 from mold 810.

In some embodiments, vacuum openings 840 can have an effective diameter 846 defined by top perimeter edge 843 in a range of 10 mm to 30 mm, including subranges. For example, in some embodiments, effective diameter 846 can range from 10 mm to 30 mm, 10 mm to 25 mm, 10 mm to 20 mm, 15 mm to 30 mm, or 20 mm to 30 mm, or within a range having any two of these values as endpoints. In some embodiments, the glass sheet 200 can have an initial thickness 206 and the vacuum openings 840 can have an effective diameter 846 ten to fifteen times greater than the initial thickness 206.

In some embodiments, vacuum openings 840 can have a depth 847 measured between top surface 834 of frame 830 and bottom surface 842 of the vacuum opening 840. In some embodiments, depth 847 can range from 0.5 mm to 2.5 mm, including subranges. For example, in some embodiments, depth 847 can range from 0.5 mm to 2.5 mm, 1 mm to 2.5 mm, 1.5 mm to 2.5 mm, 0.5 mm to 2 mm, or 0.5 mm to 1.5 mm, or within a range having any two of these values as endpoints.

In some embodiments, vacuum mold 810 can be a monolithic vacuum mold comprising vacuum cavity 812 and frame 830. In such embodiments, vacuum cavity 812 and frame 830 can be integrally formed. In some embodiments, vacuum cavity 812 and frame 830 can be integrally formed and made of the same material. In some embodiments, vacuum cavity 812 and frame 830 can be integrally formed and made of graphite. A monolithic, integrally formed, vacuum mold can have a consistent CTE that can inhibit or prevent breakages of the mold and/or a reformed glass sheet during cooling.

One or more vacuum sources 170 can be in fluid communication with vacuum cavity 812 and the one or more vacuum openings 840 such that the one or more vacuum sources 170 can apply vacuum pressure to vacuum cavity 812, the one or more vacuum openings 840, or both. In some embodiments, vacuum source 170a can apply vacuum pressure to both vacuum cavity 812 and the one or more vacuum openings 840. In some embodiments, vacuum source 170a can apply vacuum pressure to vacuum cavity 812 and the one or more vacuum openings 840 simultaneously. In some embodiments, vacuum source 170a can apply vacuum pressure to vacuum cavity 812 and the one or more vacuum openings 840 sequentially. For example, vacuum source 170a can first apply vacuum pressure to the one or more vacuum openings 840, and while still applying vacuum pressure to the one or more vacuum openings 840, then apply vacuum pressure to vacuum cavity 812. Vacuum pipe 172a can connect vacuum source 170a to vacuum cavity 812 and the one or more vacuum openings 840.

In some embodiments, first vacuum source 170a can be in fluid communication with vacuum holes 818 of vacuum cavity 812 and second vacuum source 170b in fluid communication with the one or more vacuum openings 840. In such embodiments, first vacuum source 170a can apply vacuum pressure to vacuum cavity 812 independent from second vacuum source 170b applying vacuum pressure to the one or more vacuum openings 840. In some embodiments, first vacuum source 170a and second vacuum source 170b can simultaneously apply vacuum pressure to vacuum cavity 812 and the one more vacuum openings 840, respectively. In some embodiments, first vacuum source 170a can apply vacuum pressure to vacuum cavity 812 and second vacuum source 170b can apply vacuum pressure to the one or more vacuum openings 840 sequentially. For example, second vacuum source 170b can first apply vacuum pressure to the one or more vacuum openings 840, and while second vacuum source 170b is still applying vacuum pressure to the one or more vacuum openings 840, first vacuum source 170a can apply vacuum pressure to vacuum cavity 812.

In embodiments including first vacuum source 170a and second vacuum source 170b, first vacuum pipe 172a can connect first vacuum source 170a to vacuum cavity 812 and second vacuum pipe 172b can connect second vacuum source 170b to the one or more vacuum openings 840. In some embodiments, first vacuum pipe 172a and/or second vacuum pipe 172b can be coupled to mold 810 at vacuum connections 176 formed on mold 810.

Vacuum holes 818 can be through holes extending from mold surface 816 through mold 814 to a bottom surface 820 of mold 814. Vacuum holes 818 can be in fluid communication one or more vacuum sources 170 such that vacuum sources 170 can apply vacuum pressure to vacuum cavity 812 via vacuum holes 818.

Vacuum holes 818 can have a small diameter to minimize impact on bottom surface 204 of glass sheet 200 during reforming. In some embodiments, vacuum holes 818 can have a diameter ranging from 0.5 millimeters to 2 millimeters.

In some embodiments, frame 830 can include a channel 850 formed in top surface 834 and fluidly connecting the plurality of vacuum openings 840. In such embodiments, channel 850 can include a plurality of channel portions 852 connecting two adjacent vacuum openings 840. Each channel portion 852 can include a top edge 853 connected to top surface 834 of frame 830 and a sidewall 854 extending from top edge 853 to a bottom surface 855 of channel 850. In some embodiments, sidewall 854 can have a slope angle 890 in a range of 5° (degrees) to 20° (degrees) measured relative to an axis perpendicular to bottom surface 855 of channel 850. A slope angle 890 in the range of 5° to 20° can facilitate demolding of a reformed glass sheet 201 from mold 810.

In some embodiments, channel 850 can include a first portion 856 extending through each of the plurality of vacuum openings 840 and a second portion 857 disposed below bottom surface 842 of each of the plurality of vacuum openings 840. In such embodiments, second portion 857 can facilitate application of vacuum pressure to each vacuum opening 840 in the event that a second portion 230 of glass sheet 200 pulled into one of the vacuum openings 840 blocks the flow of air within first portion 856.

In some embodiments, top surface 834 of frame 830 can include a bump 837 located at exterior perimeter edge 836 of frame 830. In some embodiments, bump 837 can have a height 838 in a range of 0.3 mm to 2 mm measured relative to a portion of top surface 834 immediately adjacent to bump 837. In some embodiments, height 838 of bump 837 can be tailored to the initial thickness 206 of glass sheet 200 reformed using vacuum mold 810. In some embodiments, height 838 can be in a range of 30% to 50% of initial thickness 206. Bump 837 at perimeter edge 836 of frame 830 can facilitate creation of a vacuum tight seal between bottom surface 204 of a glass sheet 200 and top surface 834 of frame 830 during reforming, which can prevent any lateral glass motion during the application of vacuum pressure in the reforming process.

Figure 13:
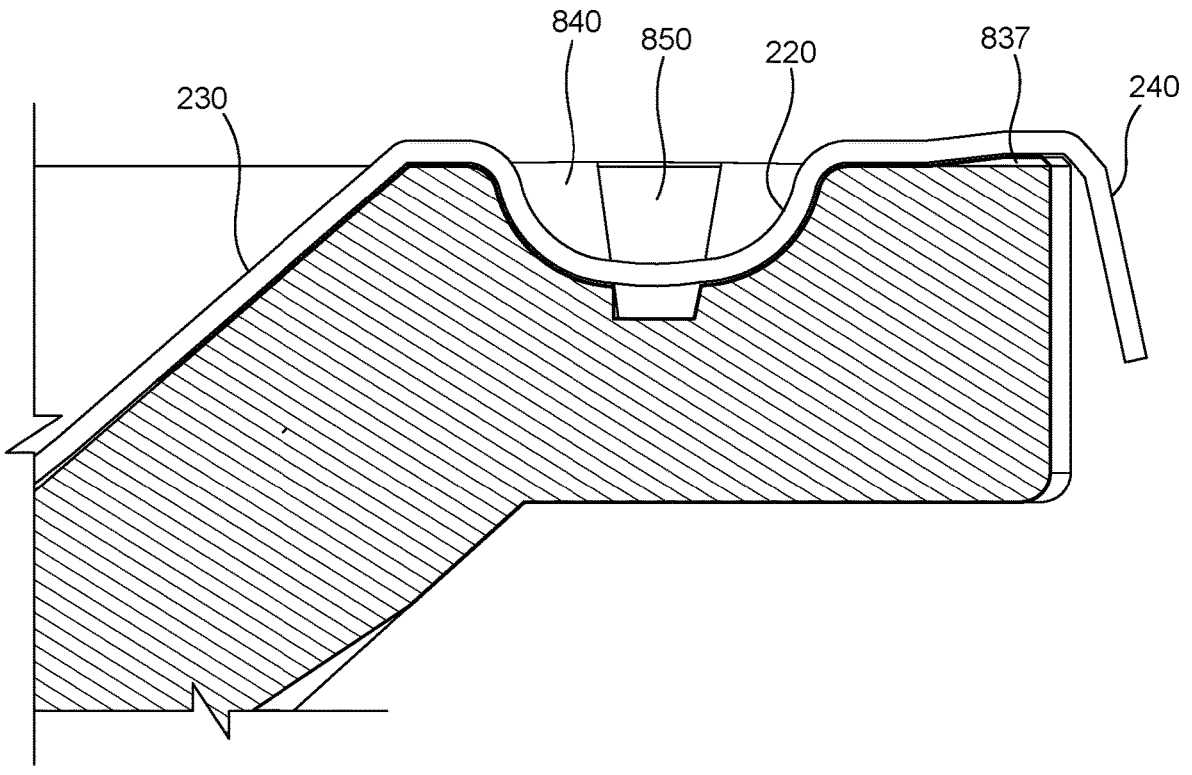
FIG. 13 shows a reformed glass sheet disposed over a vacuum mold according to some embodiments.

As shown for example in FIG. 13, heating glass sheet 200 to a reforming temperature can cause perimeter portion 240 of glass sheet 200 to fold around bump 837 at exterior perimeter edge 836 of frame 830 under gravitational force. The folding of perimeter portion 240 around bump 837 at exterior perimeter edge 836 can help hold glass sheet 200 and prevent any lateral glass motion during the application of vacuum pressure in the reforming process.

In some embodiments, mold surface 816 can include a central surface region 822 having a first maximum radius of curvature and a perimeter surface region 824 adjacent central surface region 822 and having a second maximum radius of curvature less than the first maximum radius of curvature. In some embodiments, the second maximum radius of curvature can be at least 5% less than the first maximum radius of curvature.

In some embodiments, central surface region 822 can be a region of mold surface 816 comprising the desired reformed shape of reformed glass article 250. In other words, central surface region 822 can have a concave surface curvature matching the convex surface curvature of convex curved surface 204 of reformed glass article 250. In such embodiments, second portion 230 of glass sheet 200 can be pulled against central surface region 822 of mold surface 816, thereby causing second portion 230 to take on the curvature of central surface region 822.

In embodiments including a perimeter surface region 824 having a second maximum radius of curvature less than the first maximum radius of curvature of central surface region 822, the shape of regions 822 and 824 can facilitate pulling glass sheet 200 against central surface region 822 first during a reforming process. By locating a smaller (shaper) radius of curvature in perimeter surface region 824, the last portion of glass article to be pulled against mold surface 816 during reforming can be in perimeter surface region 824. Ensuring that glass sheet 200 is pulled against central surface region 822 first can help ensure complete contact between convex curved surface 204 of a reformed glass article 250 and central surface region 822 during a reforming process, which can help ensure the convex curved surface 204 is shaped to the desired shape.

In some embodiments, one or more vacuum holes 818 of vacuum mold 810 can be formed in perimeter surface region 824 of mold surface 816. In some embodiments, mold 810 can have no vacuum holes 818 formed in central surface region 822. By locating no vacuum holes 818 in central surface region 822, any potential defects introduced by vacuum holes 818 during reforming of a glass sheet on central surface region 822 can be avoided. By avoiding these potential defects, costly finishing steps for removing these defects on a convex curved surface 204 of a reformed glass article 250 can be circumvented.

In some embodiments, central surface region 822 can have a surface area of 60,000 mm$^2$ or more. In some embodiments, central surface region 822 can have a surface area ranging from 60,000 mm$^2$ to 8 m$^2$. In some embodiments, central surface region 822 can have a surface area ranging from 60,000 mm$^2$ to 6 m$^2$. In some embodiments, central surface region 822 can have a surface area ranging from 60,000 mm$^2$ to 3 m$^2$.

In some embodiments, vacuum mold 810 can include a slot 826 formed in mold surface 816 and demarcating central surface region 822 from perimeter surface region 824. Slot can be sized such that a portion of reformed glass article 250 is not pulled into slot 826 during reforming. In some embodiments, one or more vacuum holes 818 can be formed in slot 826.

Slot 826 formed in mold surface 816 can impart desired surface and/or optical properties to the portion of reformed glass sheet 201 positioned over slot 826 when reformed glass sheet 201 is in contact with mold surface 816. The portion of reformed glass sheet 201 positioned over slot 826 will not directly contact mold surface 816. Therefore, potential optical and/or surface defects imparted by mold surface 816 will not be present on the portion of reformed glass sheet 201 positioned over slot 826. The lack of such optical and/or surface defects can facilitate laser cutting of a reformed glass sheet 201 along slot 826 because the optical and/or surface defects can disturb or scatter a laser beam used to laser cut the reformed glass sheet 201. By eliminating the presence of these optical and/or surface defects, the precision and efficiency of laser cutting the reformed glass sheet 201 can be optimized.

In some embodiments, slot 826 can have a width 827 in a range of 1 mm to 4 mm. In some embodiments, width 827 of slot 826 can be tailored to the initial thickness 206 of glass sheet 200 reformed using vacuum mold 810. In some embodiments, width 827 of slot 826 can be in a range of 200% to 300% of initial thickness 206. In some embodiments, width 827 of slot 826 can be in a range of 100% to 300% of initial thickness 206. In some embodiments, width 827 of slot 826 can be in a range of 100% to 200% of initial thickness 206. A slot width within a range as described herein can be small enough to prevent a portion of reformed glass sheet 201 from being pulled into slot 826 during reforming.

In some embodiments, slot 826 can have a depth of 1 mm or less. In some embodiments, slot 826 can have a depth in a range of 30% to 50% of the slot's width 827. In some embodiments, slot 826 can have a depth ranging from 20 microns to 1 mm.

In some embodiments, mold surface 816 can include a contact indicator 828. Contact indicator 828 can be, for example, a raised dimple or a contact sensor. In embodiments including contact indicator 828, contact indicator 828 can provide a signal that a reformed glass sheet 201 is in contact with mold surface 816. By providing this signal, contact indicator 828 can help ensure repeatable vacuum shaping of reformed glass articles 250 and can help prevent excessive application of vacuum pressure in vacuum cavity 812, which can introduce undesirable optical and/or surface properties to portions of a reformed glass article in contact with mold surface 816. In some embodiments, contact indicator 828 can be located on mold surface 816 on perimeter surface region 824.

Figure 11:
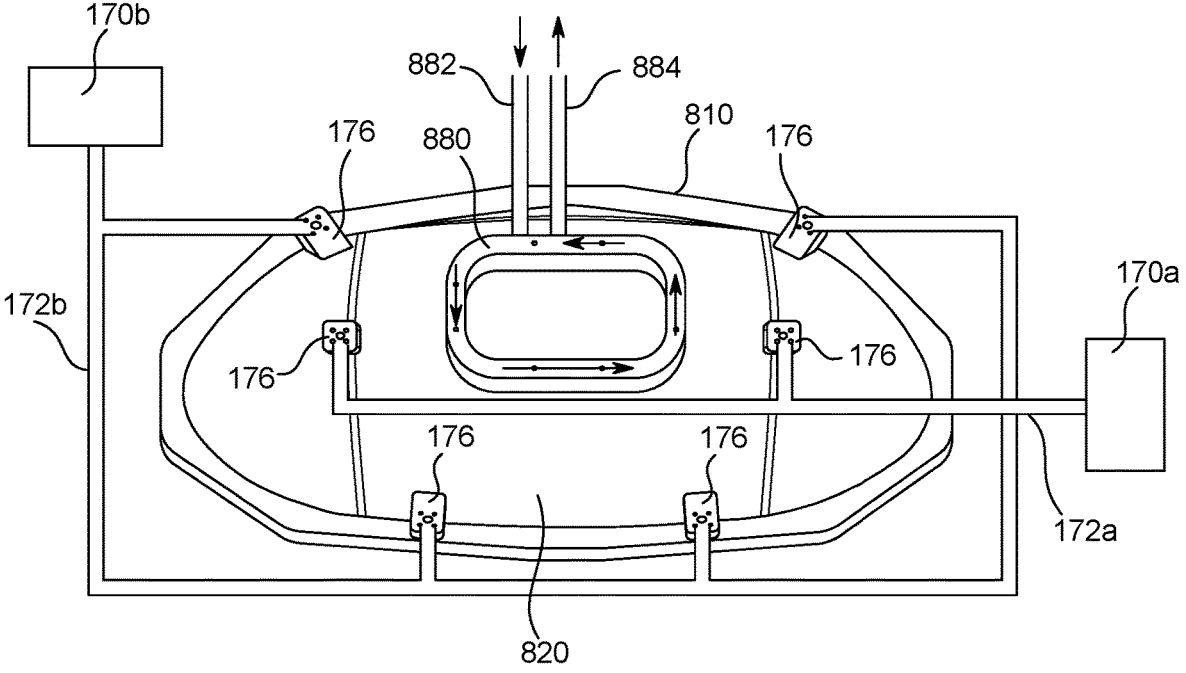
FIG. 11 shows a bottom view of a vacuum mold according to some embodiments.

In some embodiments, as shown for example in FIG. 11, vacuum mold 810 can include a cooling block 880 in contact with bottom surface 820 of vacuum mold 810 opposite mold surface 816. In some embodiments, cooling block 880 can include a circuit for circulating a coolant. In such embodiments, cooling block 880 can include a coolant inlet 882 and a coolant outlet 884. Exemplary coolants for cooling block 880 include, but are not limited to, air and water. In some embodiments, the water flux for a water coolant can range from 3 to 10 liters per mm for a 6 to 8 mm diameter coolant tube. In some embodiments, cooling block 880 can additionally or alternatively include a heat sink or cooling ribs. In some embodiments, cooling block 880 can be in contact with bottom surface 820 of vacuum mold 810 opposite central surface region 822 of mold surface 816. Cooling block 880 can locally reduce the temperature of mold surface 816 during reforming. Such a local reduction in temperature can help prevent the formation of mechanical or thermal defects when a convex curved surface 204 of a reformed glass sheet 201 is in contact with mold surface 816.

Figure 12:
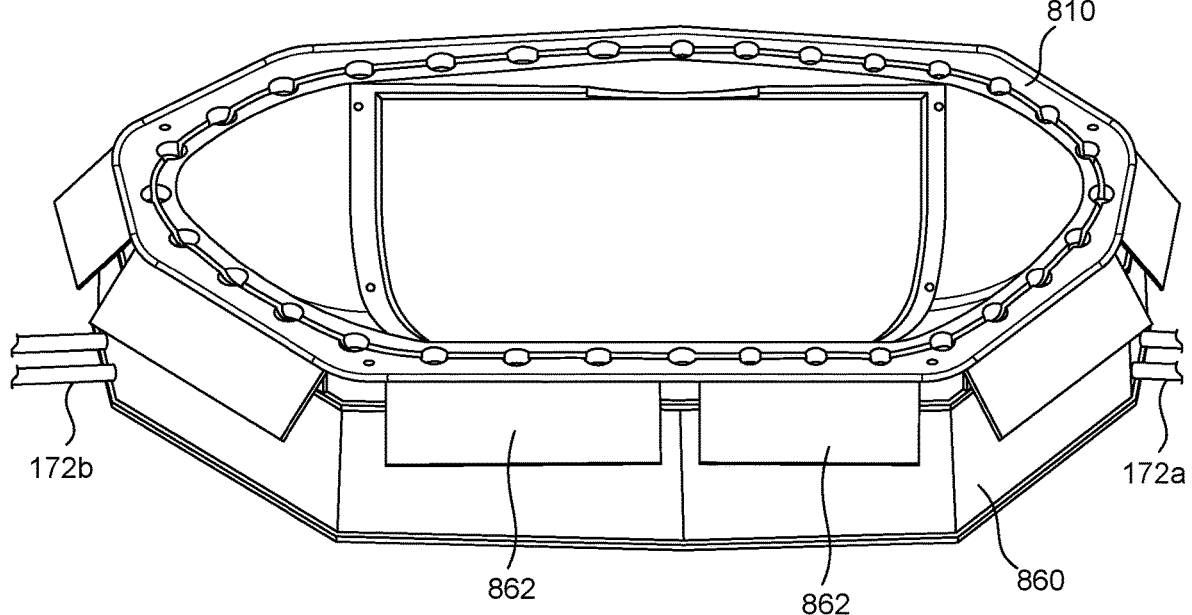
FIG. 12 shows an apparatus for reforming a sheet of material according to some embodiments.

In some embodiments, as shown for example in FIG. 12, vacuum mold 810 can be placed in a vacuum box 860. In some embodiments, vacuum box 860 can include wings 862 for supporting and engaging corresponding perimeter portions 240 on glass sheet 200 during reforming. The engagement between wings 862 and corresponding perimeter portions 240 can help hold glass sheet 200 and prevent any lateral glass motion during the application of vacuum pressure in the reforming process. This facilitates controlled local deformation and elongation of second portion 230 of glass sheet 200 to create a reformed glass article without wriggling. In some embodiments, wings 862 can be angled at 10° to 30° with respect to a vertical wall of vacuum box 860.

Vacuum mold 810 can be used to reform a glass article using method 400 similar to vacuum mold 110. In step 402, glass sheet 200 can be placed over vacuum mold 810 such that a plurality of first portions 220 of glass sheet 200 are disposed over the plurality vacuum openings 840 and a second portion 230 of glass sheet 200 is disposed over vacuum cavity 812. When glass sheet 200 is placed over vacuum mold 810, glass sheet 200 can be positioned such that glass sheet 200 covers vacuum cavity 812 and bottom surface 204 of glass sheet 200 is in direct contact with top surface 834 of frame 830. In some embodiments, glass sheet 200 can be placed over vacuum mold 810 such that a perimeter portion 240 of glass sheet 200 extends outward from exterior perimeter edge 836 of frame 830. In some embodiments, glass sheet 200 can have a perimeter shape defined by perimeter edge 208 and having a first perimeter, and exterior perimeter edge 836 of frame 830 can have a shape having a second perimeter less than the first perimeter. The larger perimeter of perimeter edge 208 can result in perimeter portion 240 extending outward from exterior perimeter edge 836 of frame 830 when glass sheet 200 is placed over vacuum mold 810.

In some embodiments, step 402 can include placing multiple glass sheets 200 over vacuum mold 810. The plurality of glass sheets 200 can be placed over vacuum mold 810 in a stacked configuration. In such embodiments, method 400 can simultaneously reform the plurality of glass sheets 200 using mold 810.

In step 404, glass sheet 200 is heated to a reforming temperature. In some embodiments, the reforming temperature can range from 600° C. to 900° C. In some embodiments, a heat shield 180 can be placed on top surface 202 of glass sheet 200 during reforming to help control the temperature of glass sheet 200.

In some embodiments, heating glass sheet 200 to the reforming temperature in step 404 can cause perimeter portion 240 of glass sheet 200 to fold around exterior perimeter edge 836 of frame 830 under gravitational force. In some embodiments, heating glass sheet 200 to the reforming temperature in step 404 can cause perimeter portion 240 of glass sheet 200 to fold around bump 837 at exterior perimeter edge 836 of frame 830 under gravitational force. The folding of perimeter portion 240 can help hold glass sheet 200 and prevent any lateral glass motion during the application of vacuum pressure in the reforming process.

In some embodiments, heating glass sheet 200 in step 404 can cause perimeter portion 240 of glass sheet 200 to fold around exterior perimeter edge 836 at an angle 242 of less than 90°. For example, perimeter portion 240 of glass sheet 200 can fold around exterior perimeter edge 836 at an angle 242 ranging from 60° to 85°. In some embodiments, bump 837 can help prevent angle 242 from exceeding 90°.

In step 406, vacuum pressure can be applied to the vacuum openings 840. The vacuum pressure applied to the vacuum openings 840 in step 406 can be sufficient to pull the first portions 220 of the glass sheet 200 into the vacuum openings 840. In some embodiments, the vacuum pressure applied to the vacuum openings 840 can range from 0.1 bars to 0.3 bars. In some embodiments, the vacuum pressure applied to the vacuum openings 840 can range from 20 millibars to 100 millibars. In some embodiments, vacuum pressure can be applied to the vacuum openings 840 in step 406 for a time ranging from 30 seconds to 120 seconds. In some embodiments, vacuum pressure can be applied to the vacuum openings 840 at a rate of 5 liters per minute to 20 liters per minute. In some embodiments, the vacuum pressure applied to vacuum openings 840 in step 406 can pull a third portion of glass sheet 200 into channel 850 of vacuum mold 810.

The vacuum pressure applied in step 406 can seal glass sheet 200 to top surface 834 of frame 830, thus creating a vacuum tight seal around the perimeter of second portion 230 of glass sheet 200. Additionally, the vacuum pressure applied in step 406 can help hold glass sheet 200 and prevent any lateral glass motion during the application of vacuum pressure in the reforming process. This facilitates controlled local deformation and elongation of second portion 230 of glass sheet 200 to create a reformed glass article without wriggling.

By utilizing vacuum pressure to hold glass sheet 200 in place during reforming, the reforming process can be performed without mechanically clamping glass sheet 200 to top surface 834 of frame 830 during reforming of glass sheet 200. By eliminating mechanical clamping, stresses imparted on glass sheet 200 during heating and cooling can be minimized. Excessive stress, for example mechanical stresses and/or thermal stresses created at the interface of the glass and clamping mechanisms can cause undesirable glass deformation and/or glass failure during heating and cooling. Additionally, the use of vacuum pressure to hold glass sheet 200 during reforming can eliminate the need for any mechanical release mechanisms, which can damage the glass when removing glass sheet 200 from vacuum mold 810. The vacuum openings 840 allow self-release of glass sheet 200 during cooling and demolding, thus minimizing stresses imparted on the glass.

In step 408, vacuum pressure can be applied to vacuum cavity 812. The vacuum pressure applied to vacuum cavity

812 can be sufficient to pull second portion 230 of glass sheet 200 into vacuum cavity 112.

In some embodiments, the vacuum pressure applied to vacuum cavity 812 in step 408 can range from 0.1 bars to 0.3 bars. In some embodiments, the vacuum pressure applied to vacuum cavity 812 in step 408 can range from 10 millibars to 50 millibars. In some embodiments, vacuum pressure can be applied to vacuum cavity 812 for a time ranging from 30 seconds to 120 seconds. In some embodiments, vacuum pressure can be applied to vacuum cavity 812 at a rate of 10 liters per minute to 100 liters per minute.

In some embodiments, vacuum pressure is applied to the vacuum openings 840 in step 406 before vacuum pressure is applied to vacuum cavity 812 in step 408. In some embodiments, steps 406 and 408 can be performed simultaneously such that vacuum pressure is applied to the vacuum openings 840 at the same time vacuum pressure is applied to vacuum cavity 812.

In some embodiments, applying vacuum pressure to vacuum cavity 812 in step 408 can pull second portion 230 of glass sheet 200 against mold surface 816 defining vacuum cavity 812. In some embodiments, applying vacuum pressure to vacuum cavity 812 in step 408 can pull second portion 230 of glass sheet 200 into vacuum cavity 812 and the second portion 230 can be free-formed within vacuum cavity 812. In such embodiments, second portion 230 can be reformed within vacuum cavity 812 without being pulled against a mold surface of a mold by controlling the vacuum pressure, time, and temperature within vacuum cavity 812.

In some embodiments, vacuum pressure can be applied to vacuum cavity 812 and/or the vacuum openings 840 without the use of a vacuum source. In such embodiments, vacuum pressure can be applied by suddenly stopping the application of heat after reaching the reforming temperature. This can lead to rapid cooling of the air in vacuum cavity 812 and/or channel 850, thus creating significant gas volume contraction within vacuum cavity 812 and/or channel 850. This significant gas volume contraction can pull the one or more first portions 220 of glass sheet 200 into the vacuum openings 840 and/or pull second portion 230 of glass sheet into vacuum cavity 812.

After reforming glass sheet 200 in step 408, the vacuum pressure applied to vacuum cavity 812 and the vacuum openings 840 can be released and the reformed glass sheet can be allowed to cool to an annealing temperature in step 412. In step 412, the reformed glass sheet can be held at the annealing temperature to relieve internal residual stresses created during the reforming.

After annealing, the reformed glass sheet (e.g., reformed glass sheet 201 shown in FIG. 6A) can be cooled to room temperature in step 414 and removed from vacuum mold 810 in step 416.

In some embodiments, removing glass sheet from the mold in step 416 can include injecting one or more nitrogen pulses into vacuum pipe 172a and/or vacuum pipe 172b. In some embodiments, the one or more one or more nitrogen pulses can include nitrogen gas having a temperature of about 600° C. and a pressure in a range of 1012 to 1013 poises. In embodiments including one or more nitrogen pulses, the nitrogen pulse can facilitate demolding of the glass sheet and inhibit oxidation of the vacuum mold, which can still be at a high temperature immediately after reforming. In some embodiments, removing glass sheet from mold 810 in step 416 can include injecting one or more nitrogen pulses into slot 826.

In some embodiments including a mold surface 816 with a central surface region 822 and a perimeter surface region

824, a surface temperature of central surface region 822 can be controlled to have a first maximum temperature during reforming and a surface temperature of perimeter surface region 824 can be controlled to have a second maximum temperature during reforming. In some embodiments, one or more cooling blocks 880 can be utilized to control the maximum surface temperature of central surface region 822 and/or perimeter surface region 824. In some embodiments, the first maximum temperature can be 20° ° C. to 50° C. less than the second maximum temperature. In some embodiments, the first maximum temperature can be 20° ° C. to 150° ° C. less than the second maximum temperature. In some embodiments, the first maximum temperature can be 50° ° C. to 150° ° C. less than the second maximum temperature.

After removing reformed glass sheet 201 from vacuum mold 810, excess glass sheet material can be removed from reformed glass sheet 201 in step 418 to create a reformed glass article (e.g., reformed glass article 250 shown in FIG. 6B). In some embodiments, removing excess glass sheet material can include removing perimeter portion 240 and first portions 220 from reformed glass sheet 201 such that a reformed glass article 250 defined by second portion 230 remains. In some embodiments, removing excess glass sheet material can include removing all portions of reformed glass sheet 201 that were formed outside of central surface region 822. In some embodiments, excess glass sheet material can be removed using a cutting process, for example a laser cutting process or a water jet cutting process. In some embodiments, excess glass sheet material can be removed using mechanical scoring and breakage of the glass along the score line. In some embodiments, removing excess glass sheet material can include cutting the reformed glass sheet 201 along the portion of reformed glass sheet 201 positioned over slot 826 during reforming.

As used herein the term "glass" is meant to include any material made at least partially of glass, including glass and glass-ceramics. "Glass-ceramics" include materials produced through controlled crystallization of glass. In embodiments, glass-ceramics have about 30% to about 90% crystallinity. Non-limiting examples of glass ceramic systems that may be used include $Li_2O\times Al_2O_3\times nSiO_2$ (i.e. LAS system), $MgO\times Al_2O_3 \times nSiO_2$ (i.e. MAS system), and $ZnO\times Al_2O_3\times nSiO_2$ (i.e. ZAS system).

The embodiments described herein may be further understood in view of the following information.

Figure 14:
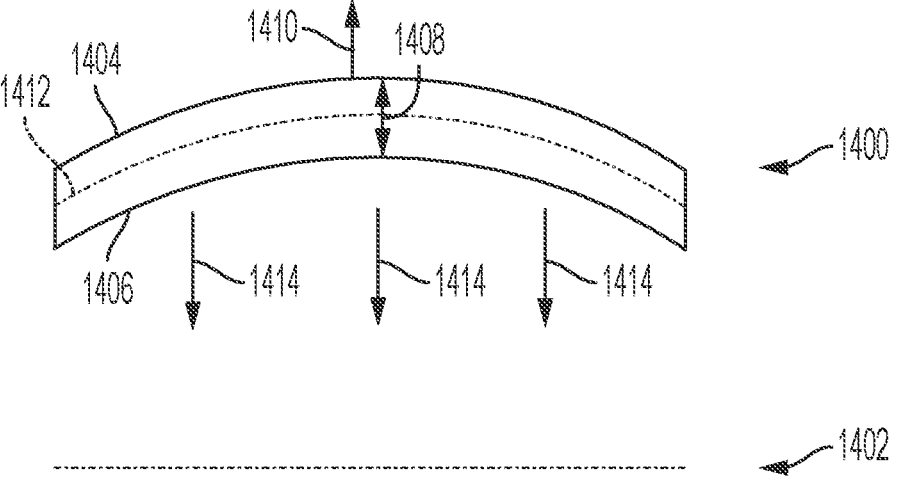
FIG. 14 shows a cross-sectional view of a glass article formed via the reforming techniques described herein according to some embodiments.

FIG. 14 schematically depicts a cross-sectional view of a reformed glass article 1400 fabricated via the methods described herein and an imaginary surface 1402, according to an example embodiment. In embodiments, the imaginary surface 1402 represents an imaginary plane that points contained in an imaginary central surface 1412 defined by the glass article 1400 may be displaced into, as signified by the arrows 1414, during a simulation to determine a complexity of the curved shape of the glass article 1400. The reforming techniques described herein are capable of producing glass articles having higher complexity than certain pre-existing hot-forming techniques, with the glass article 1400 beneficially exhibiting high thickness uniformity and relatively low levels of optical distortion.

As shown, the glass article 1400 comprises a first curved surface 1404, a second curved surface 1406, and a thickness 1408 extending between the first curved surface 1404 and the second curved surface 1406. In embodiments, the first curved surface 1404 and the second curved surface 1406 define a non-developable curved shape of the glass article 1400. In embodiments, the thickness 1408 represents a distance between the first curved surface 1404 and the second surface 1406 along a direction 1410 extending perpendicular to the first major surface 1404. As will be appreciated, the direction 1410 in which the thickness 1408 is measured may vary as a function of position on the first curved surface 1408 given the non-developable curved shape. In embodiments, the thickness 1408 may correspond to a minimum distance from the first curved surface 1404 to the second curved surface 1406, as measured from a particular point on the first curved surface 1404. In embodiments, the thickness 1408 can range from 0.25 millimeters to 10 millimeters, 0.5 millimeters to 5 millimeters, 0.5 millimeters to 2.5 millimeters, 2.5 millimeters to 5 millimeters, 2.5 millimeters to 10 millimeters, or within a range having any two of these values as endpoints. In embodiments, the thickness 1408 can range from 0.1 millimeters to 10 millimeters, from 0.2 millimeters to 10 millimeters, from 0.3 millimeters to 10 millimeters, from 0.4 millimeters to 10 millimeters, from 0.5 millimeters to 10 millimeters, from 0.6 millimeters to 10 millimeters, from 0.7 millimeters to 10 millimeters, from 0.8 millimeters to 10 millimeters, from 0.9 millimeters to 10 millimeters, from 1 millimeter to 10 millimeters, from 1.1 millimeters to 10 millimeters, from 1.2 millimeters to 10 millimeters, from 1.4 millimeters to 10 millimeters, from 1.5 millimeters to 10 millimeters, from 1.6 millimeters to 10 millimeters, from 1.8 millimeters to 10 millimeters, from 2 millimeters to 10 millimeters, from 2.1 millimeters to 10 millimeters, from 2.5 millimeters to 10 millimeters, from 3 millimeters to 10 millimeters, from 4 millimeters to 10 millimeters, from 5 millimeters to 10 millimeters, from 0.1 millimeters to 9 millimeters, from 0.1 millimeters to 8 millimeters, from 0.1 millimeters to 7 millimeters, from 0.1 millimeters to 6.5 millimeters, from 0.1 millimeters to 6 millimeters, from 0.1 millimeters to 5.5 millimeters, from 0.1 millimeters to 5 millimeters, from 0.5 millimeters to 4 millimeters, from 0.7 millimeters to 3.6 millimeters, from 0.7 millimeters to 3.3 millimeters, from 0.7 millimeters to 2.1 millimeters, from 0.7 millimeters to 1.6 millimeters, or from 0.7 millimeters to 1.1 millimeters, or within a range having any two of these values as endpoints.

The value obtained when measuring the thickness 1408 may vary depending on the location on the first curved surface 1404. As described herein, the deep vacuum forming methods described herein facilitate the thickness 1408 being substantially uniform over the entire first curved surface 1404. For example, if a plurality of measurements of the thickness 1408 (e.g., 10 measurements) are taken over a particular 1000 mm² portion of the surface area of the first curved surface 1404, the measurements may all be within 150 μm of one another (e.g., such that a difference between a maximum value of the values obtained and a minimum value is less than or equal to 150 μm). That is, the thickness uniformity of the glass article 1400 may be +/−75 microns per 1000 mm² of surface area on the first curved surface 1404. In embodiments, the thickness uniformity of the glass article 1400 may be +/−75 microns per 10000 mm² of surface area on the first curved surface 1404. In embodiments, the thickness uniformity is +/−50 microns per 1000 mm² of surface area on the first curved surface 1404. In embodiments, the thickness uniformity is +/−25 microns per 1000 mm² of surface area on the first curved surface 1404.

In embodiments, at least one of the first curved surface 1404 and the second curved surface 1406 comprises a surface area in the range of 60,000 mm² to 6 m² and a thickness uniformity of +/−75 microns per 1000 mm². In embodiments, at least one of the first curved surface 1404 and the second curved surface 1406 comprises a surface area in the range of 60,000 mm² to 6 m² and a thickness uniformity of +/−75 microns per 10000 mm². In embodiments, at least one of the first curved surface 1404 and the second curved surface 1406 comprises a surface area in the range of 60,000 mm² to 6 m² and a thickness uniformity of +/−50 microns per 10000 mm². In embodiments, at least one of the first curved surface 1404 and the second curved surface 1406 comprises a surface area in the range of 60,000 mm² to 6 m² and a thickness uniformity of +/−25 microns per 10000 mm².

In embodiments, the non-developable curved shape defined by the first curved surface 1404 and the second curved surface 1406 comprises a maximum compressive strain shape parameter, defined by the imaginary central surface 1412 of the glass article 1400 and the imaginary surface 1402. The maximum compressive strain shape parameter represents a complexity of the shape into which the processes described herein are capable of reforming flat glass sheets without introducing wrinkling or other significant thickness deviations. The maximum compressive strain shape parameter is primarily a function of the Gaussian curvature associated with the imaginary central surface 1412 and the dimensions thereof (e.g., a length and a width in an assigned coordinate system). The thickness of the glass has a minor effect on the maximum compressive strain shape parameter, but the effect is negligible.

The maximum compressive strain shape parameter may be computed by simulating the imaginary central surface 1412 as an imaginary glass sheet. The properties of the imaginary glass sheet may be independent of the properties of the actual glass article 1400 (physically produced via the methods described herein). In an example, the imaginary glass sheet has a thickness of 0.7 mm, a Young's modulus of 71.7 GPa, and a Poisson's ratio of 0.21, and a density of 2440 kg/m³. The imaginary glass sheet is discretized into trilateral or quadrilateral shell elements (or a combination thereof) associated with a commercially available finite element analyzer. In embodiments, Ansys® Mechanical™ is used to compute the maximum compressive strain shape parameter, with the imaginary central surface 1412 being discretized using SHELL181 elements (avoiding use of the degenerate triangular option, except when used as a filler in mesh generation). Particularly, a simulation is conducted of the strains that would be present in the imaginary glass sheet when the imaginary glass sheet (initially having the shape of the imaginary central surface 1412) is flattened to have the planar shape of the imaginary surface 1402. A command script is used to assign boundary conditions associated with the nodal displacements of the simulation (e.g., to define the imaginary surface 1402 for flattening the imaginary glass sheet). The boundary conditions may also prevent rigid body motion of the imaginary glass sheet (e.g., by assigning the imaginary surface 1402 to be tangent to a portion of the imaginary central surface 1412). Nodes associated with each shell element are displaced along the arrows 1414 until the nodes are each located on the imaginary surface 1402 (e.g., the z-coordinates of each of the nodes are zeroed out in the coordinate system established by the boundary conditions, without the x or y coordinates of each node changing, such that the length and width of the simulated flattened glass sheet is the same as that of the initial glass article 1400 being simulated). The finite element analysis is carried out using the implicit method, including nonlinear analysis. The maximum value of the major principle strain is the maximum compressive strain shape parameter described herein. The mesh size associated with the shell elements is less than or equal to 0.5 mm to ensure a convergent solution.

The imaginary central surface 1412 is a surface representing a central plane of the glass article 1400. Each point on the imaginary central surface 1412 is equidistant from the first curved surface 1404 and the second curved surface 1406 along a direction extending perpendicular to the imaginary central surface 1412 at that point.

Certain existing vacuum forming methods may not be capable of producing glass articles having non-developable shapes with a maximum compressive strain parameter of greater than 1% or 2% without substantial defects or thickness variations. The deep vacuum forming methods described herein, in contrast, are able to reform flat glass sheets to curved glass articles with curved surfaces defining a non-developable shape with a maximum compressive strain shape parameter of greater than or equal to 3.0% (e.g., greater than or equal to 3.5%, greater than or equal to 4.0%, greater than or equal to 4.5%, greater than or equal to 5.0%). In one or more embodiments, the curved glass articles have curved surfaces defining a non-developable shape with such maximum compressive strain shape parameter ranges while still exhibiting a thickness uniformity of +/−75 μm (e.g., +/−50 μm, +/−25 μm) per at least 1000 mm² of surface area of the part.

In embodiments, the maximum compressive strain shape parameter associated with the glass article 1400 may be approximated using the following equation when the glass article has a periphery that is substantially parallelepiped shaped (or in cases where a majority of the periphery of the glass article has a radius of curvature of greater than 10 m):

$$MCSSP = 0.0725 * \kappa * \left(1.0667 - 120.9477 * e^{-3.3572 * \frac{w}{l}}\right) * l^2 \quad (1)$$

where κ is an average Gaussian curvature of the imaginary central surface 1412, 1 is a length of a flat glass sheet that the imaginary glass sheet is simulated to be flattened into, and w is a width of the flat glass sheet (units of each constant are such that the result is in units of mm/m, which can be converted to a percent by dividing the numerical mm/m result by 10). When the glass article comprises a substantially circular (or where a majority of the periphery of the glass article has a radius of curvature of less than 10 m), the maximum compressive strain shape parameter may be approximated mathematically based on the following relationship:

$$MCSSP = 0.0354 * \kappa * D^2 \quad (2)$$

where D is the diameter of the circular glass plate that the imaginary glass sheet is flattened into. Units associated with the constants in equations (1) and (2) are set such that the output of equations (1) and (2) are in the units of mm/m (which may be converted to a percent by dividing the output by 10).

In embodiments, the curved shape of reformed glass article 1400 can have an optical power distortion measured through the thickness 1408 below 300 millidiopters in absolute value. In some embodiments, the curved shape of reformed glass article 1400 can have an optical power distortion measured through the thickness 1408 ranging from 20 millidiopters to 300 millidiopters (in absolute value). In some embodiments, the curved shape of reformed glass article 1400 can have an optical power distortion measured through the thickness 1408 ranging from 50 millidiopters to 300 millidiopters (in absolute value). In some embodiments, the curved shape of reformed glass article 1400 can have an optical power distortion measured through the thickness 1408 ranging from 100 millidiopters to 300 millidiopters (in absolute value). The optical power distortion of the curved shape can be measured in accordance with DIN 52305:1995 ("Determining the optical distortion and refractive power of safety glazing material for road vehicles").

In some embodiments, the first curved surface 1404 of reformed glass article 1400 can have a measurable dimple density of less than 10 dimples per 100 mm² convex surface area. As used herein, a measurable dimple is a raised or recessed dimple formed on the first curved surface 1404 and comprising an effective diameter of greater than 1 mm. Measurable dimples can be identified by measuring optical distortion of light transmitted through the first curved surface 1404 of glass article 1400. An optical distortion of 50 or more millidiopters (mdpt) after a noise filter is applied to the measurement data can indicate the presence of a measurable dimple, or an optical distortion of 100 or more millidiopters (mdpt) before a noise filter is applied to the measurement data can indicate the presence of a measurable dimple. Optical distortion can be measured using a device that measures transmitted optical distortions on glass. For example, optical distortion can be measured using a LAB-SCAN-SCREEN system available from ISRA Vision. For purposes of evaluating a measurable dimple density, at least one 50,000 mm² surface area on the first curved surface 1404 is analyzed and the number of measurable dimples per 100 mm² is calculated based on the total number of measurable dimples present. To confirm the accuracy of the number of dimples per 100 mm² for the 50,000 mm² surface area, a 5,000 mm² surface area inside the 50,000 mm² surface area can be re-analyzed and the number of measurable dimples per 100 mm² is calculated based on the total number of measurable dimples present in the 5,000 mm² surface area.

As will be appreciated, the glass article 1400 may have a variety of shapes and the particular form of the glass article 1400 is not particularly limiting. For example, in embodiments, an outer peripheral shape of the glass article 1400 can comprise a length (L) extending in a first direction extending parallel to the imaginary surface 1402 and a width (W) extending in a second direction parallel to the imaginary surface 1404 and perpendicular to the first direction. The length (L) and width (W) may represent the maximum dimensions of the glass article 1400 in the first and second directions, respectively. In embodiments, an outer peripheral edge of the glass article 1400 may be substantially parallelepiped (e.g., rectangular) shaped. In embodiments, the outer peripheral edge of the glass article 1400 may be substantially circular-shaped (e.g., such that a majority of the peripheral edge possesses radius of curvature of less than 10 m) and comprise a diameter (D) representing a maximum distance between two points on the outer peripheral edge.

The deep vacuum forming techniques described herein may also be used to co-form (e.g., co shape, co-sag, co-press) multiple glass sheets such that each of the glass sheets comprises a complex curved shape, as described with the respect to the glass article depicted in FIG. 14. Co-forming multiple glass sheets simultaneously beneficially facilitates forming the glass sheets conforming with one another in shape, facilitating formation of high-quality laminate components (e.g., for windshields, side windows, safety glass, or any other component including a plurality of glass sheets laminated to one another). The deep vacuum forming techniques described herein may be particularly beneficially when forming glass articles having an extreme gaussian 3D shape (e.g., such that one or more of the curved glass substrates comprises a maximum compressive strain shape parameter of 3.0% or more).

With reference to FIG. 7, it has been found that, when two glass layers are placed on top of one another for co-forming via the techniques described herein, the top glass layer 203 (e.g., the glass layer further away from the mold surface 116 described herein with respect to FIGS. 1A and 1B) may not adequately follow the bottom glass layer 205 during reforming, especially in areas that are reformed to possess the smallest radii of curvature (or highest levels of Gaussian curvature) post-reforming, leading to significant shape deviations between the two glass layers. Such shape deviations may adversely impact the performance of a laminate incorporating the glass layers (e.g., by introducing significant optical distortion or by hindering bonding strength between the glass layers by an adhesive or polymer interlayer disposed between the glass layers during lamination). Particularly, it has been found that the bottom glass layer 205 hinders the application of vacuum pressure to the top glass layer 203, creating a differential in vacuum pressure applied thereto. Such differential vacuum pressure has been found to lead to air pocket formation between the top glass layer 203 and the bottom glass layer 205.

Figure 15:
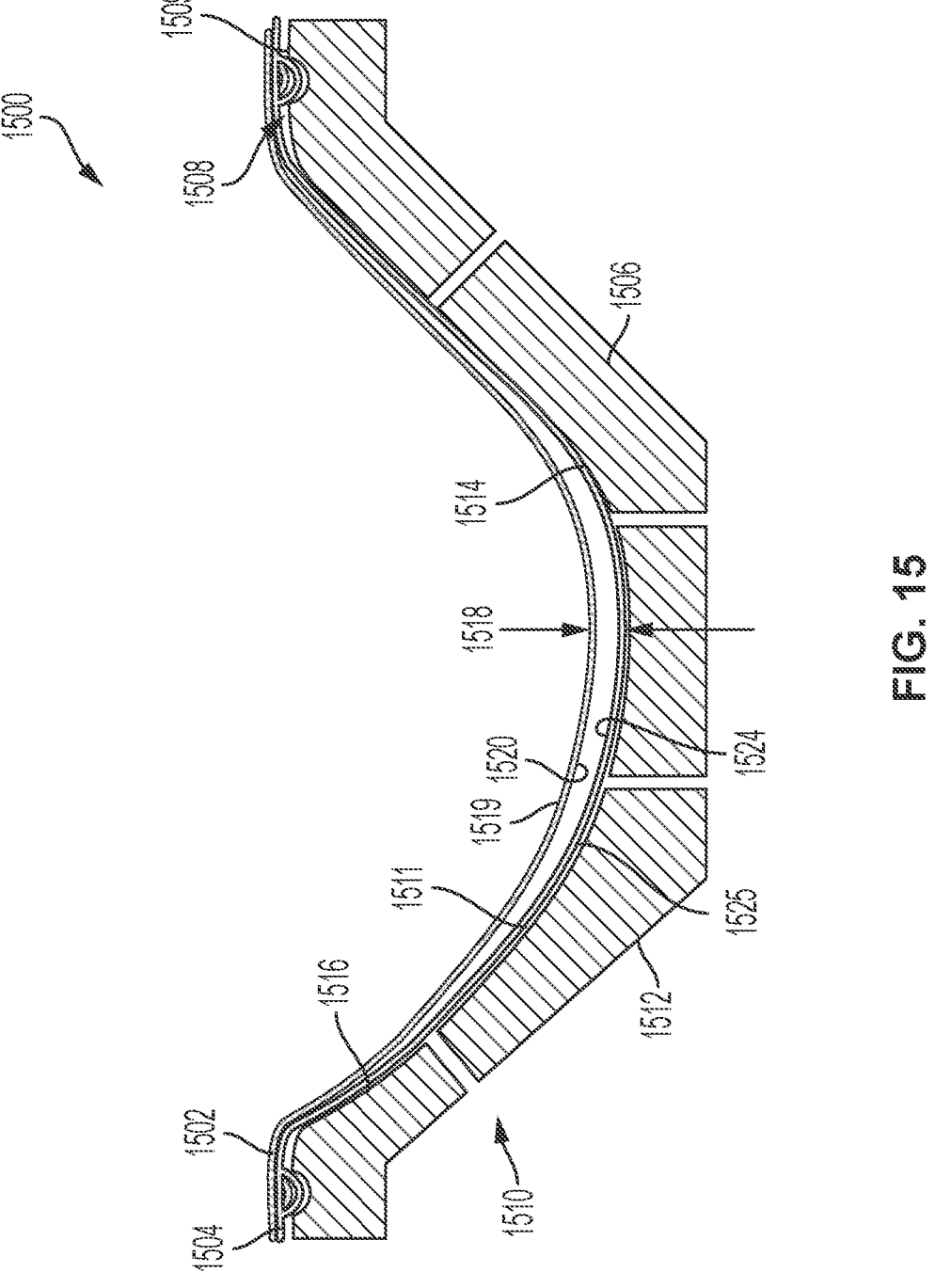
FIG. 15 shows a cross-sectional view of a stack of glass layers after being reformed on a vacuum mold according to some embodiments.

FIG. 15 schematically depicts a cross-sectional view of a stack 1500 comprising a top glass layer 1502 and a bottom glass layer 1504 that has been reformed on a mold 1506 via the methods described herein. In the depicted embodiment, the top glass layer 1502 and the bottom glass layer 1504, prior to reforming, have the same thickness and composition. The top glass layer 1502 is depicted to include a first major surface 1519 and a second major surface 1520. The bottom glass layer 1504 is depicted to include a first major surface 1524 and a second major surface 1525. In embodiments, the top glass layer 1502 and the bottom glass layer 1504 have structures that are similar to the glass sheet 200 described herein. Embodiments are also envisioned where the top glass layer 1502 differs from the bottom glass layer 1504 in at least one of thickness, composition. In such embodiments, it may be beneficial to have the stiffer glass layer (that is the glass that is most resistant to bending based on thickness and viscosity at a given reforming temperature) as the top glass layer 1502.

Figures 9A, 9B:
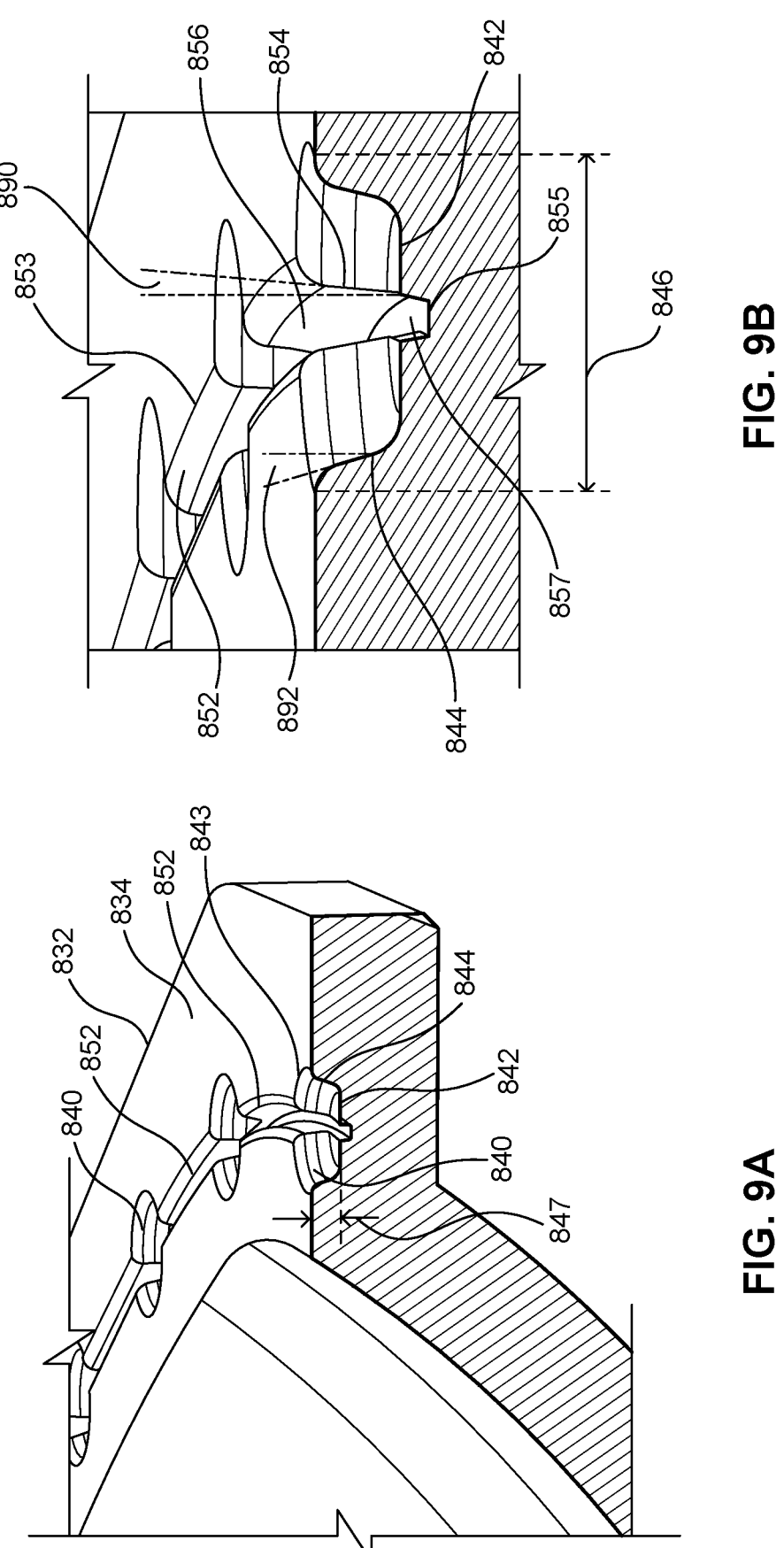
FIG. 9A is a cross-sectional view of the vacuum mold of FIG. 8 along the cross-section line 9-9' according to some embodiments.
FIG. 9B is an enlarged view of a portion of FIG. 9A.
Figure 10:
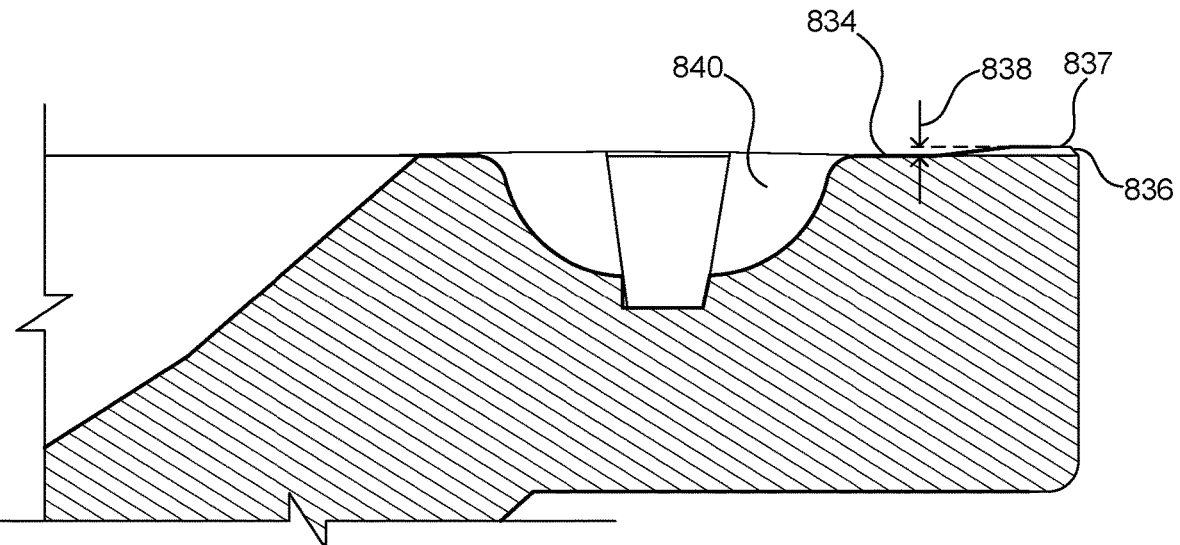
FIG. 10 is a cross-sectional view of the vacuum mold of FIG. 8 along the cross-section line 9-9' according to some embodiments.

The mold 1506 is depicted to include a plurality of vacuum openings 1508 formed in a top wall 1509 thereof and a plurality of vacuum holes 1510 extending between a mold surface 1511 and a bottom surface 1512 of the mold 1506. In embodiments the mold 1506 has generally the same structure and function of the vacuum mold 810 described herein with respect to FIGS. 8-9B (e.g., such that the vacuum openings 1508 generally have the same structure and function as the vacuum openings 840 and the vacuum holes 1510 generally have the same structure and function as the vacuum holes 818), with the understanding that various components of the mold 1506 have been omitted for the purposes of clarity and discussion.

In the depicted embodiment, a portion of the plurality of vacuum holes 1510 are disposed in a perimeter surface region 1516 (e.g., proximate to an external edge of the stack 1500) of the mold surface 1511, while another portion of the plurality of vacuum holes 1510 are disposed in a central surface region 1514 of the mold surface 1511. In embodiments, as described herein, the central surface region 1514 may generally include a curved shape that corresponds to that of the finished reformed glass article and have a minimum radius of curvature that is greater than that of the perimeter surface region 1516. Portions of the stack 1500 that contact or overlap (e.g., in a direction extending perpendicular to the mold surface 1511) the perimeter surface 1516 may be cut from the stack 1500 after reforming and discarded (i.e., not incorporated into the final glass article). In embodiments, the mold 1506 does not comprise any vacuum holes within the central surface region 1514 to facilitate surface uniformity in the resultant reformed glass article.

In embodiments, additional retainers (not depicted) are used to hold the top glass layer 1502 against the bottom glass layer 1504. The retainers are needed because the negative vacuum pressure from the vacuum openings 1508 is not applied to the edges of the top glass layer 1502. The retainers may apply a force to the top glass layer 1502 against the bottom glass layer 1504. In embodiments, the retainers may comprise one or more weights (e.g., alumina rods) placed around the perimeter of the stack 1500 on the top glass layer 1502 such that gravity forces retain the top glass layer 1502 against the bottom glass layer 150. Other mechanical retainers (e.g., clips, air pressure) are contemplated and within the scope of the present disclosure.

It has been found that, during reforming, air pockets are formed between the top glass layer 1502 and the bottom glass layer 1504, resulting in a gap 1518 (measured in a direction extending perpendicular to the mold surface 1511 at a particular point) between a second major surface 1520 of the top glass layer 1502 and a first major surface 1524 of the bottom glass layer 1504. Particularly, it has been found that, when the top glass layer 1502 and the bottom glass layer 1504 are identical in composition and thickness, the top glass layer 1502 generally follows the bottom glass layer 1502 at the perimeter surface region 1516 of the mold surface 1511, but the gap 1518 reaches values of 10 to 30 mm in areas of the mold surface 1511 having relatively high magnitudes of gaussian curvature (which, in embodiments, may be located in the central surface region 1514). When the gap 1518 has a maximum value of greater than 10 mm, subsequent lamination of the top glass layer 1502 and the bottom glass layer 1504 may be hindered (e.g., causing potential delamination).

Figure 16A:
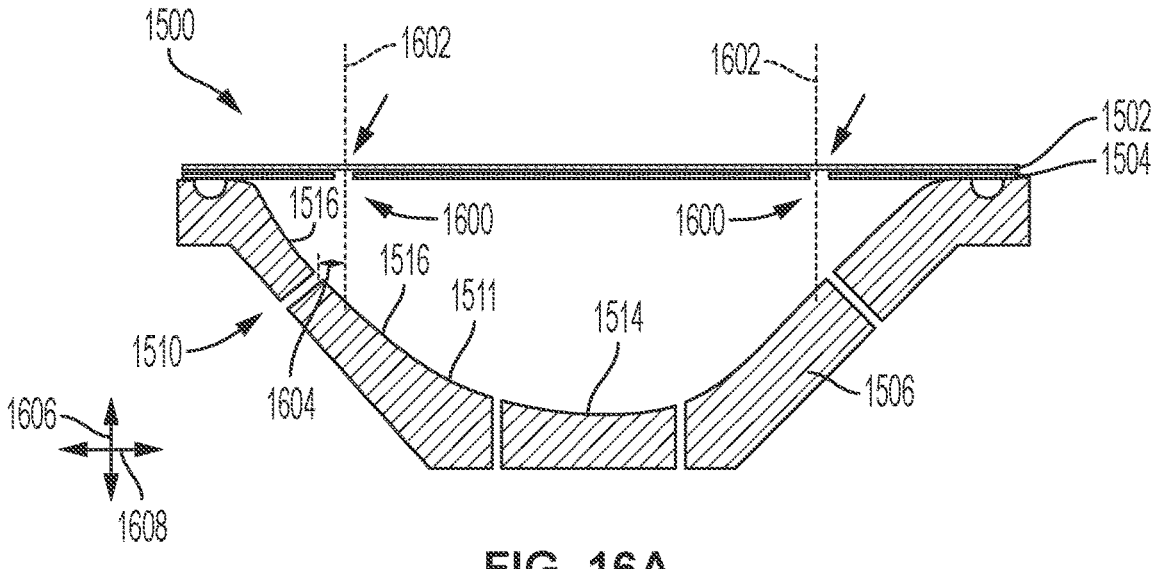
FIG. 16A shows a cross-sectional view of a stack of glass layers comprising a bottom glass layer with vacuum vias formed therein prior to being reformed on a vacuum mold according to some embodiments.
Figure 16B:
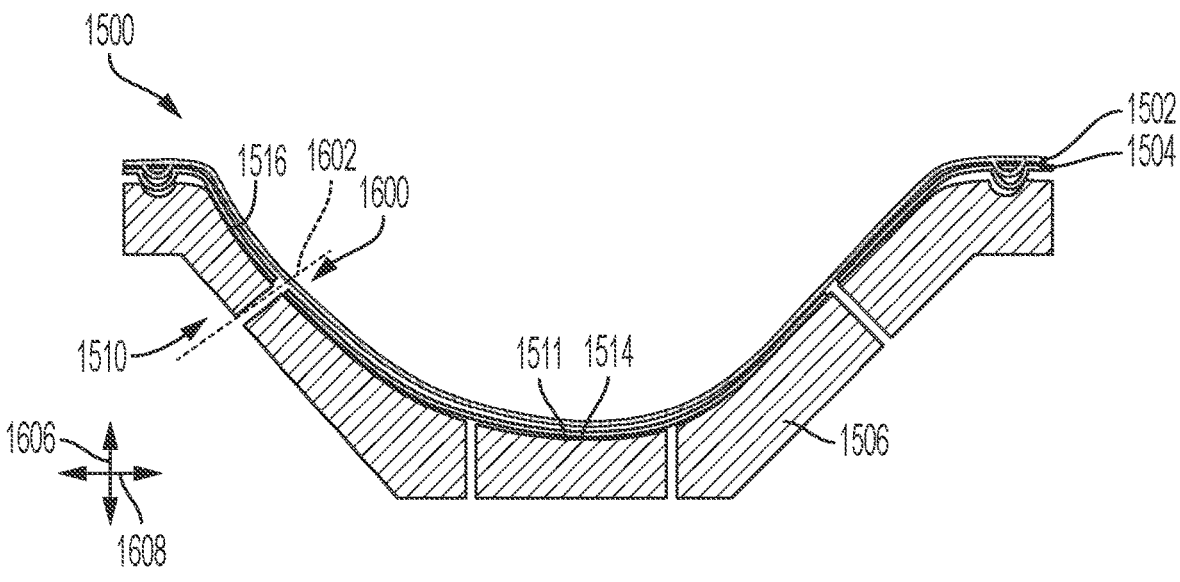
FIG. 16B shows a cross-sectional view of the stack of glass layers after reforming on the vacuum mold depicted in FIG. 16A according to some embodiments.

In view of the foregoing, Applicant has found modifications that may be made to the stack 1500 prior to reforming to reduce the shape mismatch between the top glass layer 1502 and the bottom glass layer 1504. FIGS. 16A and 16B schematically depict a modified version of the stack 1500 described herein with respect to FIG. 15 prior to and after reforming via the mold 1506, respectively. As shown in FIG. 16A, the stack 1500 has been modified in that the bottom glass layer 1504 comprises a plurality of vacuum vias 1600 extending through the entire thickness thereof (e.g., from the first major surface 1524 to the second major surface 1525, see FIG. 15), such that portions of the top glass layer 1502 are exposed when viewed from the side of the mold surface 1511. Applicant has found that the presence of the vacuum vias 1600 beneficially prevents the formation of air pockets between the top glass layer 1502 and the bottom glass layer 1504, thereby allowing negative vacuum pressure to be applied directly to the top glass layer 1502. The vacuum vias 1600 facilitate the top glass layer 1502 being pulled against the bottom glass layer 1504 during reforming and reducing the shape mismatch between the top glass layer 1502 and the bottom glass layer 1504, as compared to embodiments not including the vacuum vias 1600.

The number, arrangement, and size of the vacuum vias 1600 may vary depending shape of the glass article being formed and the thickness and composition of the top glass layer 1502 and the bottom glass layer 1504. In embodiments the plurality of vacuum vias 1600 are circular in shape, and have a diameter of greater than or equal to 1.0 mm and less than or equal to 5.0 mm (e.g., greater than or equal to 2.0 mm and less than or equal to 4.0 mm). In embodiments, the bottom glass layer 1504 comprises at least 2 vacuum vias. Experiments have shown that 2, 3, or 4 vacuum vias may be enough to prevent air pockets during deep vacuum forming, though embodiments with greater numbers of vacuum vias are contemplated and within the scope of the present disclosure. Generally, the larger the surface area top glass layer 1502 and the top glass layer 1504, the greater uniformity with which the on the periphery of the final part to be formed (e.g., along the boundary between the central surface region 1514 and the peripheral surface region 1516). Embodiments are also envisioned where one or more of the plurality of vacuum vias 1600 are placed in the last-formed, or deepest reformed area of the article, which may be overlapping the central surface region 1514, though this is not required for certain applications.

In embodiments, the vacuum vias 1600 are located in the bottom glass layer 1504 such that, after reforming, the vacuum vias 1600 are disposed on the peripheral surface region 1516 of the mold surface 1611. That is, the vacuum vias 1600 may be located in the bottom glass layer 1504 such that, after reforming, the vacuum vias are located radially outward of a boundary between the central surface region 1514 and the peripheral surface region 1516. In embodiments, the vacuum vias are located as close as possible to the boundary between the central surface region 1514 and the peripheral surface region 1516, but still on the peripheral surface side of the boundary. As described herein, after reforming, the stack 1500 may be cut using a suitable technique at the boundary between the central surface region 1514 and the peripheral surface region 1516 such that only the portion of the stack 1500 overlapping the central surface region 1514 (in directions extending perpendicular to the mold surface 1511) are included in the final glass article. As such, providing the vacuum vias as close as possible to the boundary between the central surface region 1514 and peripheral surface portion 1516 may maximize the vacuum pressure that the central portions of the stack 1500 are exposed to, while still excluding the vacuum vias from the final glass article. Such a setup aids in reducing shape mismatch between the top glass layer 1502 and the bottom glass layer 1504, while preventing the formation of the vacuum vias 1600 from having any detrimental effects on the final glass article.

In embodiments, the vacuum vias 1600 are located in the bottom glass layer 1504 so as to not be uniformly distributed around the perimeter of the central surface region 1514. That is, the vacuum vias 1600 may be non-uniformly distributed around the perimeter of the central surface region 1514. For example, in embodiments, the vacuum vias 1600 are positioned to be proximate to the areas of the central surface region 1514 that comprise relatively high Gaussian curvatures. In embodiments, the vacuum vias 1600 may be arranged in two pairs, with each pair located to be proximate to a point on the mold surface 1511 after reforming that possess a local maximum in the Gaussian curvature. Locations on the boundary for each pair may be selected so as to minimize a distance between a midpoint on a line connecting the centers of the vacuum vias in each pair and the local maximum of the gaussian curvature. As described herein, at such points of maximum Gaussian curvature, the top glass layer 1502 may be especially likely not to follow the sagging of the bottom glass layer 1504. Such an arrangement of the vacuum vias 1600 may provide a relatively uniform distribution of vacuum pressure to those points to facilitate bending of the top glass layer 1502.

In embodiments, as depicted in FIG. 16A, the vacuum vias 1600 are positioned within the bottom glass layer 1504 such that, when the stack 1500 is positioned on the mold 1506, the vacuum vias are offset from the vacuum holes 1510. Each of the vacuum vias 1600 may include a central axis 1602 extending in a direction 1606 that is perpendicular to the first major surface 1524 and the second major surface 1525 of the bottom glass layer 1504 prior to reforming (see FIG. 15). In the example shown in FIG. 16A, the vacuum vias 1600 are positioned such that, when the stack 1500 is positioned on the mold 1506 for reforming, the central axis 1602 of each of the vacuum vias 1600 is offset from an associated one of the vacuum holes 1510. In embodiments, each of the vacuum vias 1600 may be offset from a nearest one of the vacuum holes 1510 in a direction 1608 extending parallel to the first major surface 1524 and the second major surface 1525 prior to reforming by a distance 1604. As shown in FIG. 16B, the distance 1604 of the offset may be such that, after reforming, the central axis 1602 of each of the vacuum vias 1600 extends through one of the vacuum holes 1510. As such, the distance 1604 may vary depending on the shape of the mold surface 1511 proximate to each of the vacuum holes 1510. Such a configuration beneficially reduces the impedance of the negative vacuum pressure from being applied to the top glass layer 1502. Due to the central axis 1602 associated with each of the vacuum vias 1602 extending through one of the vacuum holes 1510, negative pressure applied to the top glass layer 1502 may be maximized towards the end of the re-forming process, facilitating the top glass layer 1502 matching the curvature of the bottom glass layer 1504. The plurality of vacuum vias 1600 can be positioned adjacent to areas of the mold surface 1511 that have maximum Gaussian curvature within the peripheral surface region 1516. In embodiments, the vacuum vias 1600 are arranged in pairs such that the central axis 1602 (at a position within each vacuum via 1600) in each vacuum via of each pair are equidistant from one of the vacuum holes 1510 prior to reforming.

Figure 17:
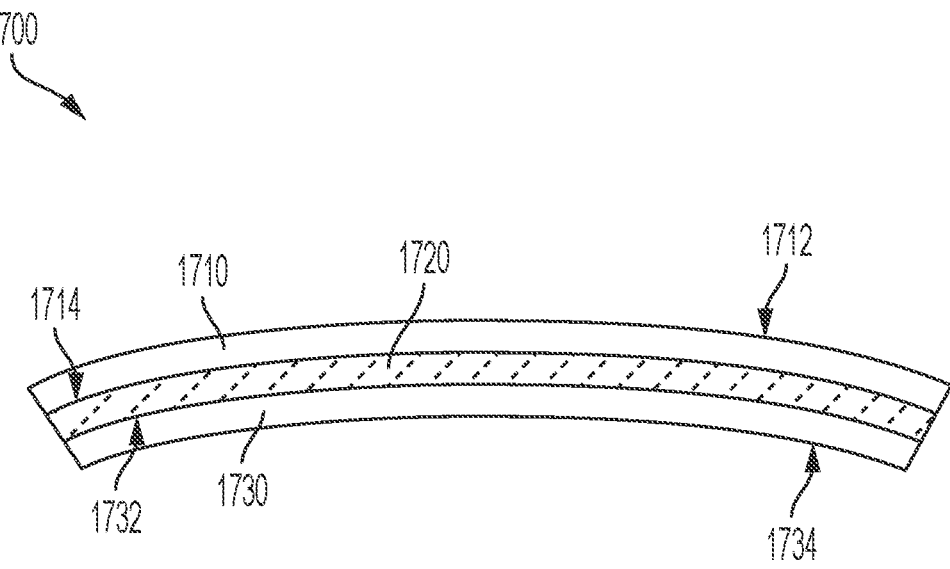
FIG. 17 shows a cross-sectional view of a laminate formed via co-forming a stack of glass layers according to some embodiments.

FIG. 17 schematically depicts a laminate 1700 including a first substrate 1710 having a complexly curved shape and having at least one convex surface provided by a first surface 1712 opposite at least one concave surface provided by a second surface 1714 with a thickness therebetween. The laminate also includes a second substrate 1730 that is complexly-curved. In one or more embodiments, the second substrate 1730 may be cold-formed. The second substrate 1730 includes at least one convex surface provided by a third surface 1732 opposite at least one concave surface provided by a fourth surface 1734, with a thickness therebetween. As shown in FIG. 17 an interlayer 1720 may be disposed between the first substrate 1710 and the second substrate 1730. In embodiments, the interlayer 1720 is affixed to at least second surface 1714 and the third surface 1732 of the laminate. In embodiments, the interlayer 1720 comprises a material selected from the group consisting of polyvinyl butyral (PVB) resin, ethylenevinylacetate copolymer (EVA), ionomers, polyvinyl chloride copolymers and thermoplastic polyurethanes (TPUs). The thickness of the interlayer 1720 may be in the range from about 0.3 mm to about 2 mm.

In embodiments, the first substrate 1710 and second substrate 1730 are formed of the same composition and have average thicknesses that are substantially similar to one another (e.g., within 2% of one another). In embodiments, the first substrate and the second substrate 1710 and 1730 differ from one another in at least one of thickness, composition and surface compressive stress. For example in embodiments, the first substrate 1710 is constructed of a first glass composition (e.g., a soda lime glass, a borosilicate glass) and comprises a first thickness, and the second substrate 1730 is constructed of a second glass composition (e.g., an alkali aluminosilicate composition, a soda lime composition) and comprises a second thickness. The first glass composition may be different from the second glass composition and the first thickness may be greater than the second thickness (e.g., at least 1.5 times the second thickness, at least 2.0 times the second thickness, at least 2.5 times the second thickness, at least 3.0 times the second thickness). The first glass substrate may comprise a surface compressive stress that is different from the surface compressive stress of second glass substrate (as measured on the concave surface of each of the first glass substrate and second glass substrate). In one or more embodiment, the difference in surface compressive stress is caused by cold-forming the second glass substrate. For example, the surface compressive stress of the concave surface of the second glass surface may be greater than the surface compressive stress of the concave surface of the first glass. The first and second substrates 1710 and 1730 may have any of the combinations of thicknesses/compositions described in U.S. Pat. No. 10,450,215, hereby incorporated by reference in its entirety. The laminate 1700 may form an automotive glazing and potentially be used in any of the applications described in U.S. Pat. No. 10,450,215.

In embodiments, the first substrate 1710 and the second substrate 1730 of the laminate 1700 may each be formed via the reforming processes described herein. For example, in embodiments, each of the first substrate 1710 and the second substrate 1730 is individually reformed via the method 400 described herein with respect to FIG. 4 and/or FIGS. 8-13. Each of the first substrate 1710 and the second substrate 1730 may comprise a non-developable curved shape and meet the thickness uniformity requirements described herein. In embodiments, each of the first and second substrate 1710 and 1730 may have a complexly curved shape and meet the thickness uniformity requirements described herein with respect to the glass article 1400 described herein with respect to FIG. 14. For example, each of the first substrate 1710 and the second substrate 1730 comprises a maximum compressive strain shape parameter (e.g., determined by finite element analysis or approximated by equation (1)) that is greater than or equal to 3.0% and have a thickness uniformity of +/−75 μm per 1000 mm² of surface area.

In embodiments, the first substrate 1710 and the second substrate 1730 are reformed via forming a stack similar in structure to the stack 1500 described herein with respect to FIG. 16. For example, one of the first substrate 1710 and the second substrate 1730 may correspond to the top glass layer 1502 of FIG. 15, while the other of the first substrate 1710 and the second substrate 1730 may correspond to the bottom glass layer 1504 of FIG. 15. The one of the first substrate 1710 and the second substrate 1730 corresponding to the bottom glass layer 1504 may incorporate vacuum vias during reforming, which are subsequently removed prior to incorporation into the laminate 1700.

The co-forming process described herein incorporating the vacuum vias may beneficially facilitate the inner surfaces of the laminate having relatively low shape mismatches. That is, the second surface 1714 of the first substrate 1710 and the first surface 1732 of the second substrate 1730 may substantially correspond to one another to facilitate bonding the first and second substrates 1710 and 1730 to one another via the interlayer 1720. In embodiments, the shape mismatch between the first and second substrates 1710 and 1730 may be measured by scanning the second surface 1714 and the first surface 1732 using a suitable three-dimensional laser scanner and determining how corresponding locations on each of the surfaces 1714 and 1732 differ from one another in position. Greater mismatches between the shapes of the first and second substrates 1710 and 1730 will tend to increase or decrease the gap between the first substrate 1710 and the second substrate 1714 from target values. In embodiments, as a result of the co-forming process described herein, the shape mismatch between the first and second substrates 1710 and 1730 has a magnitude that is less than or equal to 2.0 mm when measured through an entirety of the first surface 1712 or the second surface 1734. The shape mismatch may be measured using a suitable three-dimensional optical scanner, such as the ATOS Triple Scan supplied by GOM GmbH, located in Braunschweig, Germany. In embodiments, a magnitude of the shape mismatch between the first and second substrates is less than or equal to 1.0 mm over at least 80% (e.g., at least 90%) of the total surface area of the first surface 1712 or the second surface 1734.

FIG. 18 depicts a flow diagram of a method 1800 of fabricating a glass laminate with a complex non-developable shape, according to an example embodiment of the present disclosure. The method 1800 may be used to form a glass laminate of two or more glass layers, with each of the glass layers comprising a complex non-developable curved shape. In an example, the method 1800 may be used to fabricate the laminate 1700 described herein with respect to FIG. 17. The method 1800 may beneficially facilitate forming laminates with relatively low shape mismatch between the glass layers, while the glass layers are reformed to possess complex non-developable curved shapes and still have relatively uniform thickness distributions. The method 1800 may be used to fabricate laminates with complex shapes having relatively low optical distortions that existing co-forming methods are not capable of producing. The following description of the method 1800 will refer to various components in FIGS. 15-17 to refer to an example where the bottom glass layer 1504 depicted in FIG. 16A is used to form the first substrate 1710 of the laminate 1700 and the top glass layer 152 is used to form the second substrate 1730. It should be understood that the method 1800 is not limited to this example and various combinations are contemplated and within the scope of the present disclosure.

At block 1802, glass layers are provided. With reference to FIG. 16A, the top glass layer 1502 and the bottom glass layer 1504 are not particularly limited in terms of thickness and composition. In embodiments, the top glass layer 1502 and the bottom glass layer 1504 are the same composition (e.g., a soda lime glass, an alkali aluminosilicate glass) and thickness, while, in other embodiments, the top glass layer 1502 and the bottom glass layer 1504 may differ from one another in at least one of thickness and composition. The top glass layer 1502 and the bottom glass layer 1504 may be formed such that, after reforming, at least one major surface of each of the top glass layer 1502 and the bottom glass layer 1504 comprises a surface area of greater than or equal to 60,000 mm². The top glass layer 1502 and the bottom glass layer 1504 may be fabricated using any suitable process (e.g., a down-draw process, a float process) or purchased from a supplier. In embodiments, more than two glass layers are provided to facilitate forming laminates with more than two layers.

At block 1804, vacuum vias are formed in one or more bottom glass layers. In embodiments, the vacuum vias are formed in each of the glass layers provided at the block 1802, excepting the top glass layer. Using the stack 1500 described herein with respect to FIGS. 15-16B as an example, the vacuum vias 1600 are formed in the bottom glass layer 1504. As described herein, the vacuum vias 1600 may be placed outside of the targeted central zone to be incorporated into a final laminate to avoid any effects on final product attributes. For example, in the example described with respect to FIGS. 16A and 16B, the vacuum vias 1600 are arranged as close as possible to a boundary of the central surface region 1514 of the mold surface 1511 having a shape corresponding to a surface of a desired final product. In embodiments, the vacuum vias 1600 are non-uniformly distributed in the bottom glass layer 1504. The vacuum vias 1600 may be preferentially placed proximate to the areas of the mold surface 1511 that have the highest magnitude of gaussian curvature to facilitate preventing air pocket formation between the glass layers.

In embodiments, 2, 3, 4, 5, 6, 7, 8, 9, 10, or more vacuum vias are formed in each of the bottom glass layers. In embodiments, 2 to 4 vacuum vias are formed in the each of the bottom glass layers. The number of vacuum vias formed may depend on a desired shape of the laminate, with the understanding that embodiments including a mold surface 1511 with multiple points of relatively high Gaussian curvature may necessitate the formation of a greater number of vacuum vias. In embodiments, the vacuum vias are circular-shaped and have a diameter ranging from 1.0 mm to 5.0 mm (e.g., diameters greater than or equal to 2.0 mm and less than or equal to 4.0 mm). The size, number, and distribution of the vacuum vias may vary depending on the structure and composition of the glass layers, as well as the curvature of the mold surface 1511.

The vacuum vias 1600 may be formed by any suitable technique. In embodiments, the vacuum vias 1600 are formed using diamond drilling. In such embodiments, relatively low rotation speeds (e.g., greater than or equal to 400 rpm and less than or equal to 1000 rpm) are preferable to prevent defects (e.g., cracks) from forming in the glass layers. A suitable coolant (e.g., water) may also be applied on the surface of the glass contacted by the drill to prevent flaw formation. In embodiments, laser drilling may be used to form the vacuum vias 1600.

Referring still to FIG. 18, at block 1806, a non-stick agent is applied to at least one of the glass layers (between the glass layers). A suitable non-stick agent prevents the glass layers from sticking together when heating to the reforming temperature. Suitable non-stick agents include, but are not limited to, boron nitride, calcium silicate, carbon soot, or a combination thereof. In embodiments, the nonstick agent is applied to the surfaces of the glass layers that will contact one another during reforming. Using the stack 1500 in FIGS. 16A and 16B as an example, the nonstick agent may be applied to both the second major surface 1520 and the first major surface 1524.

At block 1808, the glass layers are stacked onto a suitable vacuum mold. The vacuum mold may include any of the molds described herein, and may be disposed in a suitable vacuum cavity. As described herein with respect to FIGS. 15-16B, the stack 1500 may be formed and positioned on the mold 1506 such that the edges of the stack 1500 extend over the top wall 1509 of the mold 1506. The stack 1500 may be positioned such that vacuum vias are offset from the vacuum holes 1510 to facilitate alignment between the vacuum holes 1510 and the vacuum vias 1600 during the reforming process. That is, positioning the stack 1500 on the mold 1506 may include positioning the stack 1500 laterally to facilitate a desired alignment (or initial positioning) between each of the vacuum vias 1600 with an associated one of the vacuum holes 1510.

At block 1810, the stack 1500 is reformed. In embodiments, the reformation of the stack 1500 is performed via the method 400 described herein with respect to FIG. 4. The stack 1500 may be heated at a suitable heating rate (e.g., 2° ° C. per minute, 3° C. per minute, 4° C. per minute, 5° C. per minute) to a reforming temperature dependent on the viscosity curves of the glass used to form the stack 1500. In embodiments when the glass layers are formed of soda lime glass the reforming temperature may be greater than or equal to 710° C. and less than or equal to 750° ° C. (e.g., 730° C.). In embodiments when the glass layers are formed of alu-minosilicate glass, the reforming temperature may be greater than or equal to 760° C. and less than or equal to 800° ° C. (e.g., 780° C.). The stack 1500 may be maintained at the reforming temperature for a stabilization period (e.g., between 3 minutes and 15 minutes, between 3 minutes and 6 minutes), with vacuum pressure being applied to the vacuum openings 1508 and vacuum holes 1510 of the mold 1506 towards the end of the stabilization period (e.g., during the last 30 seconds to the last 90 seconds of the stabilization period) to facilitate re-shaping the glass layers until the bottom glass layer 1504 conforms to the mold surface 1511 and the top glass layer 1502 conforms to the bottom glass layer 1504. The stack 1500 may then be annealed at an annealing temperature (e.g., greater than or equal to 500° ° C. and less than or equal to 550° C.) for an annealing period that is greater than the stabilization period. The stack 1500 may be subsequently cooled to room temperature at a suitable cooling rate (e.g., 2° C. per minute, 3° C. per minute, 4° C. per minute, 5° ° C. per minute). In embodiments, the thermal cycle undergone by the stack 1500 during reforming may take either of the forms described herein with respect to FIGS. 5A and 5B.

At block 1812, the stack 1500 is removed from the vacuum mold 1506 and the glass layers are separated. The separation is facilitated by the nonstick agent. At block 1814, excess glass material is removed from each glass layer. Removal of the excess material may occur using any suitable technique, such as those described with respect to step 418 of the method 400 described herein. The removal of the excess material may result in the formation of a reformed glass article from each of the glass layers (e.g., similar to the reformed glass article 250 shown in FIG. 6B). In an embodiment where each of the top glass layer 1502 and the bottom glass layer 1504 takes the form of the glass sheet 200 described herein, removing excess glass sheet material can include removing perimeter portion 240 and first portions 220 from reformed glass sheet 201 such that a reformed glass article 250 defined by second portion 230 remains (see FIGS. 6A and 6B). In embodiments, excess glass sheet material can be removed using a cutting process, for example a laser cutting process or a water jet cutting process. In embodiments, excess glass sheet material can be removed using mechanical scoring and breakage of the glass along the score line.

At block 1816, post-processing is performed on the glass layers and the glass layers are laminated together. In embodiments, post process may include using a polishing process, an ion-exchange process, an etching process, or a combination thereof such that each of the glass layers has characteristics desired for the application. The glass layers may then be laminated with a suitable interlayer material using any suitable lamination process, with the glass layers being arranged as desired depending on the application.

EXAMPLES

Embodiments of the present disclosure may be further understood in view of the following examples.

Figure 19:
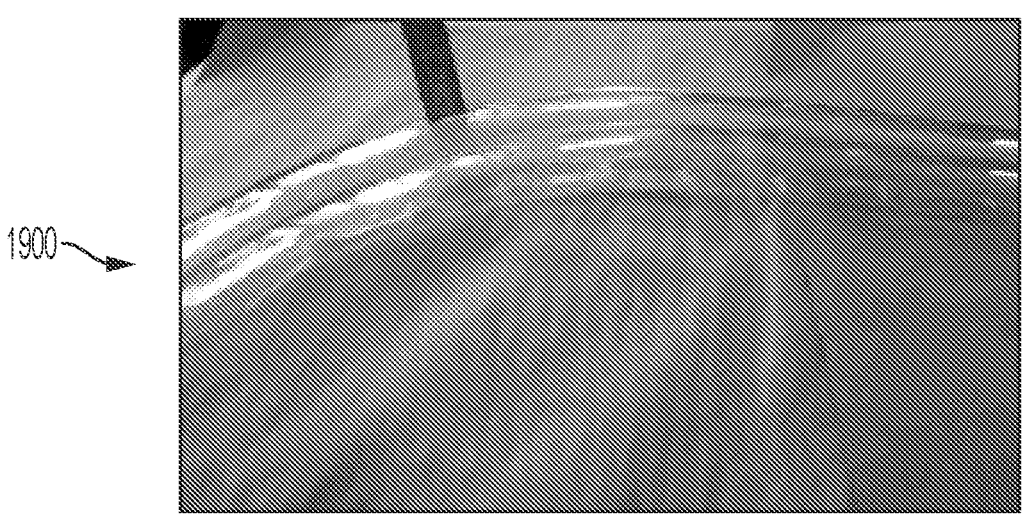
FIG. 19 shows an image of two glass layers that are co-formed according to a first example with the bottom glass layer not including vacuum vias.

A first example of co-forming a stack of glass layers was performed without vacuum vias in the bottom glass layer. In the first example, two glass layers of identical composition and thickness (2.0 mm of soda lime glass) were stacked on the vacuum mold 810 having the configuration described herein with respect to FIG. 12. A boron nitride nonstick layer was applied between the glass layers. A weighted rim was placed on top of the stack to facilitate forming a seal with the top surface 834 (see FIG. 10). The stack was heated according to the thermal cycle depicted in FIG. 5A, with the stack being heated to a reforming temperature of 780° ° C. at a rate of 4° C. per minute. The stack was maintained at the reforming temperature for a stabilization period of 5 minutes. During the last 30 seconds to 90 seconds of the stabilization period, vacuum pressure of 0.1 to 0.3 bars was applied to vacuum openings 840 and vacuum holes 818 to facilitate reforming. The stack was subsequently cooled to an annealing temperature of 520° C. and maintained at the annealing temperature for 20 minutes, and finally cooled to room temperature at a cooling rate of 5° C./min. FIG. 19 depicts an image of the stack 1900 after reforming. A gap between the inner surfaces of the stack as large as 14 mm was observed, indicating a relatively large shape deviation. Such a large shape deviation may render the glass layers incapable of being laminated to one another using existing processes.

Figure 20:
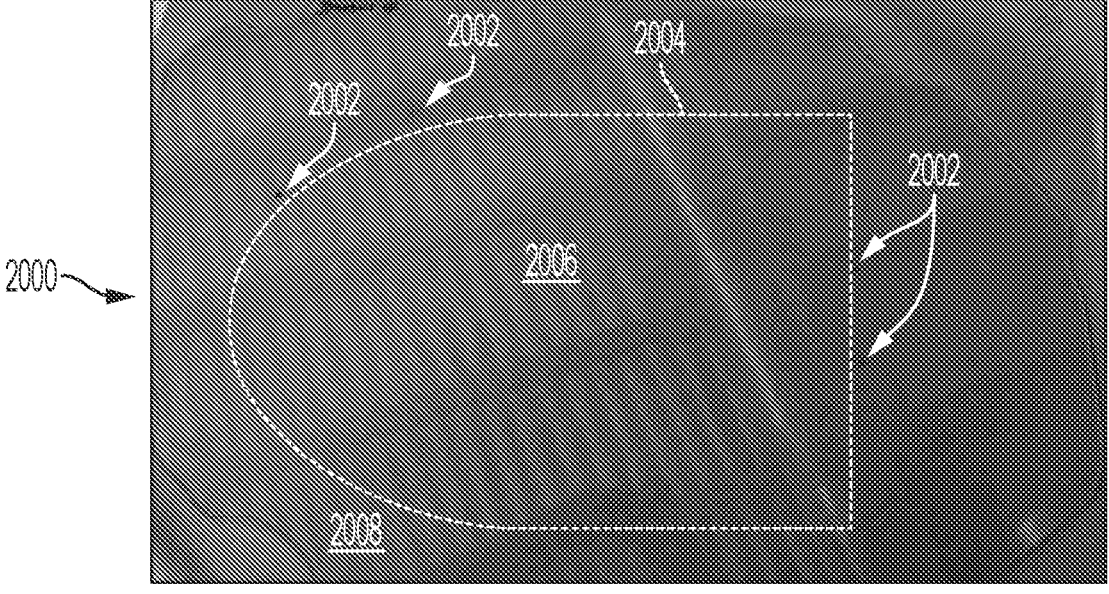
FIG. 20 shows an image of a bottom glass layer according to a second example incorporating vacuum vias therein according to some embodiments.

The second example was the same as the first example, with the exception that the bottom glass layer was modified to incorporate vacuum vias. FIG. 20 shows the bottom layer 2000 having a plurality of vacuum vias 2002 formed therein. The vacuum vias 2002 were circular shaped and formed by diamond drilling to have a diameter of 3.0 mm. As shown, the vacuum vias 2002 were positioned proximate to a boundary 2004 separating a central portion 2006 of the bottom layer 2000, which is desired to be incorporated into the final glass article (e.g., laminate), and peripheral portion 2008 of the glass layer, which may be discarded after the glass article is reformed. In embodiments, the boundary 2004 may represent a line along which the bottom layer 2000 is cut using any of the methods described herein prior to the bottom layer 2000 being incorporated into a laminate. The vacuum vias 2002 are arranged in two pairs proximate to the locations of maximum gaussian curvature on the mold 810. The vacuum vias 2002 were also positioned as described with respect to FIGS. 16A-16B, to align with vacuum holes 818 after reforming.

Figure 21:
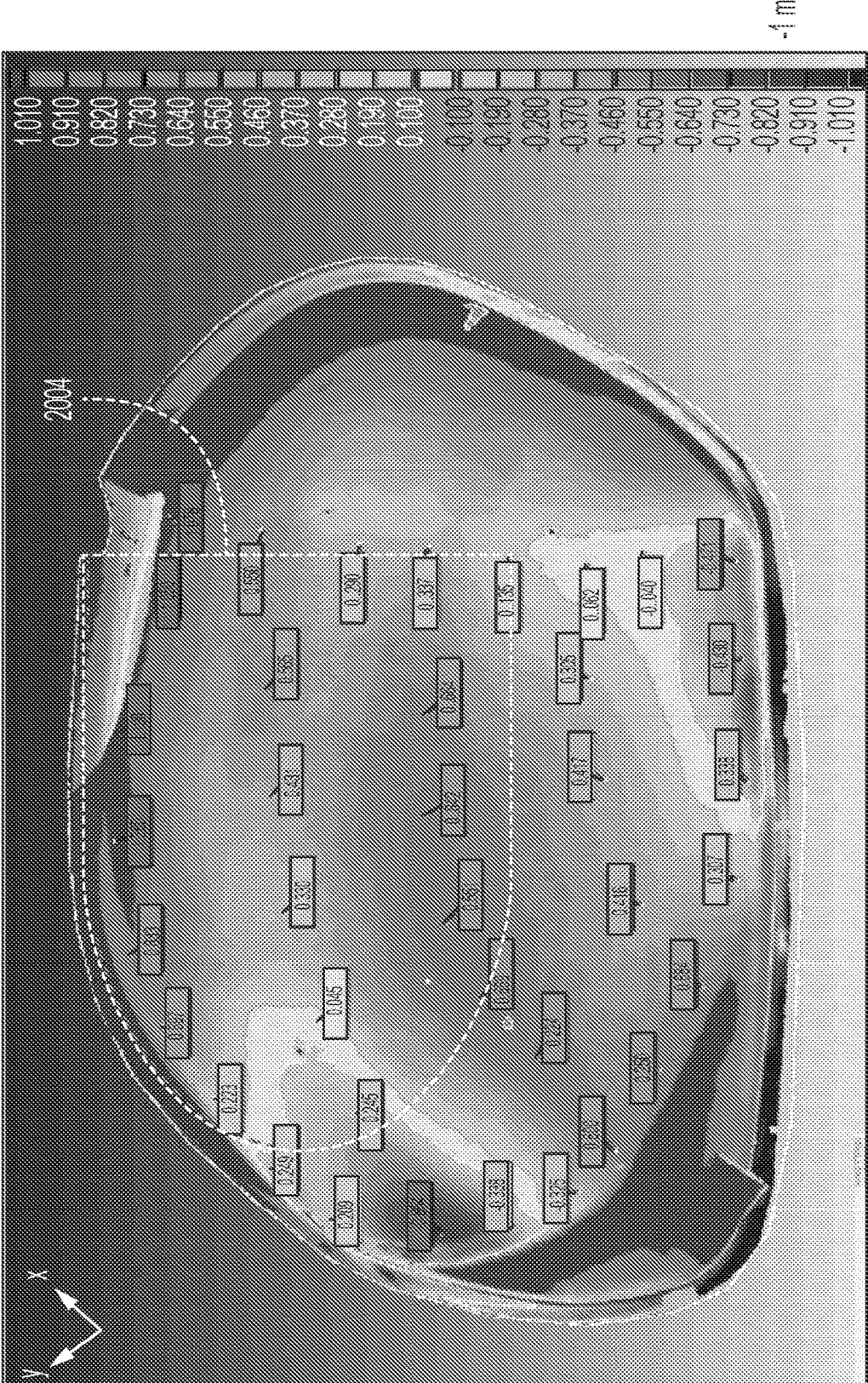
FIG. 21 shows results of shape mismatch measurements between a top glass layer and a bottom glass layer after co-forming according to the second example according to some embodiments.

After re-forming, the stack was scanned using an optical scanner for shape mismatch characterization. The results are shown in FIG. 21. As shown, in a majority of the area (approximately 90% of the area) inside of the boundary 2004, the shape mismatch is less than 1.0 mm. Throughout an entirety of the area inside the boundary 2004, the shape mismatch was less than 2.0 mm. Such low shape mismatches are compatible with existing lamination processes. These results demonstrate the efficacy of the vacuum vias described herein in reducing shape mismatch and using the reforming methods described herein suitable for co-forming glass layers during laminate fabrication.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within +5% of the value stated. For example, about 3 MPa can include any number between 2.85 MPa and 3.15 MPa.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A reformed glass article, comprising:
a first glass layer comprising a first non-developable curved shape defined by a first curved surface and a second curved surface, wherein:
  at least one of the first curved surface and the second curved surface comprises a surface area of 10,000 mm$^2$ or more;
  a thickness of the first glass layer, measured as a distance between the first curved surface and the second curved surface in a direction perpendicular to the first curved surface, has a uniformity of +/−75 microns per 1000 mm$^2$ of surface area on the first curved surface; and
  the first non-developable curved shape comprises a maximum compressive strain shape parameter, as measured between an imaginary central surface disposed between the first curved surface and the second curved surface and an imaginary surface, of greater than or equal to 3.0%.

2. The reformed glass article of claim 1, wherein the curved shape comprises an optical power distortion measured through the thickness below 300 millidiopters in absolute value, the optical power distortion being measured in accordance with DIN 52305:1995.

3. The reformed glass article of claim 1, wherein one of the first curved surface and the second curved surface is a convex curved surface comprising measurable dimple density of less than 10 dimples per 100 mm$^2$ convex surface area, wherein a measurable dimple comprises an effective diameter of greater than 1 mm.

4. The reformed glass article of claim 1, wherein the thickness has a uniformity of +/−50 microns per 1000 mm$^2$ of surface area on the first curved surface.

5. The reformed glass article of claim 1, wherein the maximum compressive strain shape parameter is greater than or equal to 5.0%.

6. The reformed glass article of claim 1, wherein:
the reformed glass article comprises a length (L) measured in a first direction extending parallel to the imaginary surface and a width (W) measured in a second direction extending parallel to the imaginary surface and perpendicular to the first direction,
the imaginary central surface comprises an average Gaussian curvature κ, and $$.0725 * \kappa * \left(1.0667 - 120.9477 * e^{-3.3572 * \frac{W}{7}}\right) * l^2 \geq 3.0\%.$$

7. The reformed glass article of claim 1, wherein:
a peripheral edge of the reformed glass article comprises is substantially circular-shaped and comprises a diameter D, representing a maximum distance between two points along the peripheral edge,
the imaginary central surface comprises an average Gaussian curvature κ, and $$0.0354 * \kappa * D^2 \geq 3.0\%.$$

8. The reformed glass article of claim 1, further comprising a second glass layer disposed on the first glass layer, the second glass layer comprising a second non-developable curved shape defined by a third curved surface and a fourth curved surface, wherein:
  at least one of the third curved surface and the fourth curved surface comprises a surface area of 10,000 mm$^2$ or more;
  a thickness of the second glass layer, measured as a distance between the first curved surface and the second curved surface in a direction perpendicular to the first curved surface, has a uniformity of +/−75 microns per 1000 mm$^2$ of surface area on the first curved surface; and
  the second non-developable curved shape comprises a maximum compressive strain shape parameter, as measured between a second imaginary central surface disposed between the third curved surface and the fourth curved surface and an imaginary surface, of greater than or equal to 3.0%.

9. The reformed glass article of claim 8, wherein a shape mismatch between the first glass layer and the second glass layer, measured by a three-dimensional optical scanner using transmission optics, is less than or equal to 2.0 mm as measured over an entirety of the first curved surface.

10. The reformed glass article of claim 9, wherein the shape mismatch is less than or equal to 1.0 mm over at least 80% of the surface area of the first curved surface.

* * * * *